US009413768B1

(12) United States Patent
Gregg et al.

(10) Patent No.: US 9,413,768 B1
(45) Date of Patent: *Aug. 9, 2016

(54) METHOD FOR MANAGING ACCESS TO PROTECTED COMPUTER RESOURCES

(71) Applicant: PRISM TECHNOLOGIES LLC, Omaha, NE (US)

(72) Inventors: Richard L. Gregg, Elkhorn, NE (US); Sandeep Giri, San Francisco, CA (US); Timothy C. Goeke, Elkhorn, NE (US)

(73) Assignee: PRISM TECHNOLOGIES LLC, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,311

(22) Filed: Apr. 28, 2016

Related U.S. Application Data

(63) Continuation of application No. 14/549,943, filed on Nov. 21, 2014, which is a continuation of application No. 13/752,036, filed on Jan. 28, 2013, now Pat. No. 8,898,746, which is a continuation of application No.

(Continued)

(51) Int. Cl.
*H04L 29/06* (2006.01)

(52) U.S. Cl.
CPC ........ *H04L 63/10* (2013.01); *G06F 2221/2101* (2013.01)

(58) Field of Classification Search
CPC .......... G06F 21/335; G06F 2221/2101; G06F 2221/2129; G06F 2221/2135; G06F 2221/2141; G06F 2221/2149; G06F 21/44; H04L 63/08; H04L 63/0823; H04L 63/0853; H04L 63/10; H04L 2463/102
USPC .......................................................... 726/4
See application file for complete search history.

(56) References Cited

U.S. PATENT DOCUMENTS

| 4,446,519 A | 5/1984 | Thomas |
| 4,471,163 A | 9/1984 | Donald et al. |

(Continued)

FOREIGN PATENT DOCUMENTS

| EP | 0 268 141 A2 | 5/1988 |
| EP | 0 456 920 A2 | 4/1990 |

(Continued)

OTHER PUBLICATIONS

Towards A Secure Distribute Storage System Min Zhang, Desheng Zhang, Hequn Xian, Chi Chen, Dengguo Feng. State Key Laboratory of Information Security, Institute of Software, Chinese Academy of Sciences. Feb. 17-20, 2008. ICACT 2008.*

(Continued)

*Primary Examiner* — Amare F Tabor
*Assistant Examiner* — Aubrey Wyszynski
(74) *Attorney, Agent, or Firm* — Martin & Ferraro, LLP

(57) ABSTRACT

A system for securing and tracking usage of transaction services or computer resources by a client computer from a first server computer, which includes clearinghouse means for storing identity data of the first server computer and the client computer(s); server software means and client software means adapted to forward its identity data and identity data of the client computer(s) to the clearinghouse means at the beginning of an operating session; and a hardware key connected to the client computer, the key being adapted to generate a digital identification as part of the identity data; wherein the hardware key is implemented using a hardware token access system, a magnetic card access system, a smart card access system, a biometric identification access system or a central processing unit with a unique embedded digital identification.

45 Claims, 27 Drawing Sheets

Related U.S. Application Data

12/944,473, filed on Nov. 11, 2010, now Pat. No. 8,387,155, which is a continuation of application No. 11/978,919, filed on Oct. 30, 2007, now Pat. No. 8,127,345, which is a continuation of application No. 10/230,638, filed on Aug. 29, 2002, now Pat. No. 7,290,288, which is a continuation-in-part of application No. 08/872,710, filed on Jun. 11, 1997, now Pat. No. 6,516,416.

(56) References Cited

U.S. PATENT DOCUMENTS

| | | | |
|---|---|---|---|
| 4,652,990 | A | 3/1987 | Pailen et al. |
| 4,658,093 | A | 4/1987 | Hellman |
| 4,685,055 | A | 8/1987 | Thomas |
| 4,691,355 | A | 9/1987 | Wirstrom et al. |
| 4,694,492 | A | 9/1987 | Wirstrom et al. |
| 4,723,284 | A | 2/1988 | Munck et al. |
| 4,748,561 | A | 5/1988 | Brown |
| 4,796,220 | A | 1/1989 | Wolfe |
| 4,821,118 | A | 4/1989 | Lafreniere |
| 4,837,422 | A | 6/1989 | Dethloff et al. |
| 4,864,494 | A | 9/1989 | Kobus, Jr. |
| 4,866,769 | A | 9/1989 | Karp |
| 4,885,789 | A | 12/1989 | Burger et al. |
| 4,907,268 | A | 3/1990 | Bosen et al. |
| 4,916,691 | A | 4/1990 | Goodman et al. |
| 4,916,738 | A | 4/1990 | Chandra et al. |
| 4,932,054 | A | 6/1990 | Chou et al. |
| 4,935,962 | A | 6/1990 | Austin |
| 4,962,449 | A | 10/1990 | Schlesinger |
| 4,977,594 | A | 12/1990 | Shear |
| 4,993,068 | A | 2/1991 | Piosenka et al. |
| 4,995,086 | A | 2/1991 | Lilley et al. |
| 4,998,279 | A | 3/1991 | Weiss |
| 4,999,806 | A | 3/1991 | Chernow et al. |
| 5,023,907 | A | 6/1991 | Johnson et al. |
| 5,032,979 | A | 7/1991 | Hecht et al. |
| 5,048,085 | A | 9/1991 | Abraham et al. |
| 5,054,089 | A | 10/1991 | Uchida et al. |
| 5,060,263 | A | 10/1991 | Bosen et al. |
| 5,081,676 | A | 1/1992 | Chou et al. |
| 5,091,942 | A | 2/1992 | Dent |
| 5,095,194 | A | 3/1992 | Barbanell |
| 5,103,476 | A | 4/1992 | Waite et al. |
| 5,109,427 | A | 4/1992 | Yang |
| 5,109,428 | A | 4/1992 | Igaki et al. |
| 5,113,499 | A | 5/1992 | Ankney et al. |
| 5,138,712 | A | 8/1992 | Corbin |
| 5,144,680 | A | 9/1992 | Kobayashi et al. |
| 5,146,102 | A | 9/1992 | Higuchi et al. |
| 5,146,499 | A | 9/1992 | Geffrotin |
| 5,153,919 | A | 10/1992 | Reeds, III et al. |
| 5,163,147 | A | 11/1992 | Orita |
| 5,168,520 | A | 12/1992 | Weiss |
| 5,180,901 | A | 1/1993 | Hiramatsu |
| 5,182,770 | A | 1/1993 | Medveczky et al. |
| 5,199,066 | A | 3/1993 | Logan |
| 5,204,961 | A | 4/1993 | Barlow |
| 5,210,588 | A | 5/1993 | Lee |
| 5,210,797 | A | 5/1993 | Usui et al. |
| 5,222,133 | A | 6/1993 | Chou et al. |
| 5,222,134 | A | 6/1993 | Waite et al. |
| 5,222,152 | A | 6/1993 | Fishbine et al. |
| 5,224,163 | A | 6/1993 | Gasser et al. |
| 5,229,764 | A | 7/1993 | Matchett et al. |
| 5,230,025 | A | 7/1993 | Fishbine et al. |
| 5,235,642 | A | 8/1993 | Wobber et al. |
| 5,237,614 | A | 8/1993 | Weiss |
| 5,239,583 | A | 8/1993 | Parrillo |
| 5,241,606 | A | 8/1993 | Horie |
| 5,247,575 | A | 9/1993 | Sprague et al. |
| 5,249,230 | A | 9/1993 | Mihm |
| 5,251,259 | A | 10/1993 | Mosley |
| 5,260,999 | A | 11/1993 | Wyman |
| 5,265,162 | A | 11/1993 | Bush et al. |
| 5,276,314 | A | 1/1994 | Martino et al. |
| 5,291,598 | A | 3/1994 | Grundy |
| 5,315,657 | A | 5/1994 | Abadi et al. |
| 5,321,242 | A | 6/1994 | Heath, Jr. |
| 5,325,442 | A | 6/1994 | Knapp |
| 5,329,573 | A | 7/1994 | Chang |
| 5,337,357 | A | 8/1994 | Chou et al. |
| 5,343,529 | A | 8/1994 | Goldfine et al. |
| 5,347,580 | A | 9/1994 | Molva et al. |
| 5,349,642 | A | 9/1994 | Kingdon |
| 5,349,643 | A | 9/1994 | Cox et al. |
| 5,351,303 | A | 9/1994 | Willmore |
| 5,357,573 | A | 10/1994 | Walters |
| 5,371,794 | A | 12/1994 | Diffie et al. |
| 5,373,561 | A | 12/1994 | Haber et al. |
| 5,375,240 | A | 12/1994 | Grundy |
| 5,379,343 | A | 1/1995 | Grube et al. |
| 5,412,654 | A | 5/1995 | Perkins |
| 5,414,844 | A | 5/1995 | Wang |
| 5,416,842 | A | 5/1995 | Aziz |
| 5,428,745 | A | 6/1995 | De Bruijn et al. |
| 5,442,708 | A | 8/1995 | Adams, Jr. et al. |
| 5,444,782 | A | 8/1995 | Adams, Jr. et al. |
| 5,455,953 | A | 10/1995 | Russell |
| 5,481,611 | A | 1/1996 | Owens et al. |
| 5,483,596 | A | 1/1996 | Rosenow et al. |
| 5,485,409 | A | 1/1996 | Gupta et al. |
| 5,490,216 | A | 2/1996 | Richardson, III |
| 5,491,804 | A | 2/1996 | Heath et al. |
| 5,497,421 | A | 3/1996 | Kaufman et al. |
| 5,499,297 | A | 3/1996 | Boebert |
| 5,502,766 | A | 3/1996 | Boebert et al. |
| 5,502,831 | A | 3/1996 | Grube et al. |
| 5,509,070 | A | 4/1996 | Schull |
| 5,511,122 | A | 4/1996 | Atkinson |
| 5,513,261 | A | 4/1996 | Maher |
| 5,534,855 | A | 7/1996 | Shockley et al. |
| 5,535,276 | A | 7/1996 | Ganesan |
| 5,539,828 | A | 7/1996 | Davis |
| 5,542,046 | A | 7/1996 | Carlson et al. |
| 5,544,322 | A | 8/1996 | Cheng et al. |
| 5,546,463 | A | 8/1996 | Caputo et al. |
| 5,550,896 | A | 8/1996 | Chavez, Jr. |
| 5,572,673 | A | 11/1996 | Shurts |
| 5,577,209 | A | 11/1996 | Boyle et al. |
| 5,586,260 | A | 12/1996 | Hu |
| 5,588,059 | A | 12/1996 | Chandos et al. |
| 5,590,133 | A | 12/1996 | Billstrom |
| 5,590,197 | A | 12/1996 | Chen et al. |
| 5,590,199 | A | 12/1996 | Krajewski, Jr. et al. |
| 5,592,553 | A | 1/1997 | Guski et al. |
| 5,604,804 | A | 2/1997 | Micali |
| 5,606,615 | A | 2/1997 | Lapointe et al. |
| 5,613,012 | A | 3/1997 | Hoffman |
| 5,615,277 | A | 3/1997 | Hoffman |
| 5,623,637 | A | 4/1997 | Jones et al. |
| 5,629,980 | A | 5/1997 | Stefik et al. |
| 5,634,012 | A | 5/1997 | Stefik et al. |
| 5,649,099 | A | 7/1997 | Theimer et al. |
| 5,655,077 | A | 8/1997 | Jones et al. |
| 5,657,390 | A | 8/1997 | Elgamal et al. |
| 5,659,616 | A | 8/1997 | Sudia |
| 5,666,411 | A | 9/1997 | McCarty |
| 5,666,416 | A | 9/1997 | Micali |
| 5,677,953 | A | 10/1997 | Dolphin |
| 5,677,955 | A | 10/1997 | Doggett et al. |
| 5,679,945 | A | 10/1997 | Renner et al. |
| 5,687,235 | A | 11/1997 | Perlman et al. |
| 5,696,824 | A | 12/1997 | Walsh |
| 5,699,431 | A | 12/1997 | Van Oorschot et al. |
| 5,706,349 | A | 1/1998 | Aditham et al. |
| 5,706,427 | A | 1/1998 | Tabuki |
| 5,708,655 | A | 1/1998 | Toth et al. |
| 5,708,709 | A | 1/1998 | Rose |
| 5,708,780 | A | 1/1998 | Levergood et al. |
| 5,710,884 | A | 1/1998 | Dedrick |
| 5,715,314 | A | 2/1998 | Payne et al. |

(56) References Cited

U.S. PATENT DOCUMENTS

| | | | |
|---|---|---|---|
| 5,717,756 A * | 2/1998 | Coleman | G06F 21/31 380/277 |
| 5,717,757 A | 2/1998 | Micali | |
| 5,717,758 A | 2/1998 | Micall | |
| 5,720,035 A | 2/1998 | Allegre et al. | |
| 5,721,781 A | 2/1998 | Deo et al. | |
| 5,724,424 A | 3/1998 | Gifford | |
| 5,729,537 A | 3/1998 | Billstrom | |
| 5,737,416 A | 4/1998 | Cooper et al. | |
| 5,737,523 A | 4/1998 | Callaghan et al. | |
| 5,740,361 A | 4/1998 | Brown | |
| 5,748,735 A | 5/1998 | Ganesan | |
| 5,754,864 A | 5/1998 | Hill | |
| 5,757,907 A | 5/1998 | Cooper et al. | |
| 5,757,914 A | 5/1998 | McManis | |
| 5,758,069 A | 5/1998 | Olsen | |
| 5,761,306 A | 6/1998 | Lewis | |
| 5,761,309 A | 6/1998 | Ohashi et al. | |
| 5,761,649 A | 6/1998 | Hill | |
| 5,765,152 A | 6/1998 | Erickson | |
| 5,771,291 A | 6/1998 | Newton et al. | |
| 5,774,550 A | 6/1998 | Brinkmeyer et al. | |
| 5,774,552 A | 6/1998 | Grimmer | |
| 5,778,071 A | 7/1998 | Caputo et al. | |
| 5,778,072 A | 7/1998 | Samar | |
| 5,781,723 A | 7/1998 | Yee et al. | |
| 5,784,463 A | 7/1998 | Chen et al. | |
| 5,784,464 A | 7/1998 | Akiyama et al. | |
| 5,790,530 A | 8/1998 | Moh et al. | |
| 5,790,536 A | 8/1998 | Mahany | |
| 5,790,677 A | 8/1998 | Fox et al. | |
| 5,793,868 A | 8/1998 | Micali | |
| 5,802,465 A | 9/1998 | Hamalainen et al. | |
| 5,809,144 A | 9/1998 | Sirbu et al. | |
| 5,809,145 A | 9/1998 | Slik et al. | |
| 5,815,574 A | 9/1998 | Fortinsky | |
| 5,815,665 A | 9/1998 | Teper et al. | |
| 5,818,936 A | 10/1998 | Mashayekhi | |
| 5,826,011 A | 10/1998 | Chou et al. | |
| 5,828,833 A | 10/1998 | Belville et al. | |
| 5,841,970 A * | 11/1998 | Tabuki | G06F 21/316 380/30 |
| 5,845,070 A | 12/1998 | Ikudome | |
| 5,864,620 A | 1/1999 | Pettitt | |
| 5,864,757 A | 1/1999 | Parker | |
| 5,867,665 A | 2/1999 | Butman et al. | |
| 5,870,723 A | 2/1999 | Pare, Jr. et al. | |
| 5,872,915 A | 2/1999 | Dykes et al. | |
| 5,878,142 A | 3/1999 | Caputo et al. | |
| 5,884,148 A | 3/1999 | Bilgic et al. | |
| 5,884,169 A | 3/1999 | Uchiyama et al. | |
| 5,889,958 A | 3/1999 | Willens | |
| 5,892,900 A | 4/1999 | Ginter et al. | |
| 5,892,902 A | 4/1999 | Clark | |
| 5,903,652 A | 5/1999 | Mital | |
| 5,903,721 A | 5/1999 | Sixtus | |
| 5,908,469 A | 6/1999 | Botz et al. | |
| 5,910,987 A | 6/1999 | Ginter et al. | |
| 5,922,074 A | 7/1999 | Richard et al. | |
| 5,923,756 A | 7/1999 | Shambroom | |
| 5,926,624 A | 7/1999 | Katz et al. | |
| 5,930,804 A | 7/1999 | Yu et al. | |
| 5,938,350 A | 8/1999 | Colonel | |
| 5,940,504 A | 8/1999 | Griswold | |
| 5,943,423 A | 8/1999 | Muftic | |
| 5,943,425 A | 8/1999 | Mizikovsky | |
| 5,956,404 A | 9/1999 | Schneier et al. | |
| 5,969,316 A | 10/1999 | Greer et al. | |
| 5,970,145 A | 10/1999 | McManis | |
| 5,970,408 A | 10/1999 | Carlsson et al. | |
| 5,982,898 A | 11/1999 | Hsu et al. | |
| 5,983,347 A | 11/1999 | Brinkmeyer et al. | |
| 5,983,350 A | 11/1999 | Minear et al. | |
| 5,987,134 A | 11/1999 | Shin et al. | |
| 5,987,232 A | 11/1999 | Tabuki | |
| 5,999,711 A | 12/1999 | Misra et al. | |
| 6,003,135 A | 12/1999 | Bialick et al. | |
| 6,003,136 A | 12/1999 | Schanze | |
| 6,005,939 A | 12/1999 | Fortenberry et al. | |
| 6,006,332 A | 12/1999 | Rabne et al. | |
| 6,011,910 A | 1/2000 | Chau et al. | |
| 6,014,561 A | 1/2000 | Mölne | |
| 6,021,202 A | 2/2000 | Anderson et al. | |
| 6,021,333 A | 2/2000 | Anderson | |
| 6,035,402 A | 3/2000 | Vaeth et al. | |
| 6,041,357 A | 3/2000 | Kunzelman et al. | |
| 6,041,411 A | 3/2000 | Wyatt | |
| 6,044,471 A | 3/2000 | Colvin | |
| 6,047,376 A | 4/2000 | Hosoe | |
| 6,052,785 A | 4/2000 | Lin et al. | |
| 6,055,637 A | 4/2000 | Hudson | |
| 6,061,346 A | 5/2000 | Nordman | |
| 6,070,243 A | 5/2000 | See et al. | |
| 6,072,870 A | 6/2000 | Nguyen | |
| 6,075,860 A | 6/2000 | Ketcham | |
| 6,088,451 A | 7/2000 | He et al. | |
| 6,094,575 A | 7/2000 | Anderson | |
| 6,108,420 A | 8/2000 | Larose et al. | |
| 6,122,631 A | 9/2000 | Berbec et al. | |
| 6,137,791 A | 10/2000 | Frid | |
| 6,151,628 A | 11/2000 | Xu et al. | |
| 6,161,139 A | 12/2000 | Win et al. | |
| 6,173,403 B1 | 1/2001 | DeMont | |
| 6,185,587 B1 | 2/2001 | Bernardo et al. | |
| 6,212,634 B1 | 4/2001 | Geer, Jr. et al. | |
| 6,219,790 B1 | 4/2001 | Lloyd et al. | |
| 6,223,984 B1 | 5/2001 | Renner et al. | |
| 6,226,744 B1 | 5/2001 | Murphy et al. | |
| 6,247,011 B1 | 6/2001 | Jecha et al. | |
| 6,249,873 B1 | 6/2001 | Richard et al. | |
| 6,256,737 B1 | 7/2001 | Bianco et al. | |
| 6,279,112 B1 | 8/2001 | O'Toole, Jr. et al. | |
| 6,308,273 B1 | 10/2001 | Goertzel et al. | |
| 6,377,994 B1 * | 4/2002 | Ault | H04L 63/10 707/999.009 |
| 6,393,014 B1 | 5/2002 | Daly et al. | |
| 6,434,137 B1 | 8/2002 | Anderson | |
| 6,442,608 B1 | 8/2002 | Knight et al. | |
| 6,466,571 B1 | 10/2002 | Dynarski et al. | |
| 6,466,964 B1 | 10/2002 | Leung et al. | |
| 6,470,453 B1 | 10/2002 | Vilhuber | |
| 6,477,708 B1 | 11/2002 | Sawa | |
| 6,484,258 B1 | 11/2002 | Haverty | |
| 6,496,704 B2 | 12/2002 | Yuan | |
| 6,510,236 B1 | 1/2003 | Crane et al. | |
| 6,516,416 B2 | 2/2003 | Gregg et al. | |
| 6,546,487 B1 | 4/2003 | McManis | |
| 6,553,492 B1 | 4/2003 | Hosoe | |
| 6,571,287 B1 | 5/2003 | Knight et al. | |
| 6,606,711 B2 | 8/2003 | Andrews et al. | |
| 6,615,258 B1 | 9/2003 | Barry et al. | |
| 6,615,264 B1 | 9/2003 | Stoltz | |
| 6,636,894 B1 | 10/2003 | Short et al. | |
| 6,728,536 B1 | 4/2004 | Basilier | |
| 6,738,901 B1 | 5/2004 | Boyles et al. | |
| 6,785,729 B1 | 8/2004 | Overby, Jr. et al. | |
| 6,785,825 B2 | 8/2004 | Colvin | |
| 6,832,255 B1 | 12/2004 | Rumsewicz et al. | |
| 6,883,032 B1 | 4/2005 | Dempski | |
| 6,931,530 B2 | 8/2005 | Pham et al. | |
| 7,039,021 B1 | 5/2006 | Kokudo | |
| 7,117,376 B2 | 10/2006 | Grawrock | |
| 7,149,815 B1 | 12/2006 | Furukawa et al. | |
| 7,231,661 B1 | 6/2007 | Villavicencio et al. | |
| 7,233,997 B1 | 6/2007 | Leveridge et al. | |
| 7,275,260 B2 | 9/2007 | de Jong et al. | |
| 7,290,288 B2 | 10/2007 | Gregg et al. | |
| 7,296,152 B1 | 11/2007 | MacPherson | |
| 7,360,078 B1 | 4/2008 | Lebouill | |
| 7,370,350 B1 | 5/2008 | Salowey | |
| 7,370,364 B2 | 5/2008 | Dobbins et al. | |
| 7,373,662 B2 | 5/2008 | Foster et al. | |
| 7,392,390 B2 | 6/2008 | Newcombe | |
| 7,472,191 B2 | 12/2008 | Stewart et al. | |

(56) References Cited

U.S. PATENT DOCUMENTS

| | | | |
|---|---|---|---|
| 7,502,726 B2 | 3/2009 | Panasyuk et al. |
| 7,502,929 B1 | 3/2009 | Schnizlein et al. |
| 7,788,705 B2 | 8/2010 | Bruestle et al. |
| 7,882,552 B2 | 2/2011 | Kipnis et al. |
| 7,900,242 B2 | 3/2011 | Malinen et al. |
| 7,920,706 B2 | 4/2011 | Asokan et al. |
| 8,127,345 B2 | 2/2012 | Gregg et al. |
| 8,255,989 B2 | 8/2012 | Medvinsky et al. |
| 8,280,351 B1 | 10/2012 | Ahmed et al. |
| 8,387,155 B2 | 2/2013 | Gregg et al. |
| 8,898,746 B2 | 11/2014 | Gregg et al. |
| 2001/0045451 A1 | 11/2001 | Tan et al. |
| 2002/0133412 A1 | 9/2002 | Oliver et al. |
| 2002/0162029 A1 | 10/2002 | Allen et al. |
| 2003/0200465 A1 | 10/2003 | Bhat et al. |
| 2003/0233580 A1 | 12/2003 | Keeler et al. |
| 2004/0024764 A1 | 2/2004 | Hsu et al. |
| 2008/0066168 A1 | 3/2008 | Gregg et al. |
| 2008/0256628 A1 | 10/2008 | Himmel et al. |
| 2009/0006850 A1 | 1/2009 | Birger et al. |
| 2015/0082392 A1 | 3/2015 | Gregg et al. |

FOREIGN PATENT DOCUMENTS

| | | |
|---|---|---|
| EP | 0 398 492 A2 | 11/1990 |
| EP | 0 456 386 A3 | 4/1991 |
| EP | 0 636 963 A2 | 2/1995 |
| EP | 0 645 688 A1 | 3/1995 |
| EP | 0 727 894 A1 | 8/1995 |
| EP | 0 748 095 A2 | 5/1996 |
| EP | 0 762 261 A2 | 9/1996 |
| EP | 0 750 436 A1 | 12/1996 |
| EP | 0 758 835 A2 | 2/1997 |
| EP | 0 807 911 A2 | 11/1997 |
| EP | 0 875 841 A2 | 11/1998 |
| EP | 0 935 221 A2 | 8/1999 |
| EP | 0 969 366 A1 | 1/2000 |
| EP | 0 747 845 B1 | 5/2000 |
| EP | 0 792 044 B1 | 5/2001 |
| EP | 1 104 142 A1 | 5/2001 |
| EP | 0 752 635 B1 | 9/2001 |
| EP | 0 588 415 B1 | 1/2002 |
| EP | 0 912 959 B1 | 11/2003 |
| EP | 0 788 688 B1 | 1/2004 |
| EP | 0 762 289 B1 | 7/2004 |
| EP | 0 794 479 B1 | 8/2005 |
| EP | 0 913 966 B1 | 9/2005 |
| EP | 1 796 013 A3 | 2/2009 |
| JP | 3-9444 | 1/1991 |
| JP | 5-333775 | 12/1993 |
| JP | H08-097852 | 4/1996 |
| JP | 8-153072 | 6/1996 |
| JP | 8-249253 | 9/1996 |
| JP | 8-292929 | 11/1996 |
| JP | 9-81520 | 3/1997 |
| JP | 09081518 A | 3/1997 |
| JP | 09081519 A | 3/1997 |
| JP | H09-64870 | 3/1997 |
| JP | 10-285156 | 10/1998 |
| JP | 11-355266 | 12/1999 |
| JP | 2002-197064 | 7/2002 |
| WO | WO 94/26044 A2 | 11/1994 |
| WO | WO 95/20279 A1 | 7/1995 |
| WO | WO 95/26094 | 9/1995 |
| WO | WO 96/07256 A1 | 3/1996 |
| WO | WO 96/42041 A2 | 12/1996 |
| WO | WO 97/05551 A1 | 2/1997 |
| WO | WO 97/13353 | 4/1997 |
| WO | WO 97/15008 A1 | 4/1997 |
| WO | WO 97/16911 A1 | 5/1997 |
| WO | WO 98/02011 | 1/1998 |
| WO | WO 98/19224 | 7/1998 |
| WO | WO 98/41044 A2 | 9/1998 |
| WO | WO 98/43446 A2 | 10/1998 |
| WO | WO 98/51104 A1 | 11/1998 |
| WO | WO 00/46681 A1 | 8/2000 |
| WO | WO 01/84765 A2 | 11/2001 |
| WO | WO 02/30082 A2 | 4/2002 |
| WO | WO 03/001324 A2 | 1/2003 |
| WO | WO 03/067439 A1 | 8/2003 |
| WO | WO 03/067905 A2 | 8/2003 |
| WO | WO 03/073783 A1 | 9/2003 |

OTHER PUBLICATIONS

Defendants' Joint Invalidity Contentions and Joint Supplemental Answer and Objections to Plaintiff's Interrogatory No. 4; *Prism Technologies LLC v. Verisign, Inc., et al.*; Civil Action No. 05-214-JJF; Sep. 5, 2006; 118 pages.

Defendants' Joint Supplemental Invalidity Contentions in Response to Plaintiff's Interrogatory No. 4; *Prism Technologies LLC v. Verisign, Inc. et al.*; Civil Action No. 1:05-cv-00214-JJF; dated Mar. 12, 2007; 269 pages.

Defendant Research in Motion, LTD.'s Preliminary Invalidity Contentions; *Prism Technologies, LLC v. Research in Motion, LTD., and Microsoft Corporation*; Case No. 8:08-cv-00537-LES-TDT; dated Jul. 24, 2009; 5 pages; Exhibit A, RIM Preliminary Invalidity Contentions Chart, 210 pages; Exhibit B, Willens, S., et al., RADIUS, draft-ieft-nasreq-radius-01.txt, RFC2058, Apr. 10, 2002, 33 pages.

*Prism Technologies, LLC., v. Verisign, Inc., et al.*; Civil Action No. 05-214 JJF; Defendants' Second Supplemental Joint 35 U.S.C. § 282 Notice; Mar. 12, 2007; 7 pages; Exhibit A, pp. 1-80.

*Prism Technologies LLC, v. Verisign, Inc., et al.*; Civil Action No. 05-214-JJF; Plaintiff's First Amended Complaint for Patent Infringement and Demand for Jury Trial; Jun. 22, 2005; 7 pages.

*Prism Technologies LLC, v. Verisign, Inc. et al.*; Civil Action No. 05-214 JJF; Plaintiff Prism Technologies LLC's Objections and Responses to Defendant Netegrity, Inc.'s First Set of Interrogatories (Nos. 1-5); Oct. 24, 2005; 18 pages.

*Prism Technologies LLC, v. Verisign, Inc., et al.*; Civil Action No. CA 05-00214 JJF; Plaintiff's Second Amended Complaint for Patent Infringement and Demand for Jury Trial; Aug. 11, 2006; 7 pages.

Microsoft Corporation's Preliminary Invalidity Contentions; *Prism Technologies, LLC v. Research in Motion, Ltd., and Microsoft Corporation*; Case No. 8:08-cv-537; dated Jul. 24, 2009; 8 pages; Exhibit A, Table of references, 1 page; Exhibit B, Claim charts, 68 pages.

Defendants' Opening Claim Construction Brief, *Prism Technologies LLC v. Verisign, Inc., et al.*, Civil Action No. 05-214-JJF, Sep. 22, 2006, 25 pages.

Defendants' Responsive Claim Construction Brief, with Exhibits, *Prism Technologies LLC v. Verisign, Inc., et al.*, Civil Action No. 05-214-JJF, Oct. 13, 2006, 85 pages.

Joint Claim Construction Statement, *Prism Technologies LLC v. Verisign, Inc. et al.*, Civil Action No. 05-214-JJF, Aug. 23, 2006, 26 pages.

*Prism Technologies LLC., v. Research in Motion, Ltd., et al.*; Case No. 8:08-CV-537; Complaint; Dec. 29, 2008; pp. 1-5.

*Prism Technologies LLC., v. Research in Motion, Ltd.*; Case No. 8:08-cv-00537-LES-TDT; Joint Claim Construction Statement; Document No. 72; Oct. 16, 2009; pp. 1-6.

*Prism Technologies LLC., v. Research in Motion, Ltd., et al.*; Case No. 8:08-cv-00537-LES-TDT; Plaintiffs Disclosure of Asserted Claims and Preliminary Infringement Contentions Regarding Defendant Microsoft Corporation; Jun. 26, 2009; 4 pages.

*Prism Technologies LLC., v. Research in Motion, Ltd., et al.*; Case No. 8:08-cv-00537-LES-TDT; Plaintiff's Disclosure of Asserted Claims and Preliminary Infringement Contentions Regarding Defendant Research in Motion, Ltd.; Jun. 26, 2009; 4 pages.

*Prism Technologies LLC., v. Research in Motion, Ltd., et al.*; Case No. 8:08-cv-00537-LES-TDT; Defendant Research in Motion, Ltd.'s Amended Invalidity Contentions; Sep. 18, 2009; 7 pages; Akiyama Chart, 65 pages; Yu Chart, 72 pages; Tabuki Chart, 52 pages; Teper Chart, 54 pages; Grawrock Chart, 39 pages; Crane Chart, 37 pages; Murphy Chart, 38 pages; He Chart, 45 pages; Ketcham Chart, 74 pages; Krajewski Chart, 127 pages; DCE Chart (redacted), 192 pages; SiteMinder Chart, 61 pages; Handbook of Applied Cryptography Chart, 124 pages; Kerberos V5 Chart, 46 pages.

(56) References Cited

OTHER PUBLICATIONS

*Prism Technologies LLC.*, v. *Research in Motion, Ltd.*; No. 8:08-CV-537; Research in Motion, Ltd.'s Response to Plaintiff Prism Technologies LLC's Opening Claim Construction Brief; Document 94; Dec. 4, 2009; 50 pages.
*Prism Technologies LLC.*, v. *Research in Motion, Ltd.*; No. 8:08-CV-537; Index of Evidence in Support of Research in Motion, LTD.'s Response to Plaintiff Prism Technologies LLC's Opening Claim Construction Brief; Document 95; Dec. 4, 2009; 4 pages; Exhibit A, 4 pages; Exhibit C, 4 pages; Exhibit D, 3 pages; Exhibit E, 68 pages; Exhibit F, 24 pages; Exhibit G, 27 pages; Exhibit L, 42 pages; Exhibit M, 7 pages; Exhibit N, 3 pages.
*Prism Technologies LLC.*, v. *Research in Motion, Ltd.*; Case No. 8:08-cv-00537-LES-TDT; Plaintiff's Amended Disclosure of Asserted Claims and Preliminary Infringement Contentions; Feb. 5, 2010; 6 pages; Exhibit A, cover page and pp. 1-134.
*Prism Technologies LLC.*, v. *Research in Motion, Ltd*; Case No. 8:08-cv-00537-LES-TDT; Second Supplemental Responses to Research in Motion, Ltd.'s Interrogatories Nos. 5, 6 and 8; Feb. 16, 2010; 12 pages.
*Prism Technologies, LLC,* v. *Research in Motion, Ltd*; 8:08CV537; Order; Document No. ; Feb. 22, 2010; 1 page.
*Prism Technologies, LLC,* v. *Research in Motion, Ltd*; 8:08-CV-537; Plaintiff Prism Technologies' Reply Brief on Claim Construction; Document No. 154; Mar. 22, 2010; 34 pages.
*Prism Technologies, LLC,* v. *Research in Motion, Ltd*; 8:08-CV-537; Index of Evidence in Support of Plaintiff Prism Technologies' Reply Brief on Claim Construction; Document No. 155; Mar. 22, 2010; 3 pages; Exhibit D, 17 pages; Exhibit E, 3 pages; Exhibit F, 11 pages; Exhibit G, 69 pages; Exhibt H, 2 pages.
*Prism Technologies, LLC,* v. *AT&T Mobility, LLC, Sprint Spectrum L.P., T-Mobile USA, Inc., US Cellular Corp., Cellco Partnership D/B/A Verizon Wireless*; Plaintiff Prism Technologies LLC's Brief in Support of its Motion for Summary Judgment Confirming the Jun. 11, 1997 Priority Date of the Asserted Patents; 8:12-cv-122,123,124,125,126; Feb. 11, 2013; 29 pages.
*Prism Technologies, LLC,* v. *AT&T Mobility, LLC, Sprint Spectrum L.P., T-Mobile USA, Inc., US Cellular Corp., Cellco Partnership D/B/A Verizon Wireless*; Plaintiff Prism Technologies LLC's Brief in Support of its Motion for Summary Judgment Confirming the Jun. 11, 1997 Priority Date of the Asserted Patents; 8:12-cv-122,123,124,125,126; Feb. 12, 2013; 30 pages.
*Prism Technologies, LLC,* v. *Sprint Spectrum L.P. D/B/A Sprint PCS*; Defendant Sprint Spectrum L.P.'s Reply Brief in Opposition to Prism's Motion for Summary Judgment and in Support of its Cross-Motion for Summary Judgment; 8:12-cv-123-LES-TDT; Apr. 12, 2013; 22 pages.
*Prism Technologies, LLC,* v. *AT&T Mobility, LLC, Sprint Spectrum L.P., T-Mobile USA, Inc., US Cellular Corp., Cellco Partnership D/B/A Verizon Wireless*; Memorandum and Order re Priority Date; 8:12-cv-122,123,124,125,126; May 20, 2013; 38 pages.
*Prism Technologies, LLC,* v. *AT&T Mobility, LLC, Sprint Spectrum L.P., T-Mobile USA, Inc., US Cellular Corp., Cellco Partnership D/B/A Verizon Wireless*; Memorandum and Order re Markman Hearing; 8:12-cv-122,123,124,125,126; Filed Jul. 30, 2013; 68 pages.
*Prism Technologies LLC,* v. *Research in Motion, LTD.; Case No. 8:08-cv-00537-LES-TDT*; Defendant Research in Motion, LTD.'s Second Amended Invalidity Contentions; Apr. 23, 2010; 10 pages; Akiyama Chart, 65 pages; Crane Chart, 37 pages; DTN Cookie-Authentication System, 40 pages; Encrypted File Transfer System Without Key Management-Secure-ftp Chart, 30 pages; Gifford Chart, 46 pages; Grawrock Chart, 39 pages; Handbook of Applied Crytopgraphy, 124 pages; He Chart; 45 pages; Kerberos V5 Chart, 39 pages; Krajewski Chart, 127 pages; Murphy Chart, 38 pages; NeTegrity SiteMinder Product Chart, 175 pages; Rainbow Sentinel SuperPro Chart, 69 pages; Secure Access Markup Language/SAML V 1.0 Chart, 114 pages; SET Secure Electronic Transaction Specification Version 1.0 Chart, 53 pages; Study of an Authentication Protocol in a Distributed System Environment Chart, 40 pages; Tabuki Chart, 52 pages; Teper Chart, 54 pages; Ketcham Chart, 74 pages; Yu Chart, 72 pages; Weiss Chart, 46 pages.
*Prism Technologies LLC,* v. *Research in Motion, LTD.*; Case No. 8:08-cv-00537; Second Amended Answer and Counterclaim of Defendant Research in Motion, Ltd.; Apr. 29, 2010; 28 pages.
In the Matter of Certain Authentication Systems, Including Software and Handheld Electronic Devices; Investigation No. 337-TA-697; Verified Complaint Under Section 337 of the Tariff Act of 1930, As Amended; 26 pages; Exhibit 2, 11 pages; Exhibit 3, 31 pages; Exhibit 4, 31 pages; Exhibit 5, 1 page; Exhibit 6, 4 pages; Exhibit 7, 31 pages; Exhibit 8, 2 pages; Exhibit 9, 92 pages; Exhibit 10, 4 pages; Exhibit 11, 92 pages; Exhibit 12, 56 pages; Exhibit 13, 17 pages; Exhibit 26, 2 pages; Exhibit 29, 10 pages; Exhibit 30, 1 page; Exhibit 31, 1 page; Exhibit 32, 4 pages; Exhibit 34, 19 pages; Exhibit 35, 3 pages; Exhibit 36, 1 page; Exhibit 37, 169 pages; Letter Submitting Verified Complaint to the International Trade Commission; 2 pages; Letter Requesting Confidential Treatment of Exhibits; 2 pages; Dec. 2, 2009.
In re Certain Authentication Systems, Including Software and Handheld Electronic Devices: Public Version of Confidential Submissions; 3 pages; Exhibit 19, 3 pages; Exhibit 20, 4 pages; Exhibit 39, 2 pages; Dec. 18, 2009.
In the Matter of: Certain Authentication Systems, Including Software and Handheld Electronic Devices; Investigation No. 337-TA-697; Response of Respondents Research in Motion Limited and Research in Motion Corporation to the Verified Complaint and Notice of Investigation; 27 pages; Exhibit A, 21 pages; Exhibit A-1, 421 pages; Exhibit A-2, 145 pages; Exhibit B, 37 pages; Exhibit C, 47 pages; Exhibit D, 35 pages; Exhibit E, 49 pages; Exhibit F, 37 pages; Exhibit G, 34 pages; Exhibit H, 28 pages; Jan. 20, 2010.
In the Matter of Certain Authentication Systems, Including Software and Handheld Electronic Devices; Investigation No. 337-TA-697; Complainant Prism Technologies' Supplemental Response to Research in Motion Corporation's Interrogatory No. 4; 6 pages; Feb. 26, 2010.
In the Matter of Certain Authentication Systems, Including Software and Handheld Electronic Devices; Investigation No. 337-TA-697; Complainant Prism Technologies' Amended Response to Research in Motion Corporation's Interrogatory No. 4; 8 pages; Mar. 11, 2010.
In the Matter of Certain Authentication Systems, Including Software and Handheld Electronic Devices; Investigation No. 337-TA-697; Complainant Prism Technologies' Amended Responses to Research in Motion Limited's Interrogatories Nos. 13 and 16; 9 pages; Mar. 11, 2010.
In the Matter of Certain Authentication Systems, Including Software and Handheld Electronic Devices; Investigation No. 337-TA-697; Complainant Prism Technologies' Supplemental Response to Respondent Research in Motion Limited's Interrogatories Nos. 13-19; 87 pages; Mar. 24, 2010.
In the Matter of: Certain Authentication Systems, Including Software and Handheld Electronic Devices; Investigation No. 337-TA-697; Respondent Research in Motion Corporation's Supplemental Response to Prism's Interrogatory No. 25; 9 pages; Mar. 26, 2010.
In the Matter of: Certain Authentication Systems, Including Software and Handheld Electronic Devices; Investigation No. 337-TA-697; Respondent Research in Motion Limited's Supplemental Response to Prism's Interrogatory No. 25; 9 pages; Mar. 26, 2010.
In the Matter of: Certain Authentication Systems, Including Software and Handheld Electronic Devices; Investigation No. 337-TA-697; Motion of Respondents Research in Motion Limited and Research in Motion Corporation for Summary Determination that the Asserted Claims of U.S. Pat. No. 7,290,288 are Invalid; 4 pages; Mar. 29, 2010.
In the Matter of: Certain Authentication Systems, Including Software and Handheld Electronic Devices; Investigation No. 337-TA-697; Memorandum in Support of Motion of Respondents Research in Motion Limited and Research in Motion Corporation for Summary Determination that the Asserted Claims of U.S. Pat. No. 7,290,288 are Invalid; Redacted Version; 10 pages; Mar. 29, 2010.
In the Matter of: Certain Authentication Systems, Including Software and Handheld Electronic Devices; Investigation No. 337-TA-697; Statement of Material Facts for Which There is No Genuine Issue Accompanying Motion of Respondents Research in Motion Limited and Research in Motion Corporation for Summary Determination

(56) References Cited

OTHER PUBLICATIONS that the Asserted Claims of U.S. Pat. No. 7,290,288 are Invalid; Redacted Version; 7 pages; Mar. 29, 2010.
In the Matter of: Certain Authentication Systems, Including Software and Handheld Electronic Devices; Investigation No. 337-TA-697; Declaration of Christopher R. Liro in Support of Motion of Respondents Research in Motion Limited and Research in Motion Corporation for Summary Determination that the Asserted Claims of U.S. Pat. No. 7,290,288 are Invalid; 3 pages; Exhibit C, 98 pages; Exhibit E, 10 pages; Exhibit F, 6 pages; Mar. 29, 2010.
In the Matter of Certain Authentication Systems, Including Software and Handheld Electronic Devices; Investigation No. 337-TA-697; Declaration of Charles J. Hawkins: (1) In Support of Motion of Complainant Prism Technologies LLC for 45-Day Stay of the Proceedings and Shortened Response Period Hereto; and (2) In Opposition to Motion of Respondents Research in Motion Limited and Research in Motion Corporation for Summary Determination that the Asserted Claims of U.S. Pat. No. 7,290,288 are Invalid; 6 pages; Exhibit A, 2 pages; Exhibit B, 3 pages; Exhibit C, 2 pages; Exhibit E, 2 pages; Exhibit F, 7 pages; Exhibit G, 13 pages; Exhibit H, 16 pages; Exhibit I, 5 pages; Exhibit J, 10 pages; Exhibit K, 6 pages; Exhibit L, 17 pages; Exhibit M, 62 pages; Exhibit N, 6 pages; Exhibit R, 4 pages; Exhibit T, 53 pages; Apr. 12, 2010.
In the Matter of Certain Authentication Systems, Including Software and Handheld Electronic Devices; Investigation No. 337-TA-697; Prism's Response to RIM's Motion for Summary Determination of Invalidity of the Asserted Claims of U.S. Pat. No. 7,290,288, 30 pages; Apr. 12, 2010.
In the Matter of Certain Authentication Systems, Including Software and Handheld Electronic Devices; Investigation No. 337-TA-697; Prism Technologies, LLC's Response to RIM's Statement of Material Facts for Which There Is No Genuine Issue; 17 pages; Apr. 12, 2010.
In the Matter of: Certain Authentication Systems, Including Software and Handheld Electronic Devices; Investigation No. 337-TA-697; Motion of Respondents Research in Motion Limited and Research in Motion Corporation to File a Reply to Prism's Response to RIM's Motion for Summary Determination of Invalidity of the Asserted Claims of U.S. Pat. No. 7,290,288; 4 pages; Apr. 19, 2010.
In the Matter of: Certain Authentication Systems, Including Software and Handheld Electronic Devices; Investigation No. 337-TA-697; Memorandum in Support of Motion of Respondents Research in Motion Limited and Research in Motion Corporation to File a Reply to Prism's Response to RIM's Motion for Summary Determination of Invalidity of the Asserted Claims of U.S. Pat. No. 7,290,288; 3 pages; Apr. 19, 2010.
In the Matter of: Certain Authentication Systems, Including Software and Handheld Electronic Devices; Investigation No. 337-TA-697; RIM's Reply to Prism's Response to RIM's Motion for Summary Determination of Invalidity of the Asserted Claims of U.S. Pat. No. 7,290,288; Redacted Version; 11 pages; Apr. 19, 2010.
In the Matter of: Certain Authentication Systems, Including Software and Handheld Electronic Devices; Investigation No. 337-TA-697; RIM's Response to Prism Technologies, LLC's Statement of Material Facts; 13 pages; Apr. 19, 2010.
In the Matter of: Certain Authentication Systems, Including Software and Handheld Electronic Devices; Investigation No. 337-TA-697; Respondents' Research in Motion Limited and Research in Motion Corporation Opposition to Complainant Prism Technologies LLC's Motion for 45-Day Stay of the Proceedings (Motion No. 697-012); Redacted Version; 18 pages; Apr. 22, 2010.
Request for Ex Parte Reexamination of U.S. Pat. No. 7,290,288, dated Apr. 8, 2010; pp. 1-288; Exhibit AA, 7 pages; Exhibit L, 43 pages; Exhibit M, 54 pages; Exhibit N, 84 pages; Exhibit O, 63 pages; Exhibit P, 41 pages; Exhibit Q, 29 pages; Exhibit R, 14 pages; Exhibit S, 13 pages; Exhibit T, 13 pages.
Aboba, B., et al.; "RADIUS Authentication Client MIB;" Request for Comments: 2618; Jun. 1999; 14 pages.
Andrews, Whit; Content Sites Vexed by Password Abuse; Reprinted from Web Week, vol. 3, Issue 4; Feb. 17, 1997; 3 pages.
Andrews, Whit; out with the old . . . ; Old Guard of Content Providers Adopt to the Web; Reprinted from Web Week, vol. 2, Issue 20; Dec. 16, 1996; 3 pages.
Berners-Lee, T., et al.; "Hypertext Transfer Protocol—HTTP/1.0;" Request for Comments: 1945; May 1996; 60 pages.
Bowen, Barry D.; How Popular Sites Use Cookie Technology; Shopping baskets are a natural use for cookies, but uncovered several surprising uses, too; Netscape World; Apr. 1997; 13 pages.
Braden, R.; "Requirements for Internet Hosts—Communication Layers;" Request for Comments: 1122; Oct. 1989; 116 pages.
Bruno, Lee; "Software & Security Netegrity's Siteminder Software Lets Net Managers Get Centered on Security;" Data Communications, vol. 26, No. 1; Jan. 1997; 2 pages.
Bryant, Bill; "Designing an Authentication System: a Dialogue in Four Scenes;" Massachusetts Institute of Technology; Feb. 1997; 18 pages.
Burati, M., et al.; "User-to-User Authentication—Functional Specification;" Request for Comments: 91.0; Jan. 1996; 9 pages.
Business Wire; Secure Computing Announces Immediate Availability of Sidewinder 3.0; Security Server Employs Fully Integrated Perimeter Security, Ipsec Interoperable Encryption, Strong User Authentication, and E-mail Content Filtering. Sep. 17, 1996; 2 pages.
DASCOM; "Integration of DCE/Kerberos with Public Key Infrastructure using the Cryptographic Message Syntax (PKINIT/CMS);" Mar. 30, 1998; 27 pages.
de Laat, C., et al.; Generic AAA Architecture; Request for Comments: 2903; Aug. 2000; 26 pages.
Doan, Amy; "Remote Access Vendors Try RADIUS;" InfoWorld; Sep. 23, 1996; 1 page.
Erdos, Marlena E., et al.; "Extending the OSF DCE Authorization System to Support Practical Delegation;" to appear in PSRG Workshop on Network and Distributed System Security; Feb. 11-12, 1993; 8 pages.
EMV '96; Chip Electronic Commerce Specification, Version 1.0; Dec. 1999; 69 pages.
Estrin, Deborah, et al.; "Visa Scheme for Inter-Organization Network Security;" IEEE Symposium on Security and Privacy; Apr. 1987; pp. 174-183.
Farrell, S., et al.; AAA Authorization Requirements; Request for Comments: 2906; Aug. 2000; 23 pages.
Gligor, Virgil D., et al.; "On Inter-realm Authentication in Large Distributed Systems;" Proceedings of the 1992 IEEE Symposium on Security and Privacy; 1992; pp. 2-17.
Hornstein, Ken; "Kerberos FAQ, v2.0;" http://wwwfaqs.org/faqs/kerberos-faq/general/; Sep. 17, 2009; 51 pages.
Interlink AAA Server Software: Authentication Guide; "LDAP and ProLDAP;" 2000; 16 pages.
Interlink Networks AAA Server; "Administrator's Guide;" 2000; 88 pages.
Interlink Networks AAA Server; "Getting Started;" 2000; 31 pages.
Kohl, John T., et al.; "The Evolution of the Kerberos Authentication Service;" appeared in Distributed Open Systems; 1994; 15 pages.
Kohl, John T., et al, "The Evolution of the Kerberos Authentication Service," MIT, revision of paper presented at Spring 1991 EurOpen Conference, 15 pages.
Kohl, "The Kerberos Authentication Service (Version 5)," 1993.
Kohl, John T., "The use of Encryption in Kerberos for Network Authentication," 1998, pp. 35-43.
Kolletzki, Stephan, "Secure Internet Banking with Privacy Enhanced Mail—A Protocol for Reliable Exchange of Secured Order Forms," Computer Networks and ISDN Systems, 1996, pp. 1891-1899.
Krishnamurthy, Sriekha, et al.; "Digital Security Forensics SiteMinder—A Portal Security Management Tool;" White Paper; Ver. No. 1.0; Mar. 18, 2002; 25 pages.
Lucent Technologies; "RADIUS Remote Authentication Dial in User Service;" Jun. 1999; 6 pages.
Lucent Technologies; "RADIUS for UNIX Administrator's Guide;" Feb. 1999; 198 pages.
Menezes, A., et al.; "Handbook of Applied Cryptography;" CRC Press, Inc.; 1997; cover page and pp. 1-319, 321-383, 385-541, 543-661, and 663-780.
Merit AAA Server; "Differentiating Authentication Policy by Hunt Group;" printed Sep. 2009; 5 pages.

(56) References Cited

OTHER PUBLICATIONS

Mullan, S.; "DCE Interoperability With Kerberos—Functional Specification;" Request for Comments: 92.0; Jan. 1996; 27 pages.
Nelson, Dave, et al.; "Current Meeting Report—Minutes of the Remote Authentication Dial-In User Services Working Group (radius);" Mar. 1996; 6 pages.
Netegrity; "SiteMinder Frequently Asked Questions;" http://web.archive.org/web/19990508041248/www.netegrity.com/product/siteminder_faq_s.html; May 8, 1999; 8 pages.
OASIS; Assertions and Protocol for the OASIS Security Assertion Markup Language (SAML); OASIS Standard; Nov. 5, 2002; 47 pages.
OASIS; Bindings and Profiles for the OASIS Security Assertion Markup Language (SAML); OASIS Standard; Nov. 5, 2002; 31 pages.
OASIS; Conformance Program Specification for the OASIS Security Assertion Markup Language (SAML); OASIS Standard; Nov. 5, 2002; 23 pages.
OASIS; Glossary for the OASIS Security Assertion Markup Language (SAML); OASIS Standard; Nov. 5, 2002; 13 pages.
OASIS; Security and Privacy Consideration for the OASIS Security Assertion Markup Language (SAML); OASIS Standard; Nov. 5, 2002; 26 pages.
Pato, Joseph N.; "Distributed Computing Environment (OSF DCE) Security Architecture;" I4 Forum; Jan. 18-27, 1993; 32 pages.
Pato, J.; "Extending the DCE Authorization Model to Support Practical Delegation (Extended Summary);" Request for Comments: 3.0; Jun. 1992; 18 pages.
Pato, J.; "A Generic Interface for Extended Registry Attributes;" Request for Comments: 6.0; Jun. 1992; 23 pages.
Pato, J.; "Hierarchical Trust Relationships for Inter-Cell Authentication;" Request for Comments: 7.0; Jul. 1992; 7 pages.
Rigney, C., et al.; "RADIUS Accounting draft-ietf-radius-accounting-00.txt;" Jul. 1995; 22 pages.
SET Secure Electronic Transaction Specification; Book 1: Business Description; Version 1.0; May 31, 1997; 80 pages.
SET Secure Electronic Transaction Specification; Book 3: Formal Protocol Definition; Version 1.0; May 31, 1997; 251 pages
SET Secure Electronic Transactions Website Archive; http://web.archive.org/web/19981206111521/http://www.setco.org/; Dec. 6, 1998; 1 page.
SET; External Interface Guide to SET Secure Electronic Transaction; Sep. 24, 1997; 118 pages.
Stevens, W. Richard; "TCP/IP Illustrated: the protocols;" vol. 1; May 1994; cover page and pp. 33-39.
Vollbrecht, J., et al.; AAA Authorization Application Examples; Request for Comments: 2905; Aug. 2000; 53 pages.
Vollbrecht, J., et al.; AAA Authorization Framework; Request for Comments: 2904; Aug. 2000; 36 pages.
Weiner, Bruce; "Netegrity SiteMinder 4.61 with Microsoft Active Directory AuthMark Performance;" Apr. 18, 2002; 4 pages.
Woo, Thomas Y.C., et al.; "Authentication for Distributed Systems;" to appear in Internet Besieged: Countering Cyberspace Scofflaws; 1997; 30 pages.
Zorn, G. et al.; "RADIUS Authentication Server MIB;" Request for Comments: 2619; Jun. 1999; 16 pages.
Defendant Symantec Corp.'s Answer, Affirmative Defenses, and Counterclaims; *Prism Technologies LLC v. Adobe Systems Inc., et al.*; Case No. 8:10-CV-220; Doc. No. 107; filed Aug. 23, 2010; 13 pages.
Defendant Autodesk, Inc.'s Answer and Counterclaims; *Prism Technologies LLC v. Adobe Systems Inc., et al.*; Case No. 8:10-CV-220; Doc. No. 108; filed Aug. 23, 2010; 12 pages.
Defendant Sage Software, Inc.'s Answer to Prism's Complaint for Patent Infringement; *Prism Technologies LLC v. Adobe Systems Inc., et al.*; Case No. 8:10-CV-220; Doc. No. 113; filed Sep. 1, 2010; 11 pages.
Defendant Nuance, Inc.'s Answer and Counterclaims; *Prism Technologies LLC v. Adobe Systems Inc., et al.*; Case No. 8:10-CV-220; Doc. No. 119; filed Sep. 7, 2010; 34 pages.
Defendant National Instruments Corp.'s Answer and Counterclaims to Plaintiff's Complaint for Patent Infringement; *Prism Technologies LLC v. Adobe Systems Inc., et al.*; Case No. 8:10-CV-220; Doc. No. 120; filed Sep. 7, 2010; 12 pages.
Answer and Counterclaims of Defendant Trend Micro Incorporated to Plaintiff Prism Technologies, LLC's Complaint for Patent Infringement; *Prism Technologies LLC v. Adobe Systems Inc., et al.*; Case No. 8:10-CV-220; Doc. No. 121; filed Sep. 7, 2010; 14 pages.
Defendant Adobe Systems Inc.'s Answer and Counterclaims to Plaintiff's Complaint for Patent Infringement; *Prism Technologies LLC v. Adobe Systems Inc., et al.*; Case No. 8:10-CV-220; Doc. No. 123; filed Sep. 7, 2010; 13 pages.
Defendant Quark, Inc.'s Answer and Counterclaims to Prism Technologies LLC's Complaint; *Prism Technologies LLC v. Adobe Systems Inc., et al.*; Case No. 8:10-CV-220; Doc. No. 124; filed Sep. 7, 2010; 11 pages.
Defendant McAfee, Inc.'s Answer and Counterclaim to Prism's Complaint for Patent Infringement; *Prism Technologies LLC v. Adobe Systems Inc., et al.*; Case No. 8:10-CV-220; Doc. No. 131; filed Sep. 10, 2010; 11 pages.
Defendant The Mathworks, Inc.'s First Amended Answer and Counterclaim to Prism's Complaint for Patent Infringement; *Prism Technologies LLC v. Adobe Systems Inc., et al.*; Case No. 8:10-CV-220; Doc. No. 133; filed Sep. 13, 2010; 11 pages.
Defendants' Opening Claim Construction Brief Regarding "Hardware Key" and "Access Key"; *Prism Technologies, LLC v. Adobe Systems Inc., et al.*; Case No. 8:10-cv-00220-LES-TDT; Doc. No. 172; filed Jan. 28, 2011; 34 pages.
Index of Evidence Supporting Defendants' Opening Claim Construction Brief Regarding "Hardware Key" and "Access Key"; *Prism Technologies, LLC v. Adobe Systems Inc., et al.*; Case No. 8:10-cv-00220-LES-TDT; Doc. No. 173; filed Jan. 28, 2011; 451 pages.
Plaintiff's Opening Claim Construction Brief Regarding "Hardware Key" and "Access Key"; *Prism Technologies, LLC v. Adobe Systems Inc., et al.*; Case No. 8:10-cv-00220-LES-TDT; Doc. No. 178; filed Mar. 1, 2011; 24 pages.
Index of Evidence Supporting Plaintiff's Opening Claim Construction Brief Regarding "Hardware Key" and "Access Key"; *Prism Technologies, LLC v. Adobe Systems Inc., et al.*; Case No. 8:10-cv-00220-LES-TDT; Doc. No. 179; filed Mar. 1, 2011; 146 pages.
Defendants' Reply Claim Construction Brief Regarding "Access Key" and "Hardware Key"; *Prism Technologies, LLC v. Adobe Systems Inc., et al.*; Case No. 8:10-cv-00220-LES-TDT; Doc. No. 180; filed Mar. 21, 2011; 26 pages.
Index of Evidence Supporting Defendants' Reply Claim Construction Brief Regarding "Hardware Key" and "Access Key"; *Prism Technologies, LLC v. Adobe Systems Inc., et al.*; Case No. 8:10-cv-00220-LES-TDT; Doc. No. 181; filed Mar. 21, 2011; 9 pages.
Transcript of Proceedings before the Honorable Lyle E. Strom United States Senior District Judge (Markman Hearing with Presentations); *Prism Technologies, LLC v. Adobe Systems Inc., et al.*; Case No. 8:10-cv-00220-LES-TDT; Doc. No. 226; hearings took place Apr. 11, 2011; 166 pages.
Memorandum and Order (Markman); *Prism Technologies, LLC v. Adobe Systems Inc., et al.*; Case No. 8:10CV220; Doc. No. 188; filed Jun. 1, 2011; 15 pages.
Defendants' Opening Brief in Support of Motion for Summary Judgment of Noninfringement; *Prism Technologies, LLC v. Adobe Systems Inc., et al.*; Case No. 8:10-cv-00220-LES-TDT; Doc. No. 289; filed Oct. 7, 2011; 30 pages.
Plaintiff Prism Technologies, LLC's Opening Claim Construction Brief; *Prism Technologies, LLC v. Adobe Systems Inc., et al.*; Case No. 8:10-CV-00220-LES-TDT; Doc. No. 309; filed Oct. 17, 2011; 51 pages.
Index of Evidence for Plaintiff Prism Technologies, LLC's Opening Claim Construction Brief; *Prism Technologies, LLC v. Adobe Systems Inc., et al.*; Case No. 8:10-CV-00220-LES-TDT; Doc. No. 310; filed Oct. 17, 2011; 356 pages.
Adobe Systems Incorporated's Responses to Plaintiff Prism Technologies, LLC's Second Set of Interrogatories; *Prism Technologies LLC v. Adobe Systems Inc., et al.*; Case No. 8:10-cv-00220-LES-TDT; dated Nov. 3, 2011; 41 pages.

(56) References Cited

OTHER PUBLICATIONS

Defendant Autodesk, Inc.'s Responses and Objections to Prism's Second Set of Interrogatories (Nos. 7-8); *Prism Technologies, LLC* v. *Adobe Systems Incorporated, et al.*; Case No. 8:10-cv-220; dated Nov. 7, 2011; 7 pages.
Defendants' Responsive Claim Construction Brief; *Prism Technologies, LLC* v. *Adobe Systems Incorporated, et al.*; Case No. 8:10-cv-00220-LES-TDT; dated Nov. 14, 2011; 63 pages.
Index of Evidence in Support of Defendants' Responsive Claim Construction Brief; *Prism Technologies, LLC* v. *Adobe Systems Incorporated, et al.*; Case No. 8:10-cv-00220-LES-TDT; dated Nov. 14, 2011; 487 pages.
Symantec Corporation's Objections and Responses to Prism Technologies LLC's Third Set of Interrogatories; *Prism Technologies, LLC* v. *Adobe Systems Inc., et al.*; Case No. 8:10-CV-220-LES-TDT; dated Nov. 21, 2011; 9 pages.
Memorandum and Order; *Prism Technologies, LLC* v. *Adobe Systems Inc., et al.*; Case No. 8:10CV220; dated Nov. 28, 2011; 10 pages.
Plaintiff Prism Technologies, LLC's Reply Claim Construction Brief; *Prism Technologies, LLC* v. *Adobe Systems Inc., et al.*; Case No. 8:10-CV-00220-LES-TDT; Doc. No. 400; filed Dec. 2, 2011; 41 pages.
Index of Evidence for Plaintiff Prism Technologies, LLC's Reply Claim Construction Brief; *Prism Technologies, LLC* v. *Adobe Systems Inc., et al.*; Case No. 8:10-CV-00220-LES-TDT; Doc. No. 401; filed Dec. 2, 2011; 88 pages.
Defendant National Instruments Corporation's Response to Plaintiff Prism Technologies, LLC's Third Set of Interrogatories; *Prism Technologies LLC* v. *Adobe Systems Inc., et al.*; Case No. 8:10-cv-00220-LES-TDT; dated Dec. 8, 2011; 7 pages.
Defendant Adobe Systems Incorporated's First Supplemental Responses to Plaintiff Prism Technologies, LLC's Second Set of Interrogatories; (With Appendix A and Exhibits 1-48) *Prism Technologies LLC* v. *Adobe Systems Inc., et al.*; Case No. 8:10-cv-00220-LES-TDT; dated Dec. 16, 2011; 1233 pages.
Defendant National Instruments Corporation's First Supplemental Responses to Plaintiff Prism Technologies, LLC's Third Set of Interrogatories; *Prism Technologies LLC* v. *Adobe Systems Inc., et al.*; Case No. 8:10-cv-00220-LES-TDT; dated Dec. 16, 2011; 8 pages.
Symantec Corporation's First Supplemental Objections and Responses to Prism Technologies LLC's Interrogatory Nos. 6 and 10; *Prism Technologies, LLC* v. *Adobe Systems Inc., et al.*; Case No. 8:10-cv-00220-LES-TDT; dated Dec. 16, 2011; 13 pages.
Trend Micro Incorporated's Supplemental Objections and Responses to Prism's Second Set of Interrogatories (Nos. 7-8); *Prism Technologies, LLC* v. *Adobe Systems Incorporated, et al.*; Case No. 8:10-cv-00220-LES-TDT; dated Dec. 22, 2011; 1239 pages.
McAfee, Inc.'s First Supplemental Response to Prism's Third Set of Interrogatories to McAfee, Inc. (Nos. 8-9); *Prism Technologies LLC* v. *Adobe Systems Inc., et al.*; Case No. 8:10-CV-220-LES-TDT; dated Dec. 23, 2011; 1193 pages.
Sage Software Inc.'s First Supplemental Responses to Plaintiff Prism Technologies, LLC's Third Set of Interrogatories; *Prism Technologies, LLC* v. *Adobe Systems Incorporated, et al.*; Case No. 8:10-cv-00220-LES-TDT; dated Dec. 23, 2011; 1237 pages.
Defendant Autodesk, Inc.'s Supplemental Responses and Objections to Prism's Second Set of Interrogatories (No. 8); *Prism Technologies, LLC* v. *Adobe Systems Incorporated, et al.*; Case No. 8:10-cv-220; dated Jan. 6, 2012; 1234 pages.
Transcript of Proceedings Before the Honorable Lyle E. Strom United States Senior District Judge (Markman Hearing with presentations); *Prism Technologies, LLC* v. *Adobe Systems Incorporated, et al.*; Case No. 8:10CV220; dated Jan. 12, 2012; 290 pages.
Joint Stipulation on Claim Construction; *Prism Technologies, LLC* v. *Adobe Systems Incorporated, et al.*; Case No. 8:10-cv-00220-LES-TDT; Doc. No. 440; dated Jan. 20, 2012; 11 pages.
Memorandum and Order; *Prism Technologies, LLC* v *Adobe Systems Incorporated, et al.*; Case No. 8:10CV220; Doc. No. 469; dated Feb. 14, 2012; 32 pages.
Prism Technologies, LLC's Objections and Responses to Defendants' First Set of Common Requests for Admission (Nos. 1-18); *Prism Technologies, LLC* v. *Adobe Systems Inc., et al.*; Case No. 8:10-cv-00220-LES-TDT; dated Mar. 26, 2012; 10 pages.
Defendants' Opening Claim Construction Brief with Exhibits; Sep. 22, 2006; *Prism Technologies LLC* v. *Verisign, Inc., et al.*; Civil Action No. 05-214-JJF.
Defendants' Responsive Claim Construction Brief; Oct. 13, 2006 (public version dated Oct. 17, 2006); *Prism Technologies LLC* v. *Verisign, Inc., et al.*; Civil Action No. 05-214-JJF.
Plaintiff's Complaint for Patent Infringement and Demand for Jury Trial; *Prism Technologies, LLC* v. *Verisign, Inc., et al.*; dated Apr. 11, 2005; pp. 1-6.
Plaintiff Prism Technologies LLC's Claim Construction Answering Brief; Oct. 13, 2006 with Exhibits; *Prism Technologies LLC* v. *Verisign, Inc., et al.*; Civil Action No. 05-214-JJF.
Plaintiff Prism Technologies LLC's Opening Claim Construction Brief and Appendix with Exhibits; Sep. 22, 2006; *Prism Technologies LLC* v. *Verisign, Inc., et al.*; Civil Action No. 05-214-JJF.
Plaintiff Prism Technologies LLC's Responses and Objections to Defendant Cellco Partnership d/b/a Verizon Wireless' First Set of Interrogatories (Nos. 1-10) to Prism Technologies LLC; Feb. 13, 2014; *Prism Technologies LLC* v. *Cellco Partership d/b/a/ Verizon Wireless*; Civil Action No. 8:12-cv-126-LES-TDT; 16 pages.
Plaintiff Prism Technologies LLC's Responses and Objections to Defendant Sprint Spectrum L.P.'s First Set of Interrogatories (Nos. 1-6) to Prism Technologies LLC; Feb. 14, 2014; *Prism Technologies LLC* V. *Sprint Spectrum L.P., D/B/A/ Sprint PCS*; Civil Action No. 8:12-CV-LES-TDT; 15 Pages.
Plaintiff Prism Technologies LLC's Responses and Objections to Defendant AT&T Mobility LLC's First Set of Interrogatories (Nos. 1-6) to Prism Technologies LLC; Feb. 14, 2014; *Prism Technologies LLC* v. *AT&T Mobility LLC*; Civil Action No. 8:12-cv-122-LES-TDT; 15 pages.
Plaintiff Prism Technologies LLC's Responses and Objections to Defendant T-Mobile USA Inc.'s Second Set of Interrogatories (Nos. 6-10) to Prism Technologies LLC; Feb. 14, 2014; *Prism Technologies LLC* v. *T-Mobile USA Inc.*; Civil Action No. 8:12-cv-124-LES-TDT; 14 pages.
Plaintiff Prism Technologies LLC's Supplemental Responses and Objections to United States Cellular Corporation's First Set of Interogatories (Nos. 1-6) to Prism Technologies LLC; Feb. 14, 2014; *Prism Technologies LLC* v. *United States Cellular Corporation*; Civil Action No. 8:12-cv-125-LES-TDT; 19 pages.
Request for Ex Parte Reexamination of U.S. Pat. No. 7,290,288, dated Jun. 4, 2009, pp. 1-148. Exhibit I, cover page and pp. 1-54. Exhibit J, cover page and pp. 1-90. Exhibit K, cover page and pp. 1-74. Exhibit L, cover page and pp. 1-32. Exhibit M, cover page and pp. 1-27. Exhibit N, cover page and pp. 1-27.
Order; Document 449; filed Apr. 2, 2007; *Prism Technologies LLC* v. *Verisign, Inc. et al.*; Civil Action No. 1:05-cv-00214-JJF.
Defendants' Preliminary Invalidity Contentions & Exhibits 1A-38 A, 1-B-38B, 1C-38C, 40A-54A, 40B-54B, and 40C-54C, *PRISM Technologies LLC* v. *AT&T Mobility LLC, Sprint Spectrum L.P., T-Mobile USA, Inc., U.S. Cellular Corp., & Cellco Partnership D/B/A Verizon Wireless*, Civil Action Nos. 8:12- cv-122-LES-TDT, 8:12-cv-123-LES-TDT, 8:12-cv-124-LES-TDT, 8:12-cv-125-LES-TDT, 8:12-cv-126-LES-TDT, Jun. 19, 2013, 6,421 pages.
*Prism Technologies LLC* v. *AT&T Mobility LLC*, Defendant AT&T Mobility's Election of Prior Art References, Civil Action No. 8:12-cv-122-LES-TDT, Mar. 14, 2014, 4 pages.
*Prism Technologies LLC* v. *AT&T Mobility LLC*, Defendant AT&T Mobility's Second Amended Initial Disclosures, Civil Action No. 8:12-cv-122-LES-TDT, Jan. 13, 2014, 9 pages.
*Prism Technologies LLC* v. *AT&T Mobility LLC*, Defendant AT&T Mobility, LLC's Second Amended Invalidity Contentions, with charts, Civil Action No. 8:12-cv-122-LES-TDT, Jan. 13, 2014, 258 pages.
Defendants' Preliminary Amended Invalidity Contentions, with Exhibits 1A-5A, 1B-38B, 1C-5C, 7A-38A, 7C-38C, 40A-76A, 40B-76B, and 40C-76C, *Prism Technologies LLC* v. *AT&T Mobility LLC, Sprint Spectrum L.P., T-Mobile USA, Inc., U.S. Cellular Corp., and Cellco Partnership D/B/A Verizon Wireless*, Civil Action Nos. 8:12-

(56) References Cited

OTHER PUBLICATIONS cv-122-LES-TDT, 8:12-cv-123-LES-TDT, 8:12-cv-124-LES-TDT, 8:12-cv-125-LES-TDT, 8:12-cv-126-LES-TDT, Sep. 18, 2013, 9,551 pages.
*Prism Technologies LLC* v. *AT&T Mobility LLC et al.*, Index of Exhibits to Preliminary Amended Invalidity Contentions, Civil Action No. 8:12-cv-122-LES-TDT, -123, -124, -125, -126, Sep. 18, 2013, 5 pages.
*Prism Technologies LLC* v. *AT&T Mobility LLC*, Plaintiffs Preliminary Infringement Contentions, Public Redacted Copy with Exhibits, Civil Action No. 8:12-cv-122-LES-TDT, Mar. 1, 2013, 137 pages.
*Prism Technologies LLC* v. *AT&T Mobility LLC*, Defendant AT&T Mobility, LLC's Third Amended Invalidity Contentions with Exhibits, Civil Action No. 8:12-cv-122-LES-TDT, Apr. 18, 2014, 117 pages.
*Prism Technologies LLC* v. *AT&T Mobility LLC*, Defendant AT&T Mobility LLC's Brief in Support of its Motion for Leave to Supplement its Invalidity Contentions and Modify its Election of Prior Art References with Exhibits, Civil Action No. 8:12-cv-122-LES-TDT, Apr. 22, 2014, 57 pages.
*Prism Technologies LLC* v. *AT&T Mobility LLC*, Declaration of Andrew Rosbrook, Civil Action No. 8:12-cv-122-LES-TDT, Apr. 22, 2014, 3 pages.
*Prism Technologies LLC* v. *AT&T Mobility LLC*, Defendant AT&T Mobility LLC's Motion for Leave to Supplement its Invalidity Contentions, Civil Action No. 8:12-cv-122-LES-TDT, Apr. 22, 2014, 3 pages.
*Prism Technologies LLC* v. *AT&T Mobility LLC*, Index of Evidence in Support of Defendant AT&T Mobility LLC's Brief in Support of its Motion for Leave to Supplement its Invalidity Contentions and Modify its Election of Prior Art References, Civil Action No. 8:12-cv-122-LES-TDT, Apr. 22, 2014, 2 pages.
*Prism Technologies LLC* v. *Cellco Partnership D/B/A Verizon Wireless*, Plaintiffs Preliminary Infringement Contentions, with Exhibits, Civil Action No. 8:12-cv-126-LES-TDT, Mar. 1, 2013, 118 pages.
*Prism Technologies LLC* v. *Cellco Partnership D/B/A Verizon Wireless*, Defendant Cellco Partnership D/B/A Verizon Wireless' Election of Prior Art References, Civil Action No. 8:12-cv-126-LES-TDT, Mar. 14, 2014, 5 pages.
*Prism Technologies LLC* v. *Sprint Spectrum L.P. D/B/A Sprint PCS*, Sprint's Election of References, Civil Action No. 8:12-cv-123-LES-TDT, Mar. 14, 2014, 4 pages.
*Prism Technologies LLC* v. *T-Mobile USA, Inc.*, Plaintiff's Preliminary Infringement Contentions with Exhibits, Public Redacted Copy, Civil Action No. 8:12-cv-124-LEs-TDT, Mar. 11, 2013, 188 pages.
*Prism Technologies LLC* v. *T-Mobile USA, Inc.*, T-Mobile USA, Inc.'s Election of Prior Art References, Civil Action No. 8:12-cv-124-LES-TDT, Mar. 14, 2014, 4 pages.
*Prism Technologies LLC* v. *Sprint Spectrum L.P.*, Plaintiffs Preliminary Infringement Contentions with Exhibits, Public Redacted Copy, Civil Action No. 8:12-cv-123-LES-TDT, Mar. 1, 2013, 137 pages.
*Prism Technologies LLC* v. *Sprint Spectrum L.P., D/B/A Sprint PCS*; Sprint Spectrum L.P.'s Summary of Witness Disclosures Pursuant to Federal Rules of Civil Procedure 26(a)(2)(A) and (C); Civil Action No. 8:12-cv-123-LES-TDT; Apr. 17, 2014; 7 pages.
*Prism Technologies LLC* v. *U.S. Cellular Corp.*, Defendant United States Cellular Corporation's Election of Prior Art References, Civil Action No. 8:12-cv-125-LES-TDT, Mar. 14, 2014, 4 pages.
*Prism Technologies LLC* v. *U.S. Cellular Corp.*, Plaintiff's Preliminary Infringement Contentions with Exhibits, Public Copy, Civil Action No. 8:12-cv-LES-TDT, Mar. 1, 2013, 115 pages.
*Prism Technologies LLC* v. *U.S. Cellular Corp.*, Expert Report of Henry H. Houh, Ph. D. on Invalidity Issues, Civil Action No. 8:12-cv-125-LES-TDT, D. Neb., Apr. 11, 2014, 449 pages.
*Prism Technologies LLC* v. *AT&T Mobility, LLC et al.*, Claim Construction Order, Dkt. No., filed Jul. 30, 2013, 68 pages.
Declaration of Michael J. Shamos Ph. D., J.D., Concerning Claim Terms, *Prism Technologies LLC* v. *Verisign, Inc., et al.*, Civil Action No. 05-cv-214-JJF, D. Del., Nov. 20, 2006, 28 pages.
Deposition Errata Sheet for Greg Duman; dated May 3, 2012; 1 page.
Deposition Errata Sheet for Gregory Duman; dated Nov. 26, 2012; 2 pages.
Deposition Errata Sheet for Gerald Korth; dated May 2, 2012; 3 pages.
Deposition Errata Sheet for Gerald Korth; dated May 29, 2012; 3 pages.
Deposition Errata Sheet for Gerald Korth; dated Nov. 20, 2012; 2 pages.
Deposition of Sandeep Giri; *Prism Technologies* v. *Verisign, Inc.*, Civil Action No. 05-214-JJF, Oct. 30, 2006, 331 pages.
Deposition of Sandeep Giri; *Prism Technologies* v. *Research in Motion*; Civil Action No. 8:08-cv-00537; Apr. 27, 2010; 215 pages.
Deposition of Timothy Goeke; *Prism Technologies LLC* v. *Research in Motion, Ltd.*; Civil Action No. 8:08-cv-537; Apr. 15, 2010; 156 pages.
Deposition of Roger Greer; *Prism Technologies* v. *Verisign, Inc., et al.*; Civil Action No. 05-214-JJF; Jan. 5, 2007; 79 pages.
Deposition of Richard Gregg; *Prism Technologies LLC* v. *AT&T Mobility, LLC et al.*; Civil Action No. 8:12-cv-122, 123, 124, 125, 126; Apr. 16, 2014; 31 pages.
Deposition of David Klausner; *Prism Technologies* v. *Research in Motion Ltd.*; Civil Action No. 8:08-cv-00537-LES-TDT; Apr. 16, 2010; 109 pages.
Deposition of Gerald Korth; *Prism Technologies, LLC* v. *Verisign, Inc., et al.*; Civil Action No. 05-214-JJF; dated Jan. 10, 2007; 199 pages.
Deposition of Thomas Martin; *Prism Technologies, Inc.*, v. *Adobe Systems Inc., et al.*; Civil Action No. 8:10-cv-220-LES-TDT; May 24, 2012; 70 pages.
Deposition of Grace O'Brien; *Prism Technologies* v. *Adobe Systems, Inc., et al.*; Civil Action No. 8:10-cv-00220-LES-TDT; May 23, 2012; 98 pages.
Declaration of Dale Chang in Support of Defendants' Opposition to Prisms's Motion for Summary Judgment Regarding the Priority Date of the '288 Patent, with Exhibits A-G, *Prism Technologies LLC* v. *Adobe Systems Inc., et al.*, Civil Action No. 8:10-cv-220-LES-TDT, Document 927, filed Sep. 13, 2012, D. Neb., 188 pages.
Plaintiff Prism's Election of Asserted Claims; *Prism Technologies LLC* v. *AT&T Mobility LLC et al.*; Prism's Election of Asserted Claims; Civil Action Nos. 8:12-cv-122, 123, 124, 125, 126; Feb. 24, 2014; 5 pages.
Prism Complaint for Patent Infringement, *Prism* v. *Adobe Systems et al.*, Civil Action No. 8:10-cv-00220, D. Neb., Jun. 8, 2010, 85 pages.
Reply Brief of Plaintiff-Appellant Prism Technologies LLC, *Prism Techs. LLC* v. *VeriSign, Inc. et al.*, No. 2007-1315 (Fed. Cir.), Oct. 31, 2007, 36 pages.
Prism Markman Summation Statement, Transcript of Proceedings before the Honorable Lyle E. Strom, *Prism Technologies LLC*, v. *AT&T Mobility LLC et al.*, Case Nos. 8:12-cv-122, 123, 124, 125, 126, D. Neb., Jul. 2, 2013, 142 pages.
Brief of Plaintiff-Appellant Prism Technologies LLC, *Prism Technologies LLC* v. *VeriSign, Inc. et al.*, No. 2007-1315 (Fed. Cir.), Sep. 4, 2007, 118 pages.
Plaintiff's Responses and Objections to Defendant Verizon Wireless' First Set of Requests for Admission (Nos. 1-256), *Prism Technologies LLC* v. *Cellco Partnership D/B/A Verizon Wireless*, Civil Action No. 8:12-cv-126-LES-TDT, Feb. 14, 2014, 210 pages.
Plaintiff Prism Technologies LLC's Third Supplemental Responses to Defendants' First Set of Common Interrogatories (Nos. 1 & 4), *Prism Technologies LLC* v. *AT&T Mobility LLC et al.*, Civil Action No. 8:12-cv-122, 123, 124, 125, 126, D. Neb., Mar. 7, 2014, 15 pages.
Plaintiff Prism Technologies LLC's Fourth Supplemental Responses to Defendants' First Set of Common Interrogatories (No. 1), *Prism Technologies LLC* v. *AT&T Mobility LLC et al.*, Civil Action Nos. 8:12-cv-122, 123, 124, 125, 126, D. Neb., Apr. 25, 2014, 7 pages.
Amendment to Deposition for Richard Gregg; Sep. 7, 2012; 2 pages.
Amendment to Deposition for Richard Gregg; Dec. 5, 2012; 1 page.
*Prism Technologies LLC* v. *T-Mobile USA, Inc.*; Defendant T-Mobile USA, Inc.'s Motion for Summary Judgment to Confirm a Priority Date of Aug. 29, 2002 for the Asserted Patents; Civil Action No. 8:12-cv-124-LES-TDT; Sep. 4, 2015; 4 pages.
*Prism Technologies LLC* v. *T-Mobile USA, Inc.*; Brief in Support of T-Mobile USA, Inc.'s Motion for Summary Judgment to Confirm a

(56) References Cited

OTHER PUBLICATIONS

Priority Date of Aug. 29, 2002 for the Asserted Patents; Civil Action No. 8:12-cv-124-LES-TDT; Sep. 4, 2015; 15 pages.
*Prism Technologies LLC v. T-Mobile USA, Inc.*; Plaintiffs Cross-Motion for Summary Judgment to Confirm a Priority Date of Jun. 11, 1997 for the Asserted Patents; Civil Action No. 8:12-cv-124-LES-TDT; Sep. 18, 2015; 4 pages.
*Prism Technologies LLC v. T-Mobile USA, Inc.*; Prism's Brief in Opposition to T-Mobile's Motion for Summary Judgment to Confirm a Priority Date of Aug. 29, 2002 for the Asserted Patents and in Support of Prism's Cross-Motion to Confirm a Priority Date of Jun. 11, 1997 for the Asserted Patents; Civil Action No. 8:12-cv-124-LES-TDT; Sep. 18, 2015; 13 pages.
*Prism Technologies LLC v. T-Mobile USA, Inc.*; Reply in Support of T-Mobile USA, Inc.'s Motion for Summary Judgment to Confirm a Priority Date of Aug. 29, 2002 for the Asserted Patents; Civil Action No. 8:12-cv-124-LES-TDT; Sep. 25, 2015; 11 pages.
*Prism Technologies LLC v. T-Mobile USA, Inc.*; Memorandum and Order; Civil Action No. 8:12-cv-124-LES-TDT; Oct. 6, 2015; 6 pages.
*Prism Technologies LLC v. T-Mobile USA, Inc.*; Plaintiff Prism Technologies, LLC's Trial Brief; Civil Action No. 8:12-cv-124-LES-TDT; Oct. 6, 2015; 9 pages.
*Prism Technologies LLC v. T-Mobile USA, Inc.*; Index of Evidence in Support of Plaintiff Prism Technologies, LLC's Trial Brief; Civil Action No. 8:12-cv-124-LES-TDT; Oct. 6, 2015; 3 pages.
*Prism Technologies LLC v. T-Mobile USA, Inc.*; Exhibit 1—Declaration of Matthew W. Olinzock, Esq.; Civil Action No. 8:12-cv-124-LES-TDT; Oct. 6, 2015; 2 pages.
*Prism Technologies LLC v. T-Mobile USA, Inc.*; Exhibit 2—T-Mobile USA, Inc.'s Election of Prior Art References; Civil Action No. 8:12-cv-124-LES-TDT; Oct. 6, 2015; 6 pages.
*Prism Technologies LLC v. T-Mobile USA, Inc.*; Exhibit 3—T-Mobile USA, Inc.'s Election of Prior Art References; Civil Action No. 8:12-cv-124-LES-TDT; Oct. 6, 2015; 5 pages.
*Prism Technologies LLC v. T-Mobile USA, Inc.*; Defendant T-Mobile USA, Inc.'s Rule 50(b) Brief in Support of its Motion for Judgment as a Matter of Law; Civil Action No. 8:12-cv-124-LES-TDT; Nov. 25, 2015, 26 pages.
Abadi et al.; "Authentication and Delegation with Smart-Cards;" Science of Computer Programming, 1993, pp. 93-113.
Abadi et al.; Authentication and Delegation with Smart-Cards; Jul. 1992.
About Omnipoint and VoiceStream; PR Newswire; The Free Library; Dec. 28, 1999; 4 pages.
Abraham, Dennis G., et al., "Transaction Security System," IBM Systems Journal, vol. 30, No. 2, 1991.
Adamski, Andrsej, "Information Management: Legal and Security Issues," 2007.
Agha, Gul, et al., "Security and Fault-Tolerance in Distributed Systems: An Actor-Based Approach," Proceedings: Computer Security, Dependability, and Assurance: From Needs to Solutions, Jul. 7-9, 1998, pp. 72-88.
Ahuja, V.; Network and Internet Security; 1996.
Akesson, S., "GPRS, General Packet Radio Service," IEEE, 1995, pp. 640-643.
Andrews, Whit; "Financial Trader Looks Past IBM to Startup for Secure Transactions;" Marketing & Commerce; Jul. 7, 1997; 1 page.
Anderson et al.; RFC 68.3—DCE 1.2.2 Public Key Login—Functional Specification; Jan. 1997; 112 pages.
Anderson et al.; RFC 68.2—DCE 1.2.2 Public Key Login—Functional Specification; Feb. 1996.
Anderson et al.; RFE 68.1—DCE 1.2 Public-Key Login—Functional Specification; Feb. 1995.
Andreesen, M.; Interoperable Security; Dec. 1996.
Antonelli, et al., "Access Control in a Workstation-Based Distributed Computing Environment," CITI Technical Report 90-2, Jul. 17, 1990, 8 pages.

Arkalgud, Srivalli, "Electronic Payment Systems," A Survey Report submitted in partial fulfillment of the requirements of CMPE 296U, Fall 1999 37 pages.
Arseniey, M.; How are X.509 Certificates Used in User Authentication and Authorization; Feb. 2002.
Ascend Communications; "MAX T1/PRI RADIUS Supplement;" Jan. 24, 1996; 85 pages.
Ascend Communications; "MAX T1/PRI Security Supplement;" Jan. 25, 1996; 44 pages.
Ashley, Paul, Vandenwauver, Mark; Practical Intranet Security; Kluwer Academic Publishers; 1999.
Ashley, Paul et al.; Wired versus Wireless Security; The Internet, WAP and iMode for E-Commerce; Dec. 2001.
Atkinson, R.; RFC 1826—IP Authentication Header; Aug. 1995.
Atkinson, R.; RFC 1827—IP Encapsulating Security Payload (ESP); Aug. 1995.
Atkinson, Randall, "Security Architecture for the Internet Protocol," Cisco Systems, Internet Draft, Jun. 4, 1996, 44 pages.
Avolio, Frederick M., et al., "A Network Perimeter With Secure External Access," Jan. 25, 1994, pp. 1-11.
Avolio, Frederick M., et al., "A Network Perimeter with Secure External Access," Secure Network Perimeters, Feb. 1994, pp. 1-11.
Aziz, Ashar, et al., "A Secure Communications Protocol to Prevent Unauthorized Access, Privacy and Authentication for Wireless Local Area Networks," IEEE Personal Communications, First Quarter 1994, pp. 25-31.
Baker et al.; RFC 2082—RIP-2 MD5 Authentication; Jan. 1997.
Battelle; Battelle Press Releases; Battelle, Cybermark Complete Successful Testing of Digital Cash Transfer from Smart Card; Feb. 7, 2007; Battelle Memorial Institute; (VERI-1607108—VERI-1607110).
Battelle; Solutions Update; Technology Development, Product Development, and Technology Commercialization; The chemical industry pools environmental technology dollars; Fall 1996; (VERI-1607111—VERI-1607122).
Bella, Giampaolo, "Inductive Verification of Smart Card Protocols," Feb. 2003, 44 pages.
Bella, Giampaolo, et al., "Kerberos Version IV: Inductive Analysis of the Secrecy Goals," 1998 European Symposium on Research In Computer Security, 15 pages.
Bellovin, Steven, et al., "Limitations of the Kerberos Authentication System," USENIX, Winter 1991, 16 pages.
Benantar, M. et al.; Access Control Systems: From Host-Centric to Network-Centric Computing; IBM Systems Journal, vol. 35, No. 1, 1996.
Bernstein, Philip A., "Middleware: A Model for Disbributed System Services," Communications of the ACM, Feb. 1996, vol. 30, No. 2, pp. 86-98.
Bertino, Elisa, et al. "Protecting Information on the Web," Communications of the ACM, 2000, pp. 189-199.
"Billing Users," z/OS MVS System Management Facilities (SMF), IBM, Copyright 1990, 3 https://pic.dhe.ibm.com/infocenter/zos/v1r13/index.jsp?topic=%2Fcom.ibm.zos.r13.ieag200%2Fiea2g2c310.htm, 3 pages.
Bloomberg Businessweek, Did You Say Sprint Was No. 1?, http://www.businessweek.com/stories/1996-09-01/did-you-say-sprint-was-no-dot-1, Sep. 1, 1996, 3 pages.
Blunk, L., et al., "PPP Extensible Authentication Protocol (EAP)," Request for Comments (RFC 2284), Mar. 1998, pp. 1-15.
Bodoh, Dan,"Making the Most of the Internet for Failure Analysis," Proceedings from the 24th International Symposium for Testing and Failure Analysis, Nov. 15-19, 1998, 5 pages.
Bodoh, Dan,"Publish Failure-Analysis Reports on the Web," Test & Measurement World, Sep. 1, 1999, 7 pages.
Borman, D., "Telnet Authentication: Kerberos Version 4," Request for Comments 1411, Jan. 1993, pp. 1-4.
Borman, D., "Telnet Authentication: Kerberos Version 4," Request for Comments 1411, Jan. 1993, pp. 1-8.
Braden et al.; RFC 1636—Report of IAB Workshop on Security in the Internet Architecture Feb. 8-10, 1994. (Jun. 1994).
Branchaud, Marc, "A Survey of Public-Key Infrastructures," Department of Computer Science McGill University, Montreal, Mar. 1997, 92 pages.

(56) References Cited

OTHER PUBLICATIONS

Bridges, S.; Strong Authentication Questions; Mar. 1996.
Brief History of GSM & the GSMA, http://www.gsma.com/aboutus/history, © 2014, 6 pages.
Brown, G., "Remote Passphrase Authentication," Internet-Draft, May 29, 1997; CompuServe, expires Nov. 15, 1997; 47 pages.
Brown, Gary, "Why Invent Another Authentication Mechanism," A White Paper, CompuServe's Remote Passphrase Authentication Reference Site, May 20, 1996, 5 pages.
BTAS and the World Wide Web: An Introduction and Technical Overview: Draft; Apr. 1997.
Business Wire; Secure Computing Corp. Announces Agreement with Security Dynamics Technologies, Inc. to Provide Enhanced Security for Computer Networks; Jan. 23, 1996.
Business Wire; "Security Dynamics to Enhance Network Security for Oracle Universal Server; Security Dynamics is First Provider of Token-Based User Authentication Technology for Oracle7's Advanced Networking Option;" Feb. 26, 1996; 2 pages.
Byte; Kay, Russell; Jun. 1994/Special Report;/Distributed and Secure; When you distribute information and processing, you also delegate security responsibility. Good access controls, eyes-open administration, and communications encryption can make all the difference; BYTE.com; CMP Media LLC; (VERI-1605576—VERI-1605587).
Carr, J.; The Price of Access Is Eternal Vigilance-Security Sells Itself as Remote Connections Spread the Risk of Unauthorized Access to Corporate Data; Oct. 1995.
CCITT/ISO X.500 the Directory-Overview of Concepts, Models & Services; Dec. 2001.
CCITT "X.509 The Directory-Authentication Framework," Nov. 1988, 33 pages.
CDPD 1.1, Cellular Digital Packet System Specifications and Implementor Guidelines, v. 1.1, Jan. 19, 1995.
Cearley, Kent, et al., "Securing IT Resources with Digital Certificates and LDAP," 1997 CAUSE Annual Converence, 14 pages.
"Cellular Digital Packet Data System Specification," Release 1.0, Jul. 19, 1993, Book I of V, vol. I, Copyright 1993, 156 pages.
"Chapter 9: Using Kerberos," Sep. 1, 2006, 20 pages.
Chaum, David, "Achieving Electronic Privacy," Scientific American, Aug. 1992, pp. 96-101.
Chokhani, Santosh, "Toward a National Public Key Infrastructure," IEEE Communications Magazine, Sep. 1994, pp. 70-74.
Choudhury, A. et al.; Copyright Protection for Electronic Publishing Over Computer Networks; IEEE Network; May/Jun. 1995.
Chrysalis; Chrysalis-ITS; Canadian Department of National Defense Installs Integrated Information Security solutions from Chrysalis; Mergent International, and Northern Telecom (Nortel) Top Information Security Vendors Combine Solutions to Provide a High Level of Security to DND in Ottawa; Rocky Hill, Conn. (Apr. 19, 1996); (VERI-1605384—VERI-1605385).
Chrysalis; Seminerio, Maria; Chrysalis-ITS; Chrysalis to debut encryption token card; PC Week OnLine Oct. 30, 1996 (reprinted); (VERI-1605093—VERI-1605094).
Cisco Systems, Inc.; Single-User Network Access Security TACACS+; Mar. 1996.
Cisco; Single-User Network Access Security TACACS+; Mar. 1995.
Cisco, "User Guide for Cisco Secure Access Control Server 4.2 Overview," Feb. 2008, 11 pages.
Clercq, Jan De, "Smart Cards," Microsoft, 2013, 20 pages.
Coe et al. D.; Developing and Deploying Corporate Cryptographic Systems; Jul. 1995.
Coley, John A., "User Authentication: A State of the Art Review," Master's Thesis, Naval Postgraduate School, Sep. 1991, 134 pages.
"CompuServe Debuts 'Virtual Key'," CompuServe's Virtual Key Reference Site, Virtual Key Press Release, Columbus Ohio, Jun. 1996, 3 pages.
Communication News; NSA Provides Value-Added Crypto Security; May 1995.
Communications News; New Product Information; Dec. 1996; (VERI-1606981—VERI-1606983).

Community Connexion, Inc.; Stronghold Version 1.3 User's Guide; Community Connexion, Inc.; 1996; (CA956585-CA956614).
Community Connexion; Mailing list archives; Community ConneXion Announces Stronghold Version 1.2; Community ConneXion, Inc.; Jul. 16, 1996; (CA955577).
Comp.Security.UNIX; password encryption (security) over networks; Google Groups; 1994; (VERI-1605917—VERI-1605919).
Comp.Security.UNIX; secure ID cards; which is best?; Google Groups; 1994; (VERI-1605401—VERI-1605404).
Compumatica Secure Networks GmbH; CryptoGuard VPN System, Secured Connections via Shared Infrastructures; 2005.
"Computers at Risk: Safe Computing in the Information Age," National Academies Press, 1991, 320 pages.
Corner, "Internetworking with TCP/IP vol. I: Principles, Protocols, and Architecture," 1991.
Configuring Network Access Security; CISCO; May 14, 1996; 37pages.
Constance, P.; DISA Buys 180,000 Licenses for Navigator, *Government Computer News*; Jul. 1996.
Cormack, Andrew, "Web Security," JTAP JISC Technology Applications Programme, Jan. 1997, 22 pages.
Cox, Benjamin, et al., "NetBill Security and Transaction Protocol," Proceedings of the 1st USENIX Workshop on Electronic Commerce, Jul. 1995, pp. 77-88.
Croes, T.; LAN access worlds CONVERGE; Once-competing vendor camps are now borrowing from each other as business and Internet communities find common ground; Oct. 1995.
CryptoSwift; CryptoSwift Developer Frequently Asked Questions; Mar. 1997.
CryptoSwift; CryptoSwift Secure Server Accelerator Frequently Asked Questions; Apr. 1997.
Csinger, Andrew; Letters to the Editor; Certification: Up and Running; (Reprinted from Web Week, vol. 2, Issue 18, Nov. 18, 1996; (CA956617).
CTI; Letter to Roger Loyer with attachment (Electronic Distribution Facility: Response to BayBank Systems—Request for Proposal; Corporate Technologies, Inc.; Feb. 12, 1996; (CA955582-CA955597).
Curtin, M.; Introduction to Network Security; Mar. 1997.
Cybermark; CyberMark appoints chairman, CEO; Columbus Business First; Dec. 27, 1996; American City Business Journals Inc.; (VERI-1607123).
Cybermark; Frees, John; CEO Graham sees Cybermark as a "smart" career move; Columbus Business First; Jan. 3, 1997; American City Business Journals Inc. (VERI-1607124—VERI-1607125).
Cyberstore Systems Inc. et al.; InterMed and OpenMed: Open Systems for Secure Health Care Information Transaction; Mar. 31, 1995; (CA956497-CA956503).
Cyberstore Systems Inc. et al.; OpenMed: Open Systems for Secure Health Care Information Transaction; OpenMed Business Plan; Jul. 29, 1995; (CA956469-CA956496).
Davis, Beth; Digital Certificate Options Offered; TechwebNews; CMP Media Inc.; Jan. 27, 1997; (CA956616).
Davis, Beth; Security Check—Digital certificates slow to gain users, despite strides; TechwebNews; CMP Media Inc.; Feb. 10, 1997; (CA956615).
Davis, Don, "Compliance Defects in Public-Key Cryptography," May 29, 1996, 8 pages.
Davis, Don, et al., "Workstation Services and Kerberos Authentication at Project Athena," MIT, Mar. 17, 1989, 12 pages.
Davis, James, et al., "An Implementation of MLS on a Network of Workstations Using X.500/509," IEEE, 1997, 0-7803-3873-1/97, pp. 546-553.
Davis, R.; Network Authentication Tokens; Dec. 1989.
Dawson, Ed, et al., "Cryptography: Policy and Algorithms," Proceedings International Conference Brisbane, Queensland, Australia, Jul. 3-5, 1995, 11 pages.
Decker et al., "A General Packet Radio Service Proposed for GSM," Aachen University of Technology, Oct. 13, 1993, 12 pages.
Decker, "Packet Radio in GSM," Tech. Doc. SMG 4 58/93, ETSI, Communication Networks, Aachen University of Technology, Feb. 12, 1993, 8 pages

(56) References Cited

OTHER PUBLICATIONS

Deng, Robert H. et al., "Integrating Security in CORBA Based Object Architecture," May 1995, Proceedings 1995 IEEE Symposium on Security and Privacy, pp. 50-61.
Denning, "The Arpanet after Twenty Years," The Science of Computing, published in American Scientist 77, Nov.-Dec. 1989, pp. 530-535; 7 pages.
Dennis, Ronald M., "Internetworking: Integrating IP/ATM LAN/WAN Security," Thesis, Naval Postgraduate School, Sep. 1996, 194 pages.
Deswarte, Yves, et al., "Intrusion Tolerance in Distributed Computing Systems," IEEE, 1991, CH2986-8/91/0000/0110, pp. 110-121.
Dresser, Michael; Fast Start for Sprint Spectrum; Wireless Network has Signed 60,000 Customers, APC Says; Mar. 27, 1996; 2 pages.
Dresser, Michael; Ripken to Step to the Plate for APC's Sprint Spectrum; Orioles Star Will Appear in Ads for Phone Service; Mar. 29, 1996; 2 pages.
Duffy, Jim, et al. "Critics Question NIA's Credibility," Network World, vol. 14, No. 18, May 5, 1997, p. 1 & 122.
Duffy, J.; Livingston gets into 'Net game with new wares; Aug. 1995.
Eberspacher et al., "GSM—Architecture, Protocols and Services," Third Edition, John Wiley & Sons Ltd., Copyright 2009; 328 pages.
Edwards, Nigel, et al., "High Security Web Servers and Gateways," Hewlett Packard, Dec. 1996, 15 pages.
Elledge, Don, "Keep Out Prying Eyes," Information Week, May 5, 1997, pp. 102-104, 108-110.
E-Mail Responses by various; LDAP for logon?; May 1996; (CA133836-CA133842).
E-Mail Responses by various; strong authentication questions; May 1996; (CA134275-CA134277).
Entrust; Curry, Ian; Entrust Technologies; Entrust® Key Management Overview; Apr. 1996, Version 1.4; Entrust Technologies; (VERI-1605756—VERI-1605762).
Entrust; Entrust Technologies White paper; Implementing Cryptoki Libraries for Entrust®; Jun. 1997; Version 1.2; Entrust Technologies; (VERI-1605386—VERI-1605400).
ENTRUST; Press Release; Apple, IBM, JavaSoft, Motorola, Netscape, Nortel, Novell, RSA, and Silicon Graphics Announce PICA Crypto-Alliance; Redwood City, Calif.; Oct. 17, 1996; Northern Telecom; (VERI-1604986—VERI-1604989).
ENTRUST; Press Release; Choreo Systems and Northern Telecom (Nortel) Secure Networks Group Sign VAR Agreement; Ottawa, Canada; Aug. 28, 1995; Northern Telecom; (VERI-1604930—VERI-1604932).
ENTRUST; Press Release; Cowboys Call on Northern Telecom (Nortel) to Quarterback "Dallas Cowboys Online"; Dallas; Sep. 6, 1996; Northern Telecom; (VERI-1604981—VERI-1604983).
ENTRUST; Press Release; Devon Software Corp. Announces Kyberpass The First User Authenticating Firewall to Incorporate Northern Telecom's (Nortel) Entrust Data Security Software; Ottawa, ON.; Feb. 14, 1996; Northern Telecom; (VERI-1604952—VERI-1604954).
ENTRUST; Press Release; Digital Equipment Corporation to Resell Entrust Technologies? Enterprise Security Products; Ottawa; Apr. 29, 1997; Northern Telecom; (VERI-1605029—VERI-1605031).
ENTRUST; Press Release; Entrust Strengthens Data Security for Microsoft Exchange; Philadelphia; Apr. 7, 1997; Northern Telecom; (VERI-1605023—VERI-1605024).
ENTRUST; Press Release; Entrust Technologies Demonstrates Interoperability with Multiple Secure E-Mail Products; Philadelphia; Apr. 7, 1997; Northern Telecom; (VERI-1605018—VERI-1605020).
ENTRUST; Press Release; Entrust Technologies Launches Partner Program; Ottawa; Jan. 27, 1997; Northern Telecom; (VERI-1605010—VERI-1605014).
ENTRUST; Press Release; Entrust Technologies Names John Ryan CEO and Announces Headquarters; Jan. 27, 1997; Northern Telecom; (VERI-1605008—VERI-1605009).
ENTRUST; Press Release; Entrust Technologies Now Shipping Entrust/WebCA and Entrust/ICE; Philadelphia; Apr. 7, 1997; Northern Telecom; (VERI-1605021—VERI-1605022).
ENTRUST; Press Release; Entrust Technologies Sweeps Prestigious Awards at NetWorld+Interop; Las Vegas; May 7, 1997; Northern Telecom; (VERI-1605032—VERI-1605034).
ENTRUST; Press Release; Entrust Technologies Unveils Entrust/ICE Desktop Encryption Product; Jan. 27, 1997; Northern Telecom; (VERI-1605002—VERI-1605003).
ENTRUST; Press Release; Entrust Technologies? 3.0 Offers Users and Network Managers Unmatched Security and Greater Flexibility; Ottawa; Jun. 2, 1997; Northern Telecom; (VERI-1605036—VERI-1605038).
ENTRUST; Press Release; Entrust Technologies? New Toolkit Will Accelerate Deployment of Internet Applications; Ottawa; Apr. 28, 1997; Northern Telecom; (VERI-1605025—VERI-;1605028).
ENTRUST; Press Release; Entrust wins SCOAP awards of excellence; Ottawa; May 7, 1996; Northern Telecom; (VERI-1604964—VERI-1604967).
ENTRUST; Press Release; Entrust® Technologies' CAST Encryption Algorithm Now Available for Free Commercial and Non-commercial Use; Ottawa; Jan. 24, 1997; Northern Telecom (VERI-1694999—VERI-1605000).
ENTRUST; Press Release; Harbinger Chooses Nortel to Provide Security for Electronic Commerce Solutions Entrust-aware Product List Continues to Grow; Chicago, Illinois; May 15, 1996; Northern Telecom; (VERI-1604970—VERI-1604971).
ENTRUST; Press Release; Hewlett-Packard to use Nortel's Data Security Technology; Ottawa; Aug. 27, 1996; Northern Telecom; (VERI-1604979—VERI-1604980).
ENTRUST; Press Release; Hewlett-Packard Turns to Nortel for E-Mail Security Solution; San Francisco; Jan. 16, 1996; Northern Telecom; (VERI-1604947—VERI-1604948).
ENTRUST; Press Release; IBM Adds Nortel's Entrust Security software to Its Internet-Commerce Portfolio; Somers, N.Y.; Aug. 1, 1996; Northern Telecom; (VERI-1604974—VERI-1604976).
ENTRUST; Press Release; ICL and Nortel Announce Collaboration for Large-Scale Enterprise Network Security X.500 Directory Supports Entrust Security; Anaheim, California; Apr. 29, 1996; Northern Telecom; (VERI-1604955—VERI-1604956).
ENTRUST; Press Release; Information Security Corporation and Entrust Technologies Announce SecretAgent to Work with Entrust; Jan. 27, 1997; Northern Telecom; (VERI-1605015—VERI-1605017).
ENTRUST; Press Release; JetForm and Entrust Technologies Announce Worldwide Alliance to Provide Advanced Security Solutions for Forms-Based Workflow and Intranet Applications; San Francisco; Jan. 27, 1997; Northern Telecom; (VERI-1605004—VERI-1605007).
ENTRUST; Press Release; Linmor Information Systems Management Integrates Nortel Security Services into Nebula Network Management System (NMS); Dec. 20, 1995; Northern Telecom; (VERI-1604944—VERI-1604946).
ENTRUST; Press Release; Microsoft selects Northern Telecom's Entrust network security technology to provide security for Microsoft Exchange Server; Oct. 17, 1994; Nashville, TN; Northern Telecom; (VERI-1604911—VERI-1604912).
ENTRUST; Press Release; Nortel (Northern Telecom) forms Entrust Technologies to Focus on Enterprise Security Market; Dallas; Jan. 2, 1997; Northern Telecom; (VERI-1604996—VERI-1604998).
ENTRUST; Press Release; Nortel and LJL Enterprises Team to Offer Scalable and Secure E-Mail; Ottawa, Dec. 12, 1995; Northern Telecom; (VERI-16049242—VERI-1604943).
ENTRUST; Press Release; Nortel Endorses S/MIME Specification Company Developing Toolkit for Secure Messaging Applications; Anaheim, California; Apr. 30, 1996; Northern Telecom; (VERI-1604962—VERI-1604963).
ENTRUST; Press Release; Nortel Introduces Next Generation Software for Secure Data Communications: Entrust 2.0 Designed for Greater Efficiency and Ease of Use; San Francisco; Jan. 16, 1996; Northern Telecom; (VERI-1604949—VERI-1604951).

(56) References Cited

OTHER PUBLICATIONS

ENTRUST; Press Release; Nortel Issues Demonstration Certificates Available for Netscape Navigator 3.0; Chicago, Illinois; May 15, 1996; Northern Telecom; (VERI-1604968—VERI-1604969).

ENTRUST; Press Release; Nortel Issues Demonstration Certificates for Internet Products Free Certificates Enable SSL; San Jose; Apr. 30, 1996; Northern Telecom; (VERI-1604960—VERI-1604961).

ENTRUST; Press Release; Nortel Provides Data Security Technology to PayPro Network; Jun. 5, 1996; Northern Telecom (VERI-1604972—VERI-1604973).

ENTRUST; Press Release; Nortel Secure Networks Ships Version of Entrust Running on Windows, Macintosh and UNIX Platforms; Scalable Security Software Can be used Worldwide; Ottawa, Ontario; Jul. 31, 1995; Northern Telecom; (VERI-1604928—VERI-1604929).

ENTRUST; Press Release; Nortel Security Services Added to TradeWave Internet Solutions; Integrated Security and Public Key Management Now Available from Single Internet Services Vendor; Austin, Texas; Sep. 25, 1995; Northern Telecom; (VERI-1604933—VERI-1604935).

ENTRUST; Press Release; Nortel Unveils Next Level of Entrust Software for Secure Data Communications New Certificate Management Features Set Entrust 2.1 Apart; Ottawa, Aug. 19, 1996; Northern Telecom; (VERI-1604977—VERI-1604978).

ENTRUST; Press Release; Nortel's Entrust Data Security Software Chosen by Canadian Government to Provide Public-Key Infrastructure; Ottawa; Sep. 16, 1996; Northern Telecom; (VERI-1604984—VERI-1604985).

ENTRUST; Press Release; Northern Telecom (Nortel) and Milkyway Networks Introduce Security Solution to Business Internet Users; Ottawa; Nov. 7, 1995; Northern Telecom; (VERI-1604939—VERI-1604941).

ENTRUST; Press Release; Northern Telecom (Nortel) and Tandem Sign Agreement Adding Entrust Security Technology to Tandem's Internet Commerce Offering; Ottawa; Nov. 15, 1996; Northern Telecom (VERI-1604994—VERI-1604995).

ENTRUST; Press Release; Northern Telecom (Nortel) First in North America to Receive Computer Security Validation: Entrust Certified by U.S. and Canadian Agencies; Baltimore, Md; Oct. 10, 1995; Northern Telecom; (VERI-1604936—VERI-1604938).

ENTRUST; Press Release; Northern Telecom (Nortel) Introduces Web-Based Security Software Product Entrust/WebCA Enables Web Session Security; Dallas; Nov. 11, 1996; Northern Telecom; (VERI-1604992—VERI-1604993).

ENTRUST; Press Release; Northern Telecom and ZOOMIT Corporation Announce Secure Encryption and Authentication for Windows-Based LAN E-Mail Applications; Mar. 22, 1994; Nashville, Tenn.; Northern Telecom; (VERI-1604908—VERI-1604910).

ENTRUST; Press Release; Northern Telecom introduces network security solution to safeguard data privacy and authenticity; Mar. 22, 1994; Washington, D.C.; Northern Telecom; (VERI-1604906—VERI-1604907).

ENTRUST; Press Release; Northern Telecom's Entrust Network Security Product to Support National Semiconductor's iPower PersonaCard Hardware Token; Nov. 29, 1994; Boston, Mass.; Northern Telecom; (VERI-1604913—VERI-1604914).

ENTRUST; Press Release; NYCE Chooses Nortel's Entrust as Network Security Solution Software; Dallas; Oct. 29, 1996; Northern Telecom; (VERI-1604990—VERI-1604991).

ENTRUST; Press Release; Salomon Brothers Chooses Entrust Product Suite as Data Security Solution; New York; May 27, 1997; Northern Telecom; (VERI-1605034—VERI-1605035).

ENTRUST; Press Release; Symantec and Nortel Team to Provide Secure Electronic Forms for Enterprises; Anaheim, California; Apr. 29, 1996; Northern Telecom; (VERI-1604957—VERI-1604959).

ENTRUST; Press Releases; Control Data adds Nortel (Northern Telecom) Secure Networks' public-key security product to message integration solution; Entrust to provide Mail*Hub with security services for electronic commerce; New Orleans, LA; May 8, 1995; Northern Telecom; (VERI-1604919—VERI-1604921).

ENTRUST; Press Releases; Department of National Defence awards contract to Northern Telecom and ZOOMIT for secure e-mail system; Toronto, Ontario; Mar. 22, 1995; Northern Telecom; (VERI-1604917—VERI-1604918).

ENTRUST; Press Releases; New network security system provides private, secure data communications using Nortel's Entrust product; Ottawa, May 15, 1995; Northern Telecom; (VERI-1604925—VERI-1604927).

ENTRUST; Press Releases; Northern Telecom licenses security token technology from Chrysalis ITS for hardware extensions to Entrust network security; Redwood Shores, CA; Jan. 9, 1995; Northern Telecom; (VERI-1604915—VERI-1604916).

ENTRUST; Press Releases; Shana and Nortel (Northern Telecom) Secure Networks announce Informed's support for Entrust; Collaboration offers authentication for Macintosh and Windows forms; New Orleans; LA; May 8, 1995; Northern Telecom; (VERI-1604922—VERI-1604924).

Ericsson CH337, Handheld Telephone for the PCS 1900 Network, User's Manual, First Edition, Jun. 1995, 52 pages.

Ericsson Mobile Phone CH 337, First Edition, Jun. 1995, 21 pages.

ETSI, "DCS1800 Base Station Specifications," GSM 11.20-DCS v. 3.13.0, Feb. 1996, 115 pages.

ETSI, "Digital European Cordless Telecommunications," parts 1-8, 1992-1996, 869 pages.

ETSI, "Digital Video Broadcasting," EN 300 744 V1.1.2, Aug. 1997, 47 pages.

ETSI/TC SMG, "General on Supplementary Services," Recommendation GSM 02.04, ETSI/PT 12, Feb. 1992, 21 pages.

ETSI/TC SMG, "Types of Mobile Stations," Recommendation GSM 02.06, ETSI/PT 12, Feb. 1992, 6 pages.

ETSI GSM, "Security Aspects," Recommendation GSM 02.09, ETSI/PT 12, Feb. 1992, 35 pages.

ETSI/TC GSM, "Security Aspects," Recommendation GSM 02.09, ETSI/PT 12, Released May 1993, Updated Jun. 1993, 10 pages.

ETSI/TC SMG, "Service Accessibility," Recommendation GSM 02.11, ETSI/PT 12, Nov. 1992, 9 pages.

ETSI/TC SMG, "Subscriber Identity Modules, Functional Characteristics," Recommendation GSM 02.17, ETSI/PT 12, Feb. 1992, 13 pages.

ETSI PT12, "Collection Charges," Recommendation GSM 02.20, Feb. 1992, 28 pages.

ETSI/TC SMG, "Network Functions," Recommendation GSM 03.01, ETSI/PT 12, Feb. 1992, 15 pages.

ETSI/TC SMG, "Network Architecture," Recommendation GSM 03.02, ETSI/PT 12, Feb. 1992, 22 pages.

ETSI/TC SMG, "Organization of Subscriber Data," Recommendation GSM 03.08, ETSI/PT 12, Feb. 1992, 22 pages.

ETSI/TC SMG, "Location Registration Procedures," Recommendation GSM 03.12, ETSI/PT 12, Feb. 1992, 13 pages.

ETSI/TC SMG, "Security-related Network Functions," Recommendation GSM 03.20, ETSI/PT 12, Feb. 1992, 48 pages.

ETSI/TC SMG, "Mobile Radio Interface Layer 3 Specification," Recommendation GSM 04.08, ETSI/PT 12, Feb. 1992, 453 pages.

ETSI/TC SMG, "Mobile Application Part Specification," Recommendation GSM 09.02-DCS, ETSI/PT 12, Feb. 1992, 22 pages.

ETSI/TC SMG, "Home Location Register Specification," Report GSM 11.31, ETSI/PT 12, Feb. 1992, 12 pages.

ETSI/TC SMG, "Visitor Location Register Specification," Report GSM 11.32, ETSI/PT 12, Feb. 1992, 18 pages.

ETSI/TC GSM, "Mobile Application Part Specification," Recommendation GSM 09.02, Jan. 1991, 43 pages.

ETSI/TC GSM, "Mobile Application Part," Recommendation GSM 09.02, ETSI/PT 12, Jan. 1991, 92 pages.

ETSI, "3GPP TS 23.060 version 7.11.0 Release 7," ETSI TS 123 060 v7.11.0, Jun. 2011, 220 pages.

ETSI,"General Packet Radio Service (GPRS) Enhancements for Evolved Universal Terrestrial Radio Access Network (E-UTRAN) access," Release 8, 3GPP TS 23.401 v8.18.0, Mar. 2013, 239 pages.

ETSI, "3GPP TS 23.401 version 9.15.0 Release 9," ETSI TS 123 401 v9.15.0, Apr. 2013, 259 pages.

ETSI, "GSM 03.34 Proposed Version 1.0.0," Oct. 1996, 20 pages.

European Telecommunications Standard, ETS 300 175-1, Radio Equipment and Systems (RES), Digital European Cordless Telecom-

(56) References Cited

OTHER PUBLICATIONS munications (DECT), Common Interface, Part 1: Overview, JDG_PRISM_INV_0015107-135, Oct. 1992, 29 pages.
European Telecommunications Standard, ETS 300 175-2, Radio Equipment and Systems (RES), Digital European Cordless Telecommunications (DECT), Common Interface, Part 2: Physical Layer (PHL), JDG_PRISM_INV_0015136-183, Jun. 1996, 48 pages.
European Telecommunications Standard, ETS 300 175-2, Radio Equipment and Systems (RES), Digital European Cordless Telecommunications (DECT), Common Interface, Part 2: Physical Layer (PHL), JDG_PRISM_INV_0015184-222, Oct. 1992, 39 pages.
European telecommunic-ations Standard, ETS 300 175-3, Radio Equipment and Systems (RES), Digital European Cordless Telecommunications (DECT), Common Interface, Part 3: Medium Access Control (MAC) Layer, JDG_PRISM_INV_0015223-422, Sep. 1996, Second Edition, 200 pages.
European Telecommunications Standard, ETS 300 175-4, Radio Equipment and Systems (RES), Digital European Cordless Telecommunications (DECT), Common Interface, Part 4: Data Link Control (DLC) Layer, JDG_PRISM_INV_0015423-558, Sep. 1996, Second Edition, 136 pages.
European Telecommunications Standard, ETS 300 175-5, Radio Equipment and Systems (RES), Digital European Cordless Telecommunications (DECT), Common Interface, Part 5: Network Layer, JDG_PRISM_INV_0015559-795, Oct. 1992, 237 pages.
European Telecommunications Standard, ETS 300 175-6, Radio Equipment and Systems (RES), Digital European Cordless Telecommunications (DECT), Common Interface, Part 6: Identities and Addressing, JDG_PRISM_INV_0015796-836, Oct. 1992, 41 pages.
European Telecommunications Standard, ETS 300 175-7, Radio Equipment and Systems (RES), Digital European Cordless Telecommunications (DECT), Common Interface, Part 7: Security Features, JDG_PRISM_INV_0015837-936, Sep. 1996, Second Edition, 100 pages.
European Telecommunications Standard, ETS 300 175-8, Radio Equipment and Systems (RES), Digital European Cordless Telecommunications (DECT), Common Interface, Part 8: Speech Coding and Transmission, JDG_PRISM_INV_0015937-975, Sep. 1996, Second Edition, 39 pages.
European Telecommunications Standard, ETS 300 910—GSM 05.05, Version 5.3.1, Digital Cellular Telecommunications System (Phase2+), Radio Transmission and Reception, Apr. 1997, 48 pages.
European Telecommunications Standards Institute; "European Digital Cellular Telecommunications System (Phase 1); Security-Related Network Functions (GSM 03.20);" Feb. 1992; 48 pages.
European Telecommunications Standards Institute; "European Digital Cellular Telecommunications System (Phase 2); Mobile Application Part (MAP) Specification (GSM 09.02);" 1995; 804 pages.
European Telecommunications Standards Institute; "European Digital Cellular Telecommunications System (Phase 2); Mobile-Services Switching Centre—Base Station System (MSC—BBS) Interface Layer 3 Specification (GSM 08.08);" 1995; 104 pages.
European Search Report dated Nov. 3, 2004 of European Application No. 01112859.2; (VERI-1606092—VERI-1606094).
FCC Application for Wireless Telecommunications Bureau Radio Service Authorization; Nov. 25, 1996; 9 pages.
Federal Communications Commission; In the Matter of Amendment of the Commission's Rules to Establish New Personal Communications Services; Reply Comments of Omnipoint Communications, Inc.; Jun. 25, 1992; 97 pages.
Federal Communications Commission; In the Matter of Amendment of the Commission's Rules to Establish New Personal Communications Services; Tentative Decision and Memorandum Opinion and Order; Nov. 6, 1992; 26 pages.
Federal Communications Commission; In the Matter of Amendment of the Commission's Rules to Establish New Personal Communications Services; Reply Comments of Omnipoint Communications, Inc.; Mar. 1, 1993; 122 pages.
Federal Communications Commission; In the Matter of Implementation of Section 6002(b) of the Omnibus Budget Reconciliation Act of 1993; Annual Report and Analysis of Competitive Market Conditions with Respect to Commercial Mobile Services; FCC 00-289; Aug. 18, 2000; 183 pages.
Federal Communications Commission; In the Matter of Implementation of Section 6002(b) of the Omnibus Budget Reconciliation Act of 1993; Second Annual Report and Analysis of Competitive Market Conditions with Respect to Commercial Mobile Services; FCC 97-75; Mar. 25, 1997; 89 pages.
Federal Communications Commission; In the Matter of Request of Omnipoint Communications, Inc. For a Pioneer's Preference in the Licensing Process for Personal Communications Services; Request for a Pioneer's Preference; May 4, 1992; 84 pages.
Federal Computer Week; Elizabeth Sikorovsky; Xcert aims to simplify public key infrastructure. (Xcert Software's Sentry Certification Authority data security software) (Product Announcement); vol. 10, Issue 17, Jul. 1, 1996 (CA956511).
Felix, "Packet Switching in Digital Cellular Systems," Jun. 1988, Proceedings of the 38th IEEE Vehicular Technology Conference, pp. 414-418; 6 pages.
Fiat, Amos, et al., "How to Prove Yourself: Practical Solutions to Identification and Signature Problems," Lecture Notes in Computer Science, Aug. 11, 1986, pp. 186-194.
FIBS PUB 190—*Guideline for the Use of Advanced Authentication Technology Alternatives*, US Department of Commerce/National Institute of Standards and Technology, Sep. 28, 1994.
Fieier et al.; The SSL Protocol Version 3.0; Mar. 1996.
Findlay, D., et al., "3G Interworking With Wireless LANS," 3G Mobile Communication Technologies, May 2002, Conference Publication No. 489, IEE, pp. 394-399.
Finseth, C.; RFC 1492—An Access Control Protocol, Sometimes Called TACACS; Jul. 1993.
Fischer International; Smarty; Smarty™ Smart Card Reader; Executive Summary; Fischer International Systems Corporation; 1997; (VERI-1606164—VERI-1606174).
Ford, Warwick; Computer Communications Security: Principles, Standard Protocols and Techniques; PTR Prentice Hall; 1994; (CA956622-CA957126).
Fox, Armando; Gribble, Steven; Security on the Move: Indirect Authentication Using Kerberos; University of California at Berkeley, 1996; 11 pages.
Frankel et al., "Enhanced Security Protocols for the CDPD Network, Security Issues in a CDPD Wireless Network," IEEE Personal Communications, Aug. 1995, 13 pages.
Franks et al.; RFC 2069—An Extension to HTTP: Digest Access Authentication; Jan. 1997.
Freier et al.; The SSL Protocol Version 3.0 draft-freier-ssl-version3-02.txt; Nov. 1996.
Freier et al.; The SSL Protocol Version 3.0, Internet Draft http://wp.netscape.com/eng/ssl3/ssl-toc.html; Mar. 1996.
Fruth, P.; Product Update: CE Software Quickmail 3.5; Nov. 1995.
Galvin, Peter; Practicing what I preach: How I set up a secure e-commerce site; Security: Pete's Wicked World; 1997; (CA957611-CA957615).
Galvin, Peter; Trials and tribulations of building an e-commerce server; Security: Pete's Wicked World; Apr. 1997; (CA955821-CA955828).
Ganesan, Ravi, "The Yaksha Security System," Communications of the ACM, Mar. 1996, vol. 39, No. 3, pp. 55-60.
Ganesan, Ravi, "Yaksha: Augmenting Kerberos with Public Key Cryptography," IEEE, 1995, 0-8186-7027-4/95, pp. 132-143.
Garfinkel, Simson et al.; Practical UNIX Security; O'Reilley & Associates, Inc.; 1991; 494 pages.
Garfinkel, Simson et al.; Practical UNIX & Internet Security 2nd ed.; O'Reilley & Associates, Inc.; 1996; 1018 pages.
Garg, "IS-95 CDMA and cdma2000 Cellular/PCS Systems Implementation," Prentice Hall PTR, Copyright 2000, 442 pages.
Gaskell et al.; RFC 71.0—Improved Security for Smart Card Use in DCE; Feb. 1995.
Gaskell, G. et al., Integrating Smart Cards Into Authentication Systems; Cryptography: Policy and Algorithms; 1996; Lecture Notes in Computer Science, vol. 1029, pp. 270-281.

(56) References Cited

OTHER PUBLICATIONS

Gaskell; Integrating Smart Cards into Kerberos; Feb. 2000.
Gauntlet™ 3.1 for IRIX™ Administrator's Guide for IRIX 5.3; Document No. 007-2826-002; Silicon Graphics, Inc.; 1996; (CA954783-CA955015).
Gauntlet™ 3.1.1 for IRIX™ 6.2 Administrator's Guide; Document No. 007-2826-003; Silicon Graphics, Inc.; 1996; (CA955016-CA955263).
GE Information Services; New Generations of Secure Internet Commerce Unveiled by GE Information Services; GE Information Services; Feb. 6, 1996; (CA955607-CA955609).
GIF Wizard, "Accelerate your website!," http://uswest.gifwizard.com, Jan. 11, 1998 accessed via the wayback machine.
GIF Wizard, "GIF Wizard Single URL/File Compression," http://uswest.gifwizard.com/PGW?task=singleurlfile&SP=wmgFdUAZE26dbTeZes, Jan. 11, 1998 accessed via the wayback machine.
Gifford et al.; Payment Switches for Open Networks; Jul. 1995.
Global.H—RSAEURO types and constants; J.S.A. Kapp 1994-1996; (VERI-0015459—VERI-0015460).
Going Public the IPO Reporter; Securities Data Publishing; 1996; (CA956278-CA956328).
Goldberg, D.; The MITRE User Authentication System; Aug. 1990.
GPRS 03.60 v.1, "Digital Cellular Telecommunications system," (Phase 2+), Jan. 31, 1997; 81 pages.
GPRS 03.60 v.2, "Digital Cellular Telecommunications system," (Phase 2+), May 29, 1997, 93 pages.
GPRS 03.64, "Digital Cellular Telecommunications system-General Packet Radio Service v. 2.1.1," May 1997, 55 pages.
GPRS 03.64, "Digital Cellular Telecommunications system—General Packet Radio Service v. 6.0.0," Apr. 1998, 54 pages.
Gregg, Rick; "email to Sandeep Giri and Tim Goeke, Re: Site Testing;" Jun. 15, 1996; 3 pages.
Griswold, Gary N., "A Method for Protecting Copyright on Networks," Interactive Multimedia Association Intellectual Property Proceedings, Apr. 2-3, 1993.
Griswold, Gary N., "A Method for Protecting Copyright on Networks," CNI Coalition for Networked Information, printed Jun. 18, 2013 from old.cni.org/docs/ima.ip-workshop/Griswold.html; 7 pages.
Grover, Derrick, eds., "The Protection of Computer Software—its Technology and Applications," 1989, 1990, 1992.
GSM Technical Specification, GSM 05.05, Version 5.0, Digital Cellular Telecommunications System (Phase 2+), Radio Transmission and Reception, JDG_PRISM_INV_0016127-174, Mar. 1996, 48 pages.
GSM 09.10, "Digital Cellular Telecommunications Systems," Version 5.0.0, Mar. 1996, 43 pages.
GSm 09.10, "Digital Cellular Telecommunications Systems," Version 5.1.0, May 1996, 44 pages.
GSM, "Procedures", GSM 09.02, Jan. 1991, 16 pages.
GSM, "Location Registration/Cancellation," GSM 09.02, Jan. 1991, 92 pages.
GSM, "Handling of Supplementary Services," GSM 09.02, Jan. 1991, 73 pages.
GSM, "Retrieval of Subscriber Parameters During Call Set-up," GSM 09.02, Jan. 1991, 80 pages.
GSM, "Handover," GSM 09.02, Jan. 1991, 61 pages.
GSM, "Subscriber Management," GSM 09.02, Jan. 1991, 37 pages.
GSM, "Operation and Maintenance," GSM 09.02, Jan. 1991, 55 pages.
GSM, "Fault Recovery of Location Registers," GSM 09.02, Jan. 1991, 25 pages.
GSM, "Management of International Mobile Equipment Identities," GSM 09.02, Jan. 1991, 8 pages.
GSM, "Authentication," GSM 09.02, Jan. 1991, 28 pages.
GSM, "Management of Security Related Functions," GSM 09.02, Jan. 1991, 13 pages.
GSM, "Identity Management," GSM 09.02, Jan. 1991, 24 pages.
GSM, "Procedures for Supporting Short Message Services," GSM 09.02, Jan. 1991, 64 pages.
GSM, "Access Management Procedures," GSM 09.02, Jan. 1991, 23 pages.
GSM, "Search and Paging Procedures," GSM 09.02, Jan. 1991, 34 pages.
GSM, "Map Protocol Specifications," GSM 09.02, Jan. 1991, 163 pages.
GSM, "Mapping on TC Services," GSM 09.02, Jan. 1991, 46 pages.
GSM, "GSM 09.02—Version 3.8.0," Jan. 1991, 6 pages.
Haller et al., "A One-Time Password System," Request for Comments 1938 (RFC 1938), May 1996, 18 pages.
Haller, N.; RFC 1704—On Internet Authentication; Oct. 1994.
Haller, N.; RFC 1760—The S/Key One-Time Password System; Feb. 1995.
Hamalainen et al., "Packet Data over GSM Network," ETSI, Technical Document SMG 1 238/93, Sep. 28, 1993, 9 pages.
Hamalainen et al., "Proposed Operation of GSM Packet Radio Networks," IEEE, Sep. 1995, pp. 372-377; 7 pages.
Hamzeh, Kory, et al.; "Point-to-Point Tunneling Protocol—PPTP;" draft-ietf-pppext-pptp-02.txt; Jul. 1997; 63 pages.
Harreld, Heather; V-ONE launches its new federal division; fcw.com; Mar. 3, 1997; (CA957465-CA-957466).
Haverinen, H. et al.; Authentication and Key Generation for Mobile IP Using GSM Authentication and Roaming; IEEE, 2001, pp. 2453-2457.
Hayes, Jeff, "Policy-Based Authentication and Authorization: Secure Access to the Network Infrastructure," Proceedings 16th Annual Computer Security Applications Conference, Dec. 2000, IEEE, 1063-9527/00, pp. 328-333.
Heilbronner, Stephen, "Nomadic Computing Systems on the Internet-Infrastructure and Management Requirements," Mar. 31, 1997, 11 pages.
Herzberg, Amir, et al., "Public Protection of Software," ACM Transactions on Computer Systems, vol. 5, No. 4, Nov. 1987, pp. 371-393.
Hinnebusch, Mark; Z39.50 Implementors Workshop; Aug. 8, 1996; (CA956529-CA956531).
"Historical Overview of the Card Industry," presented at CARDTECH/SECURTECH 1998, Apr. 27, 1998, http://www.hightechaid.com/tech/card/card_history.htm, 8 pages.
Hoover, D.N., et al., "Software Smart Cards via Cryptographic Camouflage," IEEE, 1081-6011/99, 1999, 8 pages.
Hornig, "A Standard for the Transmission of IP Datagrams over Ethernet Networks," RFC 894; Apr. 1984; 4 pages.
Housley, R., Guidelines to Authors of Internet-Drafts, http://www.ietf.org/ietf-ftp/1id-guidelines.html, Dec. 7, 2010, 12 pages.
Howes et al.; CITI Technical Report 95-7; A Scalable, Deployable Directory Service Framework for the Internet; Jul. 1995.
Howes et al.; RFC 1823—The LDAP Application Program Interface; Aug. 1995.
Howes et al.; The LDAP URL Format (Internet Draft); Draft-ieff-asid-Idapv3-url-00.txt; Mar. 1997.
Howes, T.; An X.500 and LDAP Database: Design and Implementation; Dec. 2003.
Howes, T.; CITI Technical Report 95-8; The Lightweight Directors Access Protocol: X.500 Lite; Jul. 1995.
Hunwick, T.; RFC 8.2—Security Requirements for DCE; Aug. 1996.
IBM; An Introduction to Wireless Technology; International Technical Support Organization Raleigh Center; Oct. 1995; 209 pages.
IBM; Introduction to DCE; 1996.
IBM; Presentation at the Securities Industry Middleware Council, re DCE RFC 68.4 Update; Feb. 1999.
"Id Software's QUAKE to Explode Online and at Retail; For the First Time, id Will Distribute Their Own Game at Retail; Shareware Version to Contain Full Version Encrypted on CD-ROM," Business Wire, May 13, 1996, 2 pages.
IEEE 802.1D, ANSI/IEEE Standard, "Part 3: Media Access Control (MAC) Bridges," 1998 Edition.
IEEE Standard for Ethernet; IEEE Computer Society; IEEE Std 802.3; Dec. 28, 2012; 1415 pages.
IEEE 802.11, ANSI/IEEE Standard, "Part 11: Wireless LAN Medium Access Control (MAC) and Physical Layer (PHY) Specifications," Jun. 1997, 461 pages.

(56) References Cited

OTHER PUBLICATIONS

IEEE 802.11, ANSI/IEEE Standard, "Part 11: Wireless LAN Medium Access Control (MAC) and Physical Layer (PHY) Specifications," 1999 Edition.
InfoDev-Security.net; Chapter 5. Identification and Authentication; 2003.
"Internet Protocol DARPA Internet Program Protocol Specification," Information Sciences Institute, RFC 791; Sep. 1981; 40 pages.
Iqbal, et al., "Packet Level Access Control Scheme for Internetwork Security," IEE Proceedings-1, vol. 139, No. 2, Apr. 1992, pp. 165-175.
IRE; IRE and CyberGuard Announce Virtual Private Network Security Solution for Enabling Low Cost Internet Business Communication; SafeNet/Enterprise—Enables the Secure Use of Public Networks for Private Business Transactions; Atlanta, GA (Sep. 17, 1996); Information Resource Engineering, Inc.; (VERI-1606027—VERI-1606029).
IRE; News Release; Dan Mosley Joins IRE Advisory Board; Baltimore, Maryland; Mar. 10, 1997; Information Resource Engineering; (VERI-1605847—VERI-1605848).
IRE; News Release; Former United States Treasury Secretary to Chair IRE Advisory Board; Baltimore, Maryland; Feb. 5, 1997; Information Resource Engineering; (VERI-1605855—VERI-1605856).
IRE; News Release; France Telecom's Nexus International Joins IRE to Expand Brazil's Network Security Market; Baltimore, Maryland; Nov. 18, 1997; Information Resource Engineering; (VERI-1605883—VERI-1605884).
IRE; News Release; Industry Executive Joins IRE to Lead OEM Effort; Interest in Low-Cost SafeNet Technology Results in New Sales Channel; Baltimore, Maryland; Sep. 17, 1997; Information Resource Engineering; (VERI-1605808—VERI-1605809).
IRE; News Release; Internet Security for the Millennium Available Now; Year 2000 Compliance Makes SafeNet™ the Security Solution for Tomorrow's Electronic Business; Baltimore, Maryland; Dec. 4, 1997; Information Resource Engineering; (VERI-1605845—VERI-1605846).
IRE; News Release; IRE adds International Sales VP; Baltimore, Maryland; Nov. 12, 1996; Information Resource Engineering; (VERI-1605869).
IRE; News Release; IRE and Analog Devices to Provide Low-Cost, Secure Communications Chip for Electronic Commerce; Jan. 9, 1997; Information Resource Engineering; (VERI-1605857—VERI-1605859).
IRE; News Release; IRE and Cyberguard Partner to Provide Complete Security Solution for Internet Business Communication; Aug. 8, 1996; Information Resource Engineering; (VERI-1605880—VERI-1605882).
IRE; News Release; IRE and Lockheed Martin IS&T Form Strategic Alliance to Offer Turn-Key Secure Electronic Commerce; Jul. 16, 1997; Information Resource Engineering; (VERI-1605817—VERI-1605818).
IRE; News Release; IRE and MCI Announce Sales and Marketing Agreement for Secure Internet Products and Services; Nov. 14, 1996; Information Resource Engineering; (VERI-1605867—VERI-1605868).
IRE; News Release; IRE Announces Montgomery Securities as Investment Banking Adviser and Market Maker; Baltimore, Maryland; Jan. 6, 1997; Information Resource Engineering; (VERI-1605862).
IRE; News Release; IRE Announces New Chief Financial Officer; Baltimore, Maryland; Jul. 21, 1997; Information Resource Engineering; (VERI-1605816).
IRE; News Release; IRE Debuts SafeNet™ Partner Program, Increases Availability of Industry-Leading Internet Security Solutions; Information Resource Engineering; Baltimore, Maryland; Oct. 21, 1997; (VERI-1605899—VERI-1605900).
IRE; News Release; IRE Demonstrates Standard Compliant/Public Key Leadership for Internet Virtual Private Networks; Industry test shows SafeNet/Enterprise capable of secure Internet interoperability; Baltimore, Maryland; Feb. 11, 1997; Information Resource Engineering; (VERI-1605853—VERI-1605854).
IRE; News Release; IRE Frame Relay Encryptor Makes Business on High Speed Computer Networks a Reality; SafeNet/Frame Currently Showcasing at NetWorld+Interop; Baltimore, Maryland; May 8, 1997; Information Resource Engineering; (VERI-1605827—VERI-1605828).
IRE; News Release; IRE Introduces Encryption Software for Windows; Baltimore, Maryland; Apr. 24, 1997; Information Resource Engineering; (VERI-1605834—VERI-1605835).
IRE; News Release; IRE Products to Secure Virtual Banking System in Argentina; Baltimore, Maryland; Aug. 6, 1997; Information Resource Engineering; (VERI-1605814—VERI-1605815).
IRE; News Release; IRE Receives Patent for Secure Portable Modem; Baltimore, Maryland; Sep. 9, 1996; Information Resource Engineering; (VERI-1605878—VERI-1605879).
IRE; News Release; IRE Reports 1996 Financial Results; Baltimore, Maryland; Mar. 24, 1997; Information Resource Engineering; (VERi-1605839—VERI-1605840).
IRE; News Release; IRE Reports Improved Financial Results; Baltimore, Maryland; Mar. 12, 1997; Information Resource Engineering; (VERI-1605825—VERI-1605826).
IRE; News Release; IRE Reports Strong Financial Growth; Baltimore, Maryland; Aug. 11, 1997; Information Resource Engineering; (VERI-1605812—VERI-1605813).
IRE; News Release; IRE Reports Third Quarter Results; Baltimore, Maryland; Nov. 14, 1996; Information Resource Engineering; (VERI-1605865—VERI-1605866).
IRE; News Release; IRE SafeNet Products Protect Consumer Credit Applications on the Internet; Baltimore, Maryland; Sep. 3, 1997; Information Resource Engineering; (VERI-1605810—VERI-1605811).
IRE; News Release; IRE SafeNet™ Products to Protect GTE's Internet-based Crime Fighting Service; Information Resource Engineering; Baltimore, Maryland; Oct. 29, 1997; (VERI-1605897—VERI-1605898).
IRE; News Release; IRE ships 3,000$^{th}$ SafeNet? Product for secure Intranet use; Baltimore, Maryland; May 23, 1996; Information Resource Engineering; (VERI-1605800—VERI-1605801).
IRE; News Release; IRE Significantly Expands Distribution in Latin America Adds Eight Major Distribution Channels; Baltimore, Maryland; Jun. 3, 1997; Information Resource Engineering; (VERI-1605819—VERI-1605820).
IRE; News Release; IRE Smartcard/Readers to be Used in U.S. Treasure Electronic Check Pilot Program; Baltimore, Maryland, Oct. 8, 1997; Information Resource Engineering; (VERI-1605804—VERI-1605805).
IRE; News Release; IRE Subsidiary Introduces Highly Secure Frame Relay Encryptor for Computer Transmission; Both 128-bit and DES Algorithms Are Offered; Baltimore, Maryland; Mar. 12, 1997; Information Resource Engineering; (VERI-1605843—VERI-1605844).
IRE; News Release; IRE Subsidiary Wins Contract; Will Secure Swiss Electronic Payment System; Baltimore, Maryland; Nov. 12, 1997; Information Resource Engineering; (VERI-1605893—VERI-1605894).
IRE; News Release; IRE Takes Lead in Building Secure Foundation for Electronic Commerce on the Internet; Partners with NIST to Develop Public Key Standards; Baltimore, Maryland; Jul. 24, 1996; Information Resource Engineering; (VERI-1605885—VERI-1605886).
IRE; News Release; IRE to Expand Distribution Channels in the U.S.; Names New Sales Executive to Lead the Development; Baltimore, Maryland; May 20, 1997; Information Resource Engineering; (VERI-1605823—VERI-1605824).
IRE; News Release; IRE to Penetrate Japanese Market Through Distribution Agreement with Kanematsu; Baltimore, Maryland; Mar. 31, 1997; Information Resource Engineering; (VERI-1605836—VERI-1605838).
IRE; News Release; IRE to Product Revolutionary Low-Cost Secure Communications Chip; Baltimore, Maryland; Jan. 9, 1997; Information Resource Engineering; (VERI-1605860—VERI-1605861).

(56) References Cited

OTHER PUBLICATIONS

IRE; News Release; IRE to Showcase Low Cost Smartcard Security Token; Baltimore, Maryland; May 1, 1997; Information Resource Engineering; (VERI-1605832—VERI-1605833).

IRE; News Release; IRE's Highly Secure Encryption Systems Now Available for Sale Worldwide; Company Receives Export Approval from Commerce Department; Baltimore, Maryland; Mar. 14, 1997; Information Resource Engineering; (VERI-1605841—VERI-1605842).

IRE; News Release; IRE's Internet Security Center Now On-Line Appoints Dr. Garry Meyer as Managing Director; Baltimore, Maryland; Jul. 11, 1996; Information Resource Engineering; (VERI-1605887—VERI-1605888).

IRE; News Release; IRE's Internet Security System Chosen as Best of Show Finalist for Interop 1996; Baltimore, Maryland; Sep. 16, 1996; Information Resource Engineering; (VERI-1605821—VERI-1605822).

IRE; News Release; IRE's MMCI Relationship Likely to Become Marketing Alliance; Baltimore, Maryland; Oct. 18, 1996; Information Resource Engineering; (VERI-1605870—VERI-1605871).

IRE; News Release; IRE's SafeNet™ Products Achieve Interoperability in Industry Workshop; Baltimore, Maryland, Oct. 15, 1997; Information Resource Engineering; (VERI-1605802—VERI-1605803).

IRE; News Release; SafeNet Certified as Providing Strongest Security for Internet; New Designation to Give IRE a Competitive Edge; Baltimore, Maryland; Nov. 24, 1997; Information Resource Engineering; (VERI-1605863—VERI-1605864).

IRE; News Release; State of Maryland Services to Go On-Line Using IRE SafeNet™ Products; Vehicle Registration Among Government Services to be Available on the Internet; Baltimore, Maryland; Sep. 22, 1997; Information Resource Engineering; (VERI-1605806—VERI-1605807).

IRE; News Release; Strong SafeNet™ Sales Result in Third Quarter Revenue Growth for IRE; Information Resource Engineering; Baltimore, Maryland; Nov. 6, 1997; (VERI-1605895—VERI-1605896).

IRE; News Release; Sun Microsystems Internet Commerce Group and IRE to Link and Distribute Products for Secure Commerce on the Internet; Apr. 2, 1996; Information Resource Engineering; (VERI-1605891—VERI-1605892).

IRE; News Release; TRW Purchases IRE Encryption Systems to Protect T reassure communications Nationwide; Baltimore, Maryland; Feb. 13, 1997; Information Resource Engineering; (VERI-1605851—VERI-1605852).

IRE; News Release; U.S. Robotics and IRE Team to Announce Industry's First Complete Remote Access and Encryption System for Individuals, Enterprises and the Internet; New Strategic Relationship, Including x2, Expected to accelerate Electronic Commerce and Remote Access Over Internet and Public Networks; May 7, 1997; Information Resource Engineering; (VERI-1605829—VERI-1605831).

IRE; News Release; U.S. Secret Service Using IRE's Secure Modem During presidential Campaign; Baltimore, Maryland; Sep. 26, 1996; Information Resource Engineering; (VERI-1605874—VERI-1605875).

IRE; News Release; U.S. Treasure Renews Contract with IRE for Secure Electronic Commerce System; IRE's Network Security Products in Use Since 1991; Baltimore, Maryland; Oct. 15, 1996; Information Resource Engineering; (VERI-1605872—VERI-1605873).

IRE; News Release; Vint Cerf to Serve on IRE Advisory Board; Baltimore, Maryland; Feb. 18, 1997; Information Resource Engineering; (VERI-1605849—VERI-1605850).

ISDN News; Livingston Launches ISDN Router, Too; May 1996.

ISO/IEC 7498-1 International Standard, "Information technology—Open Systems Interconnection—Basic Reference Model: The Basic Model," Second Edition, Nov. 15, 1994, Corrected Jun. 15, 1996, 68 pages.

ISO/IEC 7498-2 International Standard, "Information processing systems—Open Systems Interconnection—Basic Reference Model: Part 2: Security Architecture," First Edition, Feb. 15, 1989, 29 pages.

ISO/IEC 7498-3 International Standard, "Information technology—Open Systems Interconnection—Basic Reference Model: Naming and addressing," Second Edition, Apr. 15, 1997, 32 pages.

ISO/IEC 7498-4 International Standard, "Information processing systems—Open Systems Interconnection—Basic Reference Model: Part 4: Management Framework," First Edition, Nov. 15, 1989, 16 pages.

ISO/IEC; X.500; "The Directory-Overview of Concepts, Models and Services;" ISO IEC 9594; Nov. 1988; 20 pages.

ISO/IEC; X.509 Information Technology—Open Systems Interconnection—The Directory: Authentication Framework; Nov. 1993.

Israel et al.; Authentication in Office System Internetworks; Dec. 1983.

Israel, J. et al., Authentication in Office System Internetworks; ACM Transactions of Office Information Systems; vol. 1, No. 3; Jul. 1983.

Itoi et al.; CITI Technical Report 98-7; Smartcard Integration and Kerberos V5; first published Aug. 15, 1997, dated Dec. 3, 1998.

ITU, "All About the technology," International Telecommunication Union, Copyright 2011; Updated Apr. 4, 2011; 8 pages.

ITU-T; Data Networks and Open System Communications Directory; Information Technology-Open Systems Interconnection-the Directory: Authentication Framework; ITU-T Recommendation X.509; Feb. 1994; 41 pages.

ITU-T; Data Networks and Open System Communications Security; Information Technology—Open Systems Interconnection—Security Frameworks for Open Systems: Access Control Framework; ITU-T Recommendation X.812; International Telecommunication Union; 1996; (CA957547-CA957594).

ITU-T; Data Networks and Open System Communications, Security; Information Technology—Open Systems Interconnection—Security Frameworks for Open Systems: Authentication Framework; ITU-T Recommendation X.811; International Telecommunication Union; 1996; (CA957496-CA957546).

ITU-T; Data Networks and Open System Communications, Security; Information Technology—Open Systems Interconnection—Security Frameworks for Open Systems: Overview; ITU-T Recommendation X.810; International Telecommunication Union; 1996 (CA957470-CA957495).

Janson et al.; Safe Single-Sign-On Protocol with Minimal Password Exposure No-Decryption, and Technology-Adaptivity; Mar. 1995.

Jeffcoate et al.; Internet Security: Strategies and Solutions; Sep. 1997.

Johnston, William, et al., "A Use-Condition Centered Approach to Authenticated Global Capabilities: Security Architectures for Large-Scale Distributed Collaboratory Environments," Imaging and Distributed Computing Group, Information and Computing Sciences Division, 1996, 25 pages.

Johnston, William, et al., "A Use-Condition Centered Approach to Authenticated Global Capabilities: Security Architectures for Large-Scale Distributed Collaboratory Environments," Imaging and Distributed Computing Group, Information and Computing Sciences Division, Draft, Jan. 14, 1997, 25 pages.

Jones, J.; Securing the World Wide Web: Smart Tokens and Their Implementation; Dec. 1995.

K. Siau et al.; Xcert Software, Inc.—The Next Step Forward (B); Aug. 1997.

Kabay, M.E., "Identification, Authentication and Authorization on the World Wide Web," An ICSA White Paper, 1997, 33 pages.

Kao, I-Lung "Effective and Efficient Authentication and Authorization in Distributed Systems," Dissertation, University of Florida, 1995.

Karjoth, Gunter, "The Authorization Service of Tivoli Policy Director," Proceeding of 17th Annual Computer Security Applications Conference, Dec. 2001, 11 pages.

Kaufman, C., et al.; Network Security, PRIVATE Communication in a PUBLIC World; PTR Prentice Hall; 1995, 522 pages.

Kaufman, C.; RFC 1507—DASS, Distributed Authentication Security Service; Sep. 1993.

Kawada, Etsuo, "Authentication Services in Mobile Networks," Wireless Personal Communications, 2002, pp. 237-243.

Kemp, D.; The Public Key Login Protocol; <draft-kemp-auth-pklogin-01.txt>; Aug. 13, 1996.

(56) References Cited

OTHER PUBLICATIONS

Kemp, D.; The Public Key Login Protocol; <draft-kemp-auth-pklogin-02.txt>; Nov. 26, 1996.
Kent, Stephen Thomas; Encryption-Based Protection Protocols for Interactive User-Computer Communication Over Physically Unsecured Channels; Massachusetts Institute of Technology; Jun. 1976; (VERI-1605635—VERI-1605755).
Kerberos and 3$^{rd}$ Party Authentication; Security Dynamics, Inc.; Mar. 26, 1994.
Kerberos V5 System Administrator's Guide, Release 1.0, Document Edition 1.0; MIT; Nov. 27, 1996, 63 pages.
Kim, Gene H., et al., "Implementing a Secure rlogin Environment: A Case Study of Using a Secure Network Layer Protocol," Proceedings of the Fifth USENIX UNIX Security Symposium, Jun. 1995, 10 pages.
King, C.; Web-Access Authentication Using RADIUS: An intermediate method of secure exchanges on the Web; Aug. 1996.
Kohl et al.; RFC 1510—The Kerberos Network Authentication Service (V5); Sep. 1993.
Kohnfelder; Towards a Practical Public-Key Cryptosystem; May 1978.
Korb et al., "Some Experiments with TCP/IP Protocols over an X.25 Network," Purdue University Purdue e-Pubs, Computer Science Technical Reports, 1987, 14 pages.
Korb, "A Standard for the Transmission of IP Datagrams Over Public Data Networks," RFC 877, Sep. 1983, 3 pages.
Kotanchik, J.; RFC 59.0—Kerberos and Two-Factor Authentication; Mar. 1994.
Krajewski, Jr. et al.; Applicability of Smart Cards to Network User Authentication; Computing Systems, vol. 7, No. 1, 1994, pp. 75-89.
Krajewski Jr., Marjan; "Concept for a Smart Card Kerberos;" Oct. 16, 1992; pp. 76-83.
Kreher, R., et al., "LTE Signaling: Troubleshooting and Optimization," TMUS-PRISM0226373, 2011, 292 pages.
Kreher, R., et al., "UMTS Signaling: UMTS Interfaces, Protocols, Message Flows and Procedures Analyzed and Explained," TMUS-PRISM0226671, 2007, 565 pages.
Kwon, MoonSang, et al., "Ethernet Wrapper: Extension of the TCP Wrapper," Proceedings Eighth International Conference on Parallel and Distributed Systems, IEEE, 0-7695-1153-8/01, 2001, pp. 573-580.
La Porta, Thomas F., et al., "Mobile IP and Wide Area Wireless Data," IEEE, 0-7803-5668-3/99, 1999, pp. 1528-1532.
Labuschagne, L., et al., "Improved System-Access Control Using Complementary Technologies," Computers & Security, vol. 16, No. 6, 1997, pp. 543-549.
Laferriere, Claude; Charland, Richard; Authentication and Authorization Techniques in Distributed Systems; IEEE, CH3372-0/93, 1993, pp. 164-170.
Lai, C. et al., Endorsements, Licensing, and Insurance for Distributed System Services; Information Services Institute University of Southern California; Nov. 1994.
Lampson, Butler W., "Authentication and Delegation with Smart-Cards," Oct. 22, 1990.
Lampson, "Computers at Risk," 1991, 2 cover pages and pp. 74-101.
Lampson, Butler W., "Requirements and Technology for Computer Security," Jul. 1990, 65 pages.
Lennon et al.; Transaction Response Message Authentication (Des/Kp); Dec. 1983.
Letter from R. Millington to TIA re ANSi Standard JSTD-007 PCS1900 Air Interface Specification, JDG_PRISM_INV_0021430, Dec. 21, 1995, 1 page.
Letter from G. Partlow to T. Kipreos re Standards Protocol No. 3389, Proposed New Standard 'PCS 1900 Air Interface Specification, AT&T Representations, JDG_PRISM_INV_0014636-637, Jan. 30, 1996, 2 pages.
Letter from H. Pohl to T. Kipreos re Alcatel N.V. Contribution to a TIA Standard, JDG_PRISM_INV_0014634-635, Feb. 22, 1996, 2 pages.
Letter from Hack to D. Bart re TIA IP Requirement for the Standardization and Publication of J-STD-007, JDG_PRISM_INV_0021726, Dec. 1, 1995, 1 page.
Li, Jun, et al., "Public Access Mobility LAN: Extending the Wireless Internet Into the LAN Environment," IEEE Wireless Communications, Jun. 2002, 1070-9916/02; pp. 22-30.
License Grant re Standards Proposal No. 3389, Proposed New Standard "PCS 12900 Air Interface Specification," May 16, 1995, JDG_PRISM_INV_0022269-270.
License Grant re Standards Proposal No. 3389, Proposed New Standard "PCS 12900 Air Interface Specification," May 16, 1995, JDG_PRISM_INV_0021436-437.
License Grant re Standards Proposal No. 3389, Proposed New Standard "PCS 12900 Air Interface Specification," May 16, 1995, JDG_PRISM_INV_0021434-435.
License Grant re Standards Proposal No. 3389, Proposed New Standard "PCS 12900 Air Interface Specification," Aug. 11, 1995, JDG_PRISM_INV_0021433.
License Grant re Standards Proposal No. 3389, Proposed New Standard "PCS 12900 Air Interface Specification," May 16, 1995, JDG_PRISM_INV_0021431-432.
License Grant re Standards Proposal No. 3389, Proposed New Standard "PCS 12900 Air Interface Specification," May 16, 1995, JDG_PRISM_INV_0021418-419.
License Grant re Standards Proposal No. 3389, Proposed New Standard "PCS 12900 Air Interface Specification," Jan. 23, 1996, JDG_PRISM_INV_0016412-413.
License Grant re Standards Proposal No. 3389, Proposed New Standard "PCS 12900 Air Interface Specification," May 16, 1995, JDG_PRISM_INV_0016410-411.
License Grant re Standards Proposal No. 3389, Proposed New Standard "PCS 12900 Air Interface Specification," Nov. 16, 1995, JDG_PRISM_INV_0016125-126.
License Grant re Standard Proposal No. 3389, Proposed New Standard, "PCS 1900 Air Interface Specification," Jun. 21, 1996, JDG_PRISM_INV_0014632-633.
Linn, J.; Practical Authentication for Distributed Computing; 1990.
Linn, J.; RFC 1508—Generic Security Service Application Program Interface; Sep. 1993.
Livingston Enterprises, Inc.; ChoiceNet Administrator's Guide; Jan. 1997; 88 pages.
Livingston Enterprises, Inc.; RADIUS Administrator's Guide; May 1997.
Livingston Enterprises, Inc.; SecurID Installation; 1996.
Livingston Enterprises, Inc.; SecurID Installation; Sep. 1998; 8 pages.
Livingston Enterprises; RADIUS software documents; Livingston Enterprises, Inc.; Dec. 1994-Apr. 1995; (VERI-1606882—VERI-1606980).
Livingston Enterprises; RADIUS Working Group Internet Draft; Remote Authentication Dial in User Service (RADIUS) draft-ietf-radius-radius-00.txt; Livingston Enterprises, Inc.; May 1995; (VERI-1607188—VERI-1607257).
Livingston Enterprises; RARIUS Working Group Internet-Draft; Remote Authentication Dial in User Service (RADIUS) draft-ietf-radius-radius-01.txt; Livingston Enterprises, Inc.; Nov. 1995; (VERI-1607258—VERI-1607336).
Livingston Enterprises; RADIUS Working Group Internet-Draft; Remote Authentication Dial in User Service (RADIUS) draft-ietf-radius-radius-02.txt; Livingston Enterprises, Inc.; May 1996; (VERI-1607337—VERI-1607414).
Livingston Enterprises; RADIUS Working Group Internet-Draft; Remote Authentication Dial in User Service (RADIUS) draft-ietf-radius-radius-03.txt; Livingston Enterprises, Inc.; May 1996; (VERI-1607415—VERI-1607418).
Lloyd, B.; RFC 1334—PPP Authentication Protocols; Oct. 1992.
Looi, M. et al; Enhancing SESAMEV4 with Smart Cards; Sep. 1998.
Louwrens, Cecil Petrus, "Single Sign-On In Heterogeneous Computer Environments," Dissertation, Nov. 1996, 181 pages.
Lowry, J.; Location-Independent Information Object Security; IEEE; 1995.

(56) References Cited

OTHER PUBLICATIONS

Lu et al., "Secure Communication in Internet Environments: A Heirarchical Key Management Scheme for End-To-End Encryption," IEEE Transactions on Communications, vol. 37, No. 10, Oct. 1989, pp. 1014-1023.
Lucent Technologies; Radius Code from Lucent radiusd.c; RADIUS, Remove Authentication Dial in User Service; 1992-1999; Lucent Technologies Inc.; pp. 1-48; (VERI-1607419—VERI-1607466).
Lunt, Steven J., "Using Kerberos in Operations Systems," IEEE, CH2980-1/91/0000-0687, 1991, pp. 687-693.
LZB 115 2508 R1A, Chapter 2—Introduction to GSM/DCS/PCS Systems, Ericsson, Inc., Approximately 1994; 27 pages.
M. Abadi, M. Burrows, C. Kaufman, B. Lampson, *Authentication and Delegation with Smart-Cards*, Digital Equipment Corporation, Jul. 30, 1992.
M. Curtin, *Introduction to Network Security*, Kent Information Services, Inc., Mar. 1997.
M. Jones, *Securing the World Wide Web: Smart Tokens and Their Implementation*, Fourth International World Wide Web Conference, Boston, Massachusetts, USA, Dec. 1995.
Maddox, Kate; New Net Options for Business—Open Market touts safe, complete solutions; InformationWeek; Mar. 4, 1996; 1 page.
Mavridis, Ioannis, et al., "A Secure Payment System for Electronic Commerce," Sep. 1999, 5 pages.
McLaughlin; SunWorld News: Directory of the Month of Jun. 1996.
McLaughlin; SunWorld News: New Products for the Week of May 27; Jun. 1996.
McMahon, P.V., "SESAME V2 Public Key and Authorisation Extensions to Kerberos," IEEE, 1995, pp. 114-131.
Memorandum Opinion; Document 448; filed Apr. 2, 2007; *Prism Technologies LLC v. Verisign, Inc. et al.*; Civil Action No. 1:05-cv-00214-JJF.
Malis et al., "Multiprotocol Interconnect on X.25 and ISDN in the Packet Mode," RFC 1356, Aug. 1992, 15 pages.
Metzger et al.; RFC 1828—IP Authentication Using Keyed MD5; Aug. 1995.
Micali, S.; Enhanced Certificate Revocation System; 1995.
Micali; Efficient Certificate Revocation; Mar. 1996.
Microsoft; The Microsoft Internet Security Framework: Technology for Secure Communication, Access Control, and Commerce; Dec. 1996.
Miler, M.; When remote access needs to be blocked; Nov. 14, 1994.
Miller, S.P., et al., "Kerberos Authentication and Authorization System," Project Athena Technical Plan, Oct. 27, 1988, pp. 1-36.
Mills, D.L.; RFC 1004—A Distributed Protocol Authentication Scheme; Apr. 1987.
Misc.Activism.Progressive; Horvitz; Robert; NATO support for key-escrow crypto (long); Google Groups; 1995; (VERI-1605777—VERI-1605793).
Mobile Station—Base Station Compatibility Standard for Dual-Mode Wideband Spread Spectrum Cellular System—PN-3421, IS-95A, TR45, Dec. 1994, 979 pages.
Moffett, Jonathan, et al., "Specifying Discretionary Access Control Policy for Distributed Systems," Computer Communications, vol. 13, No. 9, Nov. 1990, pp. 571-580, 17 pages.
Molva, Refik, et al., "Authentication of Mobile Users," IEEE, 0890-8044/94, 1994, pp. 26-34.
Molva, Refik, et al., "*KryptoKnight* Authentication and Key Distribution System," In Proceedings of 1992 European Symposium on Research in Computer Security, Aug. 24, 1993, pp. 1-16.
Morales et al., "IP to X.121 Address Mapping for DDN," RFC 1236, Jun. 1991, 8 pages.
Morscher, Mark, "Remote Passphrase Authentication User Experience Functionality," Customer Registry and Security, Jun. 12, 1996, 9 pages.
Mouly, M., Pautet, M., "Technical aspects of the GSM system and its derivatives, Current Evolution of GSM Systems," IEEE Personal communications, Oct. 1995, pp. 9-19.
Muftic, Sead, et al., "CISS: Generalized Security Libraries," Computers & Security, 0167-4048/92, 1992, pp. 653-659.
Muftic, Sead, "Extended OSI Security Architecture Second Stage of the CEC COST-11 Ter Project," COST-11 Ter News, 0169-7552/89, 1989, pp. 223-227.
Muftic, Sead, "Implementation of the Comprehensive Integrated Security System for Computer Networks," Computer Networks and ISDN Systems, 0169-7552/92, 1992, pp. 469-475.
Muftic, Sead, et al., "Security Architecture for Distributed Systems," Computer Communications, vol. 17, No. 7, Jul. 1994, pp. 492-500.
Muftic, Sead, "Security Architecture for ODP Systems Final Results of the CES COST-11 TER 'Security' Project," Computer Networks and ISDN Systems, 0169-7552/94, 1994, pp. 1343-1349.
Muftic, Sead, "Secury Mechanisms for Computer Networks (A Program of the CEC COST-11 Ter Project)," Cost-11 Ter News, 0376-5075/87, 1987, pp. 339-344.
Muftic, Sead, "Security Mechanisms for Computer Networks Current Results of the CEC COST-11 Ter Project," COST-11 Ter News, Computer Networks and ISDN Systems, 0169-7552/88, 1988, pp. 67-71.
Muftic, Sead, "Security Mechanisms for Computer Networks," Ellis Horwood, first printed in 1989, reprinted in 1991, 200 pages.
Muftic, Sead, "Security in Transition," Computer Communications, vol. 17, No. 7, Jul. 1994, pp. 451-452.
Muftic, Sead, "Transaction Protection by 'Antennas'," Computers & Security, 0167-4048/90, 1990, pp. 245-255.
Myers et al.; Online Certificate Status Protocol, Version 2; Draft-ietf-pkix-ocspv2-00.txt; Sep. 2000.
Myers et al.; RFC 2560—X.509 Internet Public Key Infrastructure Online Certificate Status Protocol—OCSP; Jun. 1999.
Myers, J.; RFC 1731—IMAP4 Authentication Mechanisms; Dec. 1994.
N. Nagaratna et al.; Resource Access Control for an Internet User Agent; Jun. 1997.
NameFLOW—Paradise—Quarterly Service Report Oct.-Dec. 1995.
Naor et al.; Certificate Revocation and Certificate Update; Jan. 1998.
National Bureau of Standards, U.S. Department of Commerce; Federal Information Processing Standards Publication 83: Specification for Guideline on User Authentication Techniques for Computer Network Access Control; 1980.
National Research Council, Computer Science and Telecommunications Board; Cryptography's Role in Securing the Information Society; 1996.
National Security Agency; Basic Certification Requirements for FORTEZZA—Enabled Applications Version 1.1; Mar. 1997.
National Security Agency; FORTEZZA—Certification Requirements for File Protection Applications, Version 1.04; Jan. 1996; 18 pages.
National Security Agency; FORTEZZA Application Developer's Guide, Version R1.0; Jun. 11, 1996.
National Security Agency; FORTEZZA Application Implementors Guide for The Fortezza Crypto Card ICD Revision P1.5 and The Fortezza Cryptologic Interface Programmers Guide, Revision 1.52; Mar. 5, 1996.
National Security Agency; FORTEZZA Application Implementors Guide for The PCMCIA Based FORTEZZA Cryptologic Card, Revision 1.01; Apr. 6, 1995.
National Security Agency; FORTEZZA Application Implementors Guide for The PCMCIA Based FORTEZZA Cryptologic Card, Version 1.00; Jan. 1995.
National Security Agency; Fortezza Certification Requirements for World Wide Web Clients and Servers; Dec. 1996.
National Security Agency; FORTEZZA Cryptologic Interface Programmers Guide Revisions 1.52; Jan. 1996.
National Security Agency; Fortezza Program Overview Version 4.0a; Feb. 1996.
National Security Agency; Interface Control Document for the Fortezza Crypto Card, Revision P1.5; Dec. 1994.
Needham et al.; Using Encryption for Authentication in Computer Networks; Dec. 1978.
NETEGRITY; NeTegrity Unveils Industry's First Enterprise-Wide, Integrated Network Security Management System; NeTegrity, Inc.; Nov. 15, 1996; (CA954773-CA954-774).

(56) References Cited

OTHER PUBLICATIONS

NETEGRITY; NeTegrity Unveils Industry's First Enterprise-Wide, Integrated Network Security Management System; NeTegrity, Inc.; Oct. 15, 1996; (CA954776-CA954777).
NETEGRITY; NeTegrity, Inc. and Encotone Ltd. Form U.S. Joint Venture to Market Acoustic Smart Card Technology; NeTegrity, Inc.; Nov. 4, 1996; (CA954771-CA954772).
NETEGRITY; NeTegrity™ SiteMinder™, Web Agent, Operations Guide for NT Version 1.0; Netegrity, Inc.; 1996-1997; (CA005007-CA005012).
NETEGRITY; Netegrity™ SiteMinder™, Web Agent, Operations Guide for NT Version 2.0; Netegrity, Inc.; 1996-1997; (CA004932-CA004974).
NETEGRITY; SiteMinder Product/Technology Backgrounder; NeTegrity, Inc.; 1996 (CA954778-CA954780).
NETEGRITY; SiteMinder? Authentication Server for Windows NT; NeTegrity, Inc.; 1996; (CA954781-CA954782).
NETEGRITY; SiteMinder™ Security Manager; NeTegrity, Inc.; 1996; (CA954775).
NETEGRITY; Software & Security: Netegrity's Siteminder software lets net managers get centered on security; NeTegrity, Inc.; Jan. 1997; (CA954730-CA954732).
Netscape; An Internet Approach to Directories; 1996.
Netscape; Certificate-Mapping Programmer's Guide; 1997.
Netscape; FORTEZZA® CryptoSecurity Products; Oct. 1996.
Netscape; Hitachi and Netscape to Collaborate on Intranet and Extranet Solutions Based on LDAP Standard for Internet Directories; Dec. 1997.
Netscape; Introduction to Communicator; 1997.
Netscape; Managing Netscape Servers—Netscape Administration Server 3.0 (online version); 1997.
Netscape; Managing Netscape Servers—Netscape Administration Server 3.0; 1997.
Netscape; More Than 40 Companies Join Netscape and U. Michigan to Support Lightweight Directory Access Protocol As Proposed Standard for Internet Directories; Apr. 1996.
Netscape; Netscape Announces Netscape Certificate Server to Enable Companies to Encrypt Enterprise Communications and Data; Apr. 1996.
Netscape; Netscape Announces Netscape Suitespot 3.0 for Open Email and Groupware on Intranets; Oct. 1996.
Netscape; Netscape Certificate Server 1.0—A Powerful Certificate-Management Solution; 1996.
Netscape; Netscape Certificate Server 1.0 FAQ; 1996.
Netscape; Netscape Certificate Server Administrator's Guide for Unix; 1997.
Netscape; Netscape Certificate Server Administrator's Guide for Windows NT; 1997.
Netscape; Netscape Certificate Server Installation for Unix; 1997.
Netscape; Netscape Certificate Server Installation for Windows NT; 1997.
Netscape; Netscape Communicator Supports Smart Cards and Tokens So Mobile Users Can Safely Access Corporate Networks Remotely; Aug. 1997.
Netscape; Netscape Directory Server 1.0—Server Software for Centralized Directory Management; 1996.
Netscape; Netscape Directory Server 1.0 Data Sheet; 1996.
Netscape; Netscape Directory Server 1.0 Fact Sheet; Dec. 1996.
Netscape; Netscape Directory Server 1.0 FAQ; 1996.
Netscape; Netscape Enterprise Server 3.0—Administrator's Guide for Unix; 1997.
Netscape; Netscape Enterprise Server 3.0—Administrator's Guide for Windows NT; 1997.
Netscape; Netscape Enterprise Server 3.0—The Enterprise-Strength Web Server for the Intranet; 1996.
Netscape; Netscape Enterprise Server 3.0 FAQ; 1996.
Netscape; Netscape Expands Mission Control to Provide Unified Administration of Intranets and Extranets with Lower Cost of Ownership; Dec. 1997.
Netscape; Netscape Products With Fortezza Fact Sheet; Feb. 1997.
Netscape; Netscape SuiteSpot—The Cost-Effective and Full-Service Intranet Solution; 1996.
Netscape; Netscape SuiteSpot 3.0 FAQ; 1996.
Netscape; Netscape to Offer Fortezza Cryptographic Capability for its Software Products; Oct. 1995.
Netscape; NSAPI Programmer's Guide—Netscape Enterprise Server Version 3.0; 1997.
Netscape; Securing Communications on the Intranet and Over the Internet; Jul. 1996.
Netscape; Securing Information Distribution Using Netscape Products with FORTEZZA® ; 1996.
Netscape; Single Sign-On Deployment Guide-Security; 1997.
Netscape; SSL 2.0 Protocol Specification; Nov. 1994.
Netscape; The SSL Protocol Version 3.0; Nov. 1996.
Netscape; U.S. Department of Defense Signs Agreement for Netscape Client and Server Software; Oct. 1997.
Netscape; Using Netscape with FORTEZZA; 1997.
Netscape; Web Publisher User's Guide—Netscape Enterprise Server Version 3.0; 1997.
Netscape; What the Press is Saying About Netscape's New Servers; 1996.
Network Computing; Certificate Authorities: How Valuable Are They?; Apr. 1, 1997; (CA956512-CA956517).
Neuman, B. Clifford, et al., "Kerberos: An Authentication Service for Computer Networks," IEEE Communications Magazine, vol. 32, No. 9, Sep. 1994, 11 pages.
Neuman, B. Clifford, "Proxy-Based Authorization and Accounting for Distributed Systems," Technical Report 91-02-01, Mar. 1991, pp. 1-14.
Neumann, Peter G.; Architectures and Formal Representations for Secure Systems; Computer Science Laboratory; SRI International EL-243; Oct. 2, 1995; Final Report; SRI Project 6401; (VERI-1605407—VERI-1605564).
Newman et al.; Kerberos: An Authentication Service for Computer Networks; 1994.
Newsbytes News Network; GTE's CyberTrust for Web Electronic Commerce; Feb. 6, 1996.
Newsbytes; UK—Security Dynamics Offers Remote Access Technology; Mar. 1996.
"NIS+ and FNS Administration Guide," SunsSoft, 1995, 507 pages.
Oehler et al.; RFC 2085—HMAC-MD5 IP Authentication with Replay Prevention; Feb. 1997.
Omnipoint, Voicestream Buy Washington GSM System from Sprint PCS; Dec. 30, 1999; 1 page.
Open Market, Inc.; Open Market, Interleaf Team on Web "Secure Doc Mgt"; Washingtonpost Newsweek Interactive; Waltham, Massachusetts; Mar. 5, 1996; (VERI-1605905—VERI-1605906).
Open Market, Inc.; Open Market's "3-Tier Architecture" for Web; Washingtonpost Newsweek Interactive; Waltham, Massachusetts; Mar. 14, 1996; (VERI-1605907—VERI-1605908).
Oppen et al.; The Clearinghouse a Decentralized Agent for Locating Named Objects in a Distributed Environment; 1983.
"Oracle Advanced Networking Option Administrator's Guide;" Copyright 1996; 140 pages.
Oracle; Secure Network Services Administrator's Guide Version 2.0; 1995.
"Oracle7 Server Concepts Manual;" Copyright 1996; 88 pages.
"Overpowered by Generosity," New Scientist, Aug. 13, 1994, pp. 43 and 44.
P. Janson, S. Kutten, R. Molva, M. Yung, *Safe Single-Sign-On Protocol with Minimal Password Exposure No-Decryption, and Technology-Adaptivity*, IBM Technical Disclosure Bulletin, Mar. 1995.
Pahlavan, Kavek, "Wireless Data Communications," Proceedings of the IEEE, vol. 82, No. 9, Sep. 1994, 33 pages.
Parekh, Sameer; Re: WWW servers; Community ConneXion, Inc.; Jun. 6, 1996 14:21:02; (CA956620-CA956621).
Parekh, Sameer; Re: WWW servers; Community ConneXion, Inc.; Jun. 6, 1996 19:41:26; (CA956618-CA956619).
Parker, Tom, et al., "83-10-20 Role-Based Access Control in Real Systems," Dec. 1995, 16 Pages.
Parker et al.; SESAME Technology Version 4 Overview; Dec. 1995.

(56) References Cited

OTHER PUBLICATIONS

Patel, Girish, et al., "The 3GPP and 3GPP2 Movements Toward an All-IP Mobile Network," IEEE Personal Communications, Aug. 2000, pp. 62-64.
Pato, J.; RFC 26.0—Using Pre-Authentication to Avoid Password Guessing Attacks; Jun. 1993.
PAYSERV; TBSS (Telematic Base Security Services); Approved procedures and mechanisms for the protection of electronic data communications; IBO 920 353 12.96; Version 1.2; Dec. 6, 1996; (VERI-1606053—VERI-1606091).
PC Magazine Online; Netscape Shoots to Kill Microsoft and Lotus; Apr. 1996.
PCN to PCN Intersystem Operations based on PCS 1900, J-STD-023-1996, American National Standards Institute, Dec. 1996, 1273 pages.
The Personal Communications Services-PCS1900 System, J-STD-024, ATIS, May 1997, 206 pages.
The Personal Communications Services-PCS1900 System, J-STD-007, ATIS, 1997, 2104 pages.
Perkins, C.; RFC 2002—IP Mobility Support; Oct. 1996.
Phipps, John, "Physical Protection Devices," The Protection of Computer Software—its Technology and Applications, Second edition, 1992, 2 cover pages and pp. 61-81.
Pierson, Rick, "Network Security Architecture for Intelligent Networks," In '97 IEEE's Intelligent Network Workshop, May 1997, 37 pages.
Plummer; "An Ethernet Address Resolution Protocol," RFC 826; Nov. 1982; 11 pages.
"Port-Based Network Access Control," IEEE Standard for Local and Metropolitan Area Networks, IEEE Std 802.1X-2001, Approved Jun. 2001 IEEE-SA Standards Board, Approved Oct. 2001 American National Standards Institute, 142 pages.
PR Newswire; Secure Computing Launches Full suite of Products for Enterprise Network Security; Solutions Encompass Perimeter Control, Access Control, Web Browser and Intrawall; Apr. 1996.
Prism Resources; "Internet Copyright Protection;" Jan. 3, 1997; 2 pages.
Prism Resources Named Nebraska Technology Company of the Year, Business Wire, May 12, 1997, http://www.thefreelibrary.com/Prism+Resources+named+Nebraska+Technology+Company+of+the+Year.-a019392476, 2 pages.
Purdy, George B., et al., "A Software Protection Scheme," Proceedings of the 1982 Symposium on Security and Privacy Apr. 26-28, 1982, 2 cover pages and pp. 99-103.
Q. Zhong, *Providing Secure Environments for Untrusted Network Applications*, Hewlett Packard Laboratories, Bristol, 1997.
R. Davis, *Network Authentication Tokens*, Computer Security Applications Conference, 1989 Fifth Annual, Dec. 4, 1989.
R. Lennon, S. Matyas, C. Meyer, *Transaction Response Message Authentication (Des/Kp)*, IBM Technical Disclosure Bulletin, Dec. 1983.
R. Needham, M. Schroeder, *Using Encryption for Authentication in Large Networks of Computers*, Xerox Palo Alto Research Center, Dec. 1978.
RADIUS server source code; Apr. 1995.
RADIUS IETF Mailing List; downloaded from http://ftp.cerias.purdue.edu/pub/doc/network/radius/archive/ietf-radius.9511; dated Nov. 1, 1995; 162 pages.
Rainbow Technologies; iKey 1000 Series Developer's Guide; 2002.
Rainbow Technologies; iKey 1000 Series Product Brief; Rev. 1.1; Apr. 27, 2001; 7 pages.
Rainbow Technologies; Sentinel SuperPro™—Securing the Future of Software Developer's Guide; 1991-1995.
Rainbow Technologies; SentinelEve3™ Software Protection System Developer's Guide; 1989-1995.
Rapoza, Jim; Sentry CA cross-checks certificates: Xcert uses LDAP directory secured via SSL for flexible authentication between authorities; PC Week Online; Apr. 16, 1997; (CA956533-CA956535).
Richardson, "WCDMA Design Handbook," Cambridge University Press, Copyright 2005; 589 pages.
RCC 2082—*RIP-2 MD5 Authentication*, Internet Engineering Task Force, Jan. 1997.
Redl et al.; GSM and Personal Communications Handbook; 1998; 539 pages.
Regents of the University of Michigan; The SLAPD and SLURP Administrator's Guide, University of Michigan, Release 3.3; Apr. 1996.
Requests for Comments (RFC) submitted at the *Markman* hearing; Privacy Enhancement for Internet Electronic Mail: Part I: Message Encryption and Authentication Procedures and Part II: Certificate-Based Key Management; Feb. 1993.
RFC 1004—A Distributed-Protocol Authentication Scheme, Internet Engineering Task Force, Apr. 1987.
RFC 1058—Generic Security Service Application Program Interface; Internet Engineering Task Force; Sep. 1993.
RFC 1507—DASS Distributed Authentication Security Service, Internet Engineering Task Force, Sep. 1993.
RFC 1510—The Kerberos Network Authentication Service (V5), Internet Engineering Task Force, Sep. 1993.
RFC 1636—*Report of IAB Workshop on Security in the Internet Architecture*, Internet Engineering Task Force, Jun. 1994.
RFC 1661—The Point-to-Point Protocol (PPP), Internet Engineering Task Force, Jul. 1994.
RFC 1704—*On Internet Authentication*, Internet Engineering Task Force, Oct. 1994.
RFC 1731—*IMAP4 Authentication Mechanisms*, Internet Engineering Task Force, Dec. 1994.
RFC 1760—The S/Key One-Time Password System; Internet Engineering Task Force; Feb. 1995.
RFC 1826—*IP Authentication Header*, Inernet Engineering Task Force, Aug. 1995.
RFC 1828—*IP Authentication Using Keyed MD5*, Internet Engineering Task Force, Aug. 1995.
RFC 1994—*PPP Challenge Handshake Authentication Protocol (CHAP)*, Internet Engineering Task Force, Aug. 1996.
RFC 2002—*IP Mobility Support*, Internet Engineering Task Force, Oct. 1996.
RFC 2058—*Remote Authentication Dial in User Service (RADIUS)*, Internet Engineering Task Force, Jan. 1997.
RFC 2069—*An Extension to HTTP: Digest Access Authentication*, Internet Engineering Task Force, Jan. 1997.
RFC 2085—*HMAC-MD5 IP Authentication With Replay Prevention*, Internet Engineering Task Force, Feb. 1997.
RFC 2139—*RADIUS Accounting*, Internet Engineering Task Force, Apr. 1997.
RFC 912—Authentication Service, Internet Engineering Task Force, Sep. 1984.
RFC 931—Authentication Server, Internet Engineering Task Force, Jan. 1985.
RFC1510—The Kerberos Network Authentication Service (V5); Internet Engineering Task Force; Sep. 1993.
Richard, P.; Re: Certificate and CRL's—access and storage; Oct. 1996.
Richard, P.; Re: LDAP for logon?; May 1996.
Richard, Patrick C.; E-Mail Responses Re: certificates and CRLs—access and storage; Oct. 15, 1996; (CA134027-CA134028).
Richard, Patrick; E-Mail Response Re: LDAP for logon?; May 22, 1996; (CA133800-CA133801).
Richard, Patrick; Re: LDAP for logon?; May 21, 1996; (CA956532).
Rigney et al.; RADIUS Accounting draft-ietf-radius-accounting-01.txt; Nov. 1995.
Rigney et al.; RADIUS Accounting; draft-ietf-radius-accounting-02.txt; Feb. 1996.
Rigney et al.; RADIUS Accounting; draft-ieff-radius-accounting-03.txt; May 1996.
Rigney et al.; RADIUS Accounting; draft-ietf-radius-accounting-04.txt; Jun. 1996.
Rigney et al.; RADIUS Extensions; draft-ietf-radius-ext-00.txt; Jan. 1997.
Rigney et al.; RADIUS Extensions; draft-ietf-radius-ext-01.txt; Sep. 1997.

(56) References Cited

OTHER PUBLICATIONS

Rigney et al.; RADIUS Extensions; draft-ietf-radius-ext-02.txt; Oct. 1998.
Rigney, et al.; Remote Authentication Dial in User Service (RADIUS) draft-ietf-radius-00.txt; May 1995; 70 pages.
Rigney et al.; Remote Authentication Dial in User Service (RADIUS) draft-ietf-radius-01.txt; Nov. 1995.
Rigney et al.; Remote Authentication Dial in User Service (RADIUS); Jan. 1997.
Rigney et al.; Remote Authentication Dial in User Service (RADIUS); draft-ietf-radius-radius-02.txt; Feb. 1996; 134 pages.
Rigney, et al.; Remote Authentication Dial in User Service (RADIUS); draft-ietf-radius-radius-02.txt; May 1996; 78 pages.
Rigney, et al.; Remote Authentication Dial in User Service (RADIUS); draft-ietf-radius-radius-03.txt; May 1996; 69 pages.
Rigney, et al.; Remote Authentication Dial in User Service (RADIUS); Draft-ietf-radius-radius-04.txt; Jun. 1996; 138 pages.
Rigney et al.; Remote Authentication; Dial in User Service (RADIUS); Apr. 1997.
Rigney et al.; RFC 2058—Remote Authentication Dial in User Service (RADIUS); Jan. 1997.
Rigney et al.; RFC 2138—Remote Authentication Dial in User Service (RADIUS); Apr. 1997.
Rigney, C., et al., Remote Authentication Dial in User Service (RADIUS), http://tools.ietf.org/html/rfc2138, Apr. 1997, 130 pages.
Rigney et al., "Remote Authentication Dial in User Service (Radius)," Request for Comments 2865 (RFC 2865), Jun. 2000, pp. 1-76.
Rigney; Current Meeting Report; Minutes of the Remote Authentication Dial in User Service ROF (RADIUS); Dec. 1995.
Rigney; RADIUS Accounting; Jan. 1996.
Rigney; RADIUS; BayLISA; Mountain View, California; Feb. 1996.
Rigney; RFC 2139—RADIUS Accounting; Apr. 1997.
Rigney, C., et al., "Remote Authentication Dial in User Service (RADIUS)," Network Working Group Request for Comments 2865, Jun. 2000, pp. 1-76.
RISS; Getting Connected; Regional Information Sharing Systems; Jun. 27, 2000; (CA955610- CA955625).
RISS; Network Fundamentals; Regional Information Sharing Systems; Jun. 26, 2000; (CA955557-CA955573).
RISSTech; BJS/SEARCH National Conference Justice, E-Government & the Internet Developing Security Policies and Procedures; Regional Information Sharing Systems; Jun. 27, 2000; (CA955648-CA955679).
RISSTech; Federal CIO Council; XML Community of Practice; RISS/RISSNET Trusted Credential Project; Regional Information Sharing Systems; Feb. 16, 2005; (CA955829-CA955842).
Rodriguez, K.; New TCP/IP Products unveiled at expo; Aug. 1995.
Rohland, W.S.; Token-Based Information Security for Commercial and Federal Information Networks; Oct. 1995.
RSA; Baldwin, Robert; Using S/PAY™; Jan. 30, 1997; RSA Data Security, Inc; (VERI-1605920—VERI-1606010).
RSA; Ciphertext: The RSA Newsletter; vol. 4, No. 1, Spring 1996; RSA Data Security, Inc.; (CA955733-CA955740).
RSA; S/PAY™; RSA's Developer's Suite for Secure Electronic Transactions (SET); RSA Data Security, Inc.; 1996; (VERI-1606148—VERI-1606151).
Rubin, A.D.; Independent One-Time Passwords, *Proceedings of the Fifth USENIX UNIX Security Symposium*; Jun. 1995.
Rubin, A. D., et al.; Web Security Sourcebook; 1997; 187 pages.
Rubin, Greer, Ranum; A Complete Guide to Web Security Threats and Solutions; 1997.
Ryan, G.; Making Netscape Compatible with FORTEZZA®—Lessons Learned; Aug. 1999.
Salz, R.; RFC 100.0—DCE and FORTEZZA; Jan. 1997.
Salz, R.; RFC 63.3—DCE 1.2 Contents Overview; Oct. 1996.
Samar, Vipin, et al., "Making Login Services Independent of Authentication Technologies," SunSoft, Inc., previously presented at the 3rd ACM Conference on Computer and Communications Security Mar. 1996, 10 pages.
Samarati, Pierangela, et al., "An Authorization Model for a Distributed Hypertext System," IEEE Transactions on Knowledge and Data Engineering, vol. 8, No. 4, Aug. 1996, pp. 555-562.
Särs, C.; Unified Single Sign-On; Nov. 1998.
Schneier, B.; Applied Cryptography, $2^{nd}$ ed.; 1996.
Schroeder, W.; Kerberos/DCE, the Secure Shell, and Practical Internet Security; Oct. 1996.
Schultz; T.; White Paper: Access Security with SecurID; Nov. 1999.
Scourias, John; "Overview of the Global System for Mobile Communications;" Oct. 14, 1997; 15 pages.
Secure Computing Corp; 10-K—for Dec. 31, 1996; Annual Report—Form 10-K; SEC Info; (VERI-1605039—VERI-1605089).
Secure Computing; internet security; Just How Critical is Data Integrity?; vol. 1, No. 1; Feb. 1997; Secure Computing Corporation; (VERI-1605627—VERI-1605630).
Secure Computing; internet security; Payne, Data; Elvis spotted?; vol. 1, No. 2, Mar. 1997; Secure Computing Corporation; (VERI-1605631—VERI-1605634).
Secure Computing; internet security; Victimized company learns a hard lesson; vol. 1, No. 3, Apr. 1997; Secure Computing Corporation; (VERI-1605623—VERI-1605626).
Secure Computing; Lockout™ DES; Client software; Nov. 8, 1996; Secure Computing Corporation; (VERI-1605766—VERI-1605767).
Secure Computing; Lockout™ DES; Identification and authentication; 1995; Secure Computing Corporation; (VERI-1605772—VERI-1605773).
Secure Computing; Lockout™ DES; Lockout™ login agent and authentication server; Nov. 8, 1996; Secure Computing Corporation; (VERI-1605768—VERI-1605769).
Secure Computing; Lockout™ FORTEZZA; Strong identification and authentication; Nov. 8, 1996; Secure Computing Corporation; (VERI-1605770—VERI-1605771).
Secure Computing; LOCKout™ Identification and Authentication; Nov. 8, 1996; Secure Computing Corporation; (VERI-1605606—VERI-1605607).
Secure Computing; Press Release; Secure Computing Announces Immediate Availability of Sidewinder 3.0; Security Server Employs Fully Integrated Perimeter Security, IPsec Interoperable Encryption, Strong User Authentication, and E-mail Content Filtering; St. Paul, Minn (Sep. 17, 1996); Secure Computing Corporation; (VERI-1606154—VERI-1606155).
Secure Computing; Secure Computing Demonstration Software; Check out our demos for LOCKout™ and Sidewinder™; Secure Computing Corporation; 1995; (VERI-1606130).
Secure Computing; Sidewinder™ Security Server; Apr. 1997; Secure Computing Corporation; (VERI-1606152—VERI-1606153).
Secure Computing; SNS Deployments; (Last Updated Mar. 17, 1997); Secure Computing Corporation; (VERI-1606175).
Secure Computing; SNS MLS Solution Set; (Last Updated Mar. 17, 1997); Secure Computing Corporation; (VERI-1606176—VERI-1606177).
Secure Computing; SNS Product Evolution; (Last Updated Mar. 17, 1997); Secure Computing Corporation; (VERI-1606178—VERI-1606179).
Secure Computing; SNS support and training services, World class; Secure Computing Corporation offers a variety of LOCK® Secure Network Server Installation, Training, and Maintenance programs.; 1996; (VERI-1606103—VERI-1606106).
Secure Computing; What's New?; Secure Computing Corporation; 1996; (VERI-1606156—VERI-1606157).
Secured Single Signon in a Client/Server Environment; IBM; Aug. 1994; 131 pages.
Security Dynamics, Inc.; Kerberos and $3^{rd}$ Party Authentication; Mar. 1994.
"Security Dynamics Introduces SecurID Modem;" Sep. 19, 2000; 2 pages.
Security.itworld.com; Curing Remote-Access Security Ailments; 1996.
Schmid, S., et al., "An Access Control for Microcellular IPv6 Networks," IEEE, 0-7695-1-2/01, 2001, pp. 454-463.
Schuba, Christoph, et al., "A Reference Model for Firewall Technology," IEEE, 0-8186-8274-4, 1997, pp. 133-145.

(56) References Cited

OTHER PUBLICATIONS

Shamir, Adi, "Identity-based Cryptosystems and Signature Schemes," Lecture Notes in Computer Science, 1985, 2 cover pages and pp. 47-53.
Shiuh et al., "An Authentication and Key Distribution System for Open Network Systems," Apr. 1996, pp. 32-41.
Shirvani, Vazrik; PCS-1900, A Sibling of GSM; Spring 1997; 25 pages.
Shostack, Adam; "Apparent Weaknesses in the Security Dynamics Client/Server Protocol;" Oct. 1996; 6 pages.
Siau, K.; Xcert Software, Inc.[1]; To appear in Journal of Information Technology; Nov. 1998; 26 pages.
Siau, K.; Xcert Software, Inc.—Abstract; 1999.
Siebenlist et al.; RFC 68.3—DCE 1.2.2 Public Key Login—Functional Specification; Jan. 1997.
Siebenlist et al.; RFC 68.4—DCE v.r.m. Public Key Certificate Login—Functional Specification; Apr. 1998.
Simpson, W.; RFC 1661—The Point—to—Point Protocol (PPP); Jul. 1994.
Simpson, W.; RFC 1994—PPP Challenge Handshake Authentication Protocol (CHAP); Aug. 1996.
Sirbu, Marvin A., et al., "Distributed Authentication in Kerberos Using Public Key Cryptography," 1997, 8 pages.
Siuda, Karl, et al., "Security Services in Telecommunications Networks," Mar. 1988, pp. 45-52.
Skousen, Alan C., et al., "Resource Access and Protection in the Sombrero Protection Model, Software Protection Data Structures and Hardware Range Protection Lookaside Buffer," ASU 64-bit OS Group White Paper 2, May 7, 1999, 35 pages.
Smith, C.; LDAP for logon?; May 1996.
Smith, Michael J., et al., "Integrating Physical and Computer Access Control Systems," IEEE, 0-7803-1479-4/94, Oct. 1994, pp. 176-179.
Smith, Sean; Secure Coprocessing Applications and Research Issues; Computer Research and Applications Group (CIC-3); Los Alamos National Laboratory; Los Alamos Unclassified Release LA-UR-96-2805; Aug. 1, 1996; (VERI-1606131—VERI-1606147).
Sollins, Karen R., "Cascaded Authentication," IEEE, CH2558-5/88/0000/0156, 1988, pp. 156-163.
SPA, "*Electronics Software Distribution Policies for Software Publishers*," Oct. 7, 1996, 26 pages.
Spurgeon, "Ethernet the Definitive Guide," O'Reilly & Associates, Inc.; Copyright 2000; 529 pages.
Sprint Corporation SEC Form 10-K for FY 1995; 134 pages.
Sprint Corporation SEC Form S-1 for FY 1995; Jun. 21, 1996; 251 pages.
Sprint Nextel Corporation Wiki; salesforcedata.com; 2 pages., Copyright 2013.
Sprint Nextel Corporation; Reference.com; 11 pages, Copyright 2013.
Sprint Spectrum; Answering Machine Guide' 1995; 6 pages.
Sprint Spectrum Awards $500 Million Contract to Qualcomm Personal Electronics for CDMA Portable Phones, Jun. 20, 1996, 2 pages.
Sprint Spectrum Has Memorable Debut; The Baltimore Sun; Nov. 18, 1995; 2 pages.
Sprint Spectrum; Pricing Guide; 1995; 5 pages.
Sprint Spectrum; Service Area Map; 1995; 5 pages.
Sprint Spectrum; Terms and Conditions of Service; 1995; 7 pages.
Sprint Spectrum; Welcome-Ericsson Handset; 1995; 54 pages.
St. Johns, M.; RFC 912—Authentication Service; Sep. 1984.
St. Johns, M.; RFC 931—Authentication Server; Sep. 1984.
Stallings, W.; Mecklermedia's Official Internet World™ Internet Security Handbook; 1995.
Stefik, M.; Letting Loose the Light: Igniting Commerce in Electronic Publication; 1996.
Stefik, M.; Trusted Systems; Mar. 1997.
Steiner, Jennifer, et al., "*Kerberos*: An Authentication Service for Open Network Systems," Jan. 12, 1988, pp. 1-15.
Stronghold; Community ConneXion announces Stronghold version 1.2; Released: Jul. 16, 1996; Red Hat, Inc.; (CA956558-CA956559).
Stronghold; XCert announces co-marketing agreement to reach largest Internet server market; Released: May 13, 1996; Red Hat, Inc.; (CA956560-CA956561).
Stuhlmuller, Rod, "User Identity: The Key to Safe Authentication," Communications News, Mar. 2000, pp. 32, 36, 38.
Tardo, Joseph J., et al., "SPX: Global Authentication Using Public Key Certificates," IEEE, CH2986-8/91/0000/0232, 1991, pp. 232-244.
Taylor, Mark S., William Waung, Mohsen Banan; "Internetwork Mobility-The CDPD Approach;" Jun. 11, 1996; 334 pages.
The Open Group; DCE, Distributing Computing Environment Overview; 1996.
The Open Group; DCE, Distributing Computing Environment, Glossary of Terms; 1996.
The Open Group; DCE, Distributing Computing Environment, OSF DCE 1.2.2 New Features; 1996.
The Open Group; Draft Technical Standard, DCE 1.2.3 Public Key Certificate Login (Draft 0.8 for Company Review); Aug. 1998.
The Open Group; Presentation at The Open Group Member's Meeting re DCE RFC 68.4 Public Key Certificate-Based DCe Login; Apr. 1998.
The Open Group; Press Release: The Open Group and the Securities Industry Middleware Council Announce Security Solution for Wall Street—Integrating Smart Cards and DCE; Jun. 1998.
The Open Group; Technical Standard DCE 1_Authentication and Security Services; 1997.
The Open Group; The Open Group Announces General Availability of DCE 1.2.2 with Security and File System Enhancements; 1996.
The SSL Protocol Version 3.0, Netscape Communications, Nov. 1996.
Thekkath, Chandramohan A., et al., "Implementing Network Protocols at User Level," Technical Report 93-03-01, Mar. 1, 1993, Cover Page & pp. 1-21.
Thompson, Mary R., "Sesame: The Spice File System," Computer Science Department, Carnegie Mellon University Research Showcase, 1985, 33 pages.
TIA/EIA Interim Standard—TDMA Cellular/PCS—Radio Interface—Mobile Station—Base Station Compatability—Traffic Channels and FSK Control Channel—TIA/EIA/IS-136.2-A, Oct. 1996, JDG_PRISM_INV_0017432-831.
TIA/EIA, "Message Type Assignments for the Extended Protocol Facility of ANSI/EIA/TIA-553, EIA/TIA/IS-54, TIA/EIA/IA-88 and TIA/EIA/IS-95," Oct. 1994, 10 pages.
TIA/EIA, "Recommended Minimum Procedures for Validation of Authentication of IS-54B Mobile Stations," Mar. 1993, 44 pages.
TIA/EIA, "IS-54 Implementation Issues," May 1994, 32 pages.
TIS; Defense Department Chooses Trusted Information Systems to Provide Network Firewall Plus E-Mail Security; Trusted Information Systems, Inc.; Jul. 10, 1996; (CA955278-CA955279).
TIS; Firewall Product Functional Summary; NCSA (National Computer Security Association); Trusted Information Systems, Inc.; Jul. 22, 1996; (CA955280-CA955299).
TIS; Firewall User's Overview; Trusted Information Systems, Inc.; Version dated Feb. 8, 1994; (CA955486-CA955490).
TIS; Installing the Trusted Information Systems Internet Firewall Toolkit; Marcus J. Ranum; 1997; (CA955300-CA955347).
TIS; Major Enhancements to Industry-Leading Gauntlet™ Internet Firewall; Trusted Information Systems, Inc.; Jul. 22, 1996; (CA955412-CA955414).
TIS; TIS Firewall Toolkit: Configuration and Administration; Trusted Information Systems, Inc.; Version dated Feb. 17, 1994; (CA955264-CA955277).
TIS; TIS Firewall Toolkit: Overview; Trusted Information Systems, Inc.; Version dated Jun. 30, 1994; (CA955398-CA955411).
TIS; TIS Firewall Toolkit; Trusted Information Systems, Inc.; Sep. 1996; (CA955348- CA955397).
TIS; Trusted Information Systems Enhances Industry-Leading Gauntlet™ Internet Firewall; Trusted Information Systems, Inc.; Jan. 23, 1996; (CA955415-CA955417).
TIS; Trusted Information Systems extends security throughout the network with additions to Gauntlet™ Internet Firewall; Trusted Information Systems, Inc.; Apr. 2, 1996; (CA955418-CA955420).

(56) References Cited

OTHER PUBLICATIONS

TIS; Trusted Information Systems Internet Firewall Toolkit: An Overview; Trusted Information Systems, Inc.; 1993; (CA955421-CA955477).
Tom Sheldon's Linktionary; FORTEZZA Linktionary entry; Aug. 29, 2006.
"*Transmitting large color files*," The Seybold Report on Publishing Systems, Oct. 26, 1994, 9 pages.
Trostle, Jonathan, et al., "A Flexible Distributed Authorization Protocol," IEEE, 1996, pp. 1-10.
Tung et al., Internet Draft, Updates: RFC 1510—Public Key Cryptography for Initial Authentication in Kerberos, JDG_PRISM_INV_0015976-987, expires Dec. 1, 1999, 16 pages.
Tung; The Moron's Guide to Kerberos, Version 1.2.2; Jul. 2005.
Tuvell, W.; RFC 98.0—Challenges Concerning Public-Key in DCE; Dec. 1996.
"Understanding SQL*Net;" copyright 1996; 82 pages.
U.S. Department of Commerce/National Institute of Standards and Technology; FIPS PUB 190—Guideline for the Use of Advanced Authentication Technology Alternatives; Sep. 1994.
U.S. Department of Commerce; Entity Authentication Using Public Key Cryptography; Feb. 1997.
U.S. Government; Demonstration Plan for JWID 97; Feb. 1997.
Udell, Jon; Server and client certificates aren't yet widely used for authentication, but that's changing fast. Here's a progress report.; Web Project; Digital IDs; Mar. 19, 1997; (CA956461-CA956468).
Vandenwauver, Mark, et al., "Public Key Extensions Used in SESAME V4," Apr. 1997, 14 pages.
Vandenwauver, Mark, et al., "Security of Client-Server Systems," May 1997, 17 pages.
Varadharajan, Vijay; Design and Management of a Secure Networked Administration System: A Practical Approach; Jun. 1996; 11 pages.
Varadharajan, Vijay, et al., "An Analysis of the Proxy Problem in Distributed Systems," IEEE, CH2986-8/91/0000/0255, 1991, pp. 255-275.
V-ONE; "V-ONE Announces SmartWall DMS(TM)" Release DMS/Symposium & Demonstration/V-ONE Information; V-ONE Corporation; Dec. 4, 1996; (CA955694-CA955696).
V-ONE; Brian Santo; V-ONE Raises SmartGATE ; (Reprinted from Electronic Engineering Times, Dec. 11, 1995); V-ONE Corporation; (CA956273-CA956275).
V-ONE; Form S-1/A; V-ONE CORP/DE-VONE, Filed Sep. 6, 1996, Amended Registration statement for face-amount certificate companies; (CA956332-CA956449).
V-ONE; Form S-1; V-ONE CORP/DE-VONE, Filed Jun. 21, 1996, General form of registration statement: Initial statement; (CA955843-CA956272).
V-ONE; Former Spyglass Vice President Joins V-ONE; V-ONE Corporation; 1996; (CA955722-CA955723).
V-ONE; General Electric Information Services Teams with V-ONE in New Secure Internet Offering; First Deployment of V-ONE's SmartGATE Enables the World's Only Smart Card Solution on the Internet; (Reprinted from Business Wire, Feb. 9, 1996) V-ONE Corporation; (CA955707-CA955709).
V-ONE; General Electric Information Services Teams with V-ONE in New Secure Internet Offering; First Deployment of V-ONE's SmartGATE enables the World's Only Smart Card Solution on the Internet; (Reprinted from Business Wire, Feb. 9, 1996); V-ONE Corporation; (CA955574-CA955576).
V-ONE; H?bler; Eric; CyberWallet Offered as Secure Way to Conduct Share Trading On-Line; (Reprinted from Securities Industry Daily, Internet Technology, vol. VII, No. 190, Sep. 29, 1995); V-ONE Corporation; (CA957599-CA957601).
V-ONE; Internet Firewalls Frequently Asked Questions; V-ONE Corporation; Marcus J. Ranum; 1995; (CA955632-CA955643).
V-ONE; Karen Rodriquez; New Gateway Verifies Secure Server Link; (Reprinted from Communications Week, Dec. 11, 1995); V-ONE Corporation; (CA955681-CA955682).
V-ONE; Marcus Ranum, Father of Firewall Joins V-ONE as Chief Scientist; V-ONE Corporation; 1996; (CA955728-CA955729).
V-ONE; Marjanovic, Steven; Software Beefs Up Security of Internet Transactions; (Reprinted from American Banker(R), The Daily Financial Services Newspaper; Friday, Feb. 16, 1996, p. 13); V-ONE Corporation; (CA955551-CA955553).
V-ONE; Marjanovic, Steven; Software Beefs Up Security of Internet Transactions; (Reprinted from American Banker(R), The Daily Financial Services Newspaper; Friday, Feb. 16, 1996, p. 13); V-ONE Corporation; (CA955554-CA955556).
V-ONE; MCI and V-ONE Corporation Announce Sales Alliance Agreement; V-ONE Corporation; Jan. 27, 1997; (CA955714-CA955716).
V-ONE; New and Noteworthy: A rundown of recent electronic commerce products and services; (Reprinted from Computerworld, Feb. 5, 1996, vol. 30, No. 6); V-ONE Corporation; (CA955578-955579).
V-ONE; New Network Security Products Spur On-line Interest; (Reprinted from Electronic Commerce News (PBI), Mar. 11, 1996); V-ONE Corporation; (CA955644-CA955647).
V-ONE; Nick Wingfield; V-ONE promises' net security: SmartGATE client/server tool encrypts across TCP/IP; (Reprinted from INFOWORLD, Internet, Dec. 11, 1995); V-ONE Corporation; CA955630-CA955631).
V-ONE; NSA Chooses V-ONE to Protect DMS Networks; (Reprinted from Government Computer News, The National Newspaper of Government Computing, vol. 15, No. 8, Apr. 15, 1996); V-ONE Corporation; (CA955626).
V-ONE; Paul Merenbloom; SmartGate Internet Security gives good name to middleware: Lan Talk; (Reprinted from INFOWORLD, Feb. 19, 1996); V-ONE Corporation; (CA955627-CA955629).
V-ONE; Reva Basch; SmartWall Easing Internet Security Concerns; (Reprinted from PCTODAY, Feb. 1996, p. 34); V-ONE Corporation; (CA955683-CA955685).
V-ONE; Security Middleware: Beyond Firewalls; V-ONE Corporation; Revised: May 23, 1996; (CA955746-CA955747).
V-ONE; Smartgate: Making networks safe for business, Administrator's Guide; V-One Corporation; 1998; (CA957127-CA957460).
V-ONE; SmartGATE; Secure Connectivity over an Untrusted Network; V-ONE Corporation; Jan. 15, 1996; (CA955810-CA955815).
V-ONE; SmartGATE™ A product of Security Middleware; V-ONE Corporation; 1996; (CA956276-CA956277).
V-ONE; SmartWall(TM) to Augment Defense Messaging System: Protecting Highest Military Network; V-One Corporation; 1996; (CA955697-CA955698).
V-ONE; SmartWall(TM) to Augment Defense Messaging System: Protecting Highest Military Network; V-ONE Corporation; 1996; (CA955699-CA955700).
V-ONE; Trusted Information Systems (TIS) Supports V-ONE's Security Middleware Product SmartGate(TM): TIS to Support SmartGATE Technology in Gauntlet Product Family; V-ONE Corporation; 1996; (CA955718-CA955721).
V-ONE; V-ONE Announces Business Alliance With Lockheed Martin Federal Systems in Gaithersburg; V-ONE Corporation; Oct. 31, 1996; (CA955688-CA955690).
V-ONE; V-ONE Announces SmartGate, Enabling Open and Secure Business Transactions on the Internet: New Class of Security Product Allows Businesses to Build a secure Transaction Environment with Existing Legacy or New Client/Server Applications; V-ONE Corporation; Dec. 11, 1995; (CA955691-CA955693).
V-ONE; V-ONE Announces SmartGate, Enabling Open and Secure Business Transactions on the Internet: New Class of Security Product Allows Businesses to Build a Secure Transaction Environment with Existing Legacy or New Client/Server Applications; V-ONE Corporation; 1996; (CA955701-CA955703).
V-ONE; V-ONE Announces SmartWall DMS(TM); V-ONE Corporation; Oct. 25, 1996; (CA955686-CA955687).
V-ONE; V-ONE Chisels Commerce Drawbridge in Internet Firewalls; (Reprinted from Network Computing, Jan. 15, 1996); V-0NE Corporation; (CA955680).
V-ONE; V-ONE Corporation Defines a New Class of Security Products: Security Middleware; Industry's First Security Middleware product, SmartGATE, will be demonstrated at RSA Conference in San Francisco; V-ONE Corporation; 1996; (CA955710-CA955713).

(56) References Cited

OTHER PUBLICATIONS

V-ONE; V-ONE launches smart card at FSU; (Reprinted from Online Banking newsletter, Market intelligence for banking executives, vol. 1, Issue 8, Mar. 11, 1996); V-ONE Corporation; (CA955717).
V-ONE; V-ONE Leader in Providing Internet Security, Expands Reach Through Agreements with 14 Resellers: VARs Cite Hot Market and Corporate Need for Secure Transactions Via Internet; V-ONE Corporation; Sep. 9; (CA957602-CA957604).
V-ONE; V-ONE SmartWall Is Best in Infosecurity News Security Supplement; V-ONE Corporation; 1996; (CA955726-CA955727).
V-ONE; V-ONE to Secure Oracle's Database Network Products; V-ONE Corporation; 1966; (CA955724-CA955725).
V-ONE; V-ONE, Security Dynamics Announce Technological Interoperability: Security Dynamics' Leading SecurID Authentication Compatible with V-ONE's Top-Ranked Firewall, SmartWall; V-ONE Corporation; 1996; (CA955704-CA955706).
V-ONE; V-ONE, Software.com, and VNI Partner to Offer First-Of-Its-Kind Secure Messaging: Sender Authentication and Guaranteed Delivery Now Possible Through Post.Office(TM) with SmartGATE(TM); V-ONE Corporation; 1996; (CA957595-CA957598).
V-ONE; V-ONE's Executive Team; V-ONE Corporation; 1996; (CA956450-CA956451).
Walke, "The Roots of GPRS: The First System for Mobile Packet Based Global Internet Access," IEEE Wireless Communications, Oct. 2013, 20 pages.
Walla, Mark, Keberos Explained, http://technet.microsoft.com/en-us/library/bb742516.aspx, Article from the May 2000 issue of Windows 2000 advantage magazine, © 2000, 6 pages.
Wagner, Mitch; Vanguard makes 'net link with clients (Reprinted from Computer World, vol. 30, No. 8, Feb. 19, 1996); (CA957461-CA957462).
Wallace, B.; RADIUS to secure remote access; Apr. 1995.
Warner, M.; RFC 85.0—Improved Public Key Login Protocols for DCE; Oct. 1995.
Webb, Joseph A., "CD-ROM Expo: Developing with the Industry," Information Today, vol. 6, Issue 10, Nov. 1989, pp. 1, 3, 29, and 30.
Westlaw; (Anonymous); Open Market to acquire Folio Corporation; Information Today; Apr. 1997; ProQuest Info&Learning (VERI-1605301—VERI-1605302).
Westlaw; (Anonymous); Open Market unleashes new class of Web software; Information Today; Apr. 1996; ProQuest Info&Learning (VERI-1605199—VERI-1605202).
Westlaw; (Anonymous); Retail technology online; Chain Store Age; May 1996; ProQuest Info&Learning (VERI-1605196—VERI-1605198).
Westlaw; (Anonymous); Web sheet; Manufacturing Systems; Aug. 1997; ProQuest Info&Learning (VERI-1605276).
Westlaw; Adams, Charlotte; Security applications drive government sales (smart cards); Federal Computer Week; Sep. 19, 1994; vol. 8; Issue 28; (VERI-1606804).
Westlaw; Barnes, Angela; Section: Report on Business; Dow drops 44.83, but Nasdaq raises to record Wall Street puzzled by jobs report; Globe and Mail; Sep. 6, 1997; (VERI-1606833—VERI-1606834).
Westlaw; Block, Valerie; Florida State U. Smartening Up Its Student IDs; American Banker; Mar. 12, 1996, vol. 161; Issue 48; (VERI-1606762—VERI-1606763).
Westlaw; Bowen, Ted Smalley; Powersoft hones Internet tool strategy; InfoWorld; Aug. 26, 1996; ProQuest Info&Learning (VERI-1605184—VERI-1605185).
Westlaw; Bucholtz, Chris; E-entrepreneurs make their mark; Telephony, Internet Edge Supplement; Oct. 6, 1997; ProQuest Info &Learning (VERI-1605256—VERI-1605259).
Westlaw; Card Briefs: On-Line Security Eyed for Florida St. ID Tool; American Banker; Jun. 17, 1996; vol. 161; Issue 115; (VERI-1606752).
Westlaw; Carr, Jim; Users wade through electronic-commerce market; InfoWorld; Jun. 23, 1997; ProQuest Info&Learning (VERI-1605292—VERI-1605296).

Westlaw; Chrysalis-ITS Introduces LunaCA; Cryptography System Adds Trust and Assurance to PKI Certification Authority; Sinocast; Nov. 10, 1997; (VERI-1606829—VERI-1606830).
Westlaw; Cox, John; Cadis brings organization to the Web; Network World; Feb. 10, 1997; ProQuest Info&Learning (VERI-1605310—VERI-1605311).
Westlaw; Damore, Kelley; Hardware makers hit the market with server bundles; Computer Reseller News; May 13, 1996; ProQuest Info (VERI-1605194—VERI-1605195).
Westlaw; Darrow, Barbara; Web produces product storm; Computer Reseller News; Dec. 9, 1996; ProQuest Info&Learning (VERI-1605164—VERI-1605166).
Westlaw; Davis, Beth; Review Set for Secure Directory Access Spec; TechwebNews; Apr. 7, 1997; (VERI-1606866).
Westlaw; Davis, Jessica; Novell commerce server slides; InfoWorld; Jul. 8, 1996; ProQuest Info&Learning (VERI-1605189—VERI-1605190).
Westlaw; Dunlap, Charlotte; Open Market inks alliance with Portland Software; Computer Reseller News; Aug. 18, 1997; ProQuest Info&Learning (VERI-1605283—VERI-1605284).
Westlaw; Dunlap, Charlotte; Open Market woos Web integrators; Computer Reseller News; Aug. 5, 1996; ProQuest Info&Learning (VERI-1605186—VERI-1605187).
Westlaw; Edwars, Morris; The electronic commerce juggernaut; Communications News; Sep. 1997; ProQuest Info&Learning (VERI-1605262—VERI-1605265).
Westlaw; Engler, Natalie; The second coming of electronic commerce; Computerworld; Dec. 15, 1997; ProQuest Info&Learning (VERI-1605229—VERI-1605234).
Westlaw; Erlanger, Leon; Disarming the Net (security challenges resulting from connection to the Internet) (Network Edition) (Internet/Web/Online Service Information); PC Magazine; Jun. 10, 1997; vol. 16; Issue 11; (VERI-1606856—VERI-1606861).
Westlaw; Extruded tubing wall thickness; Modern Plastics; May 1986; (VERI-1606812).
Westlaw; French Payment Developer Puts Banks in the Hot Seat; Bank Technology News; May 1, 1997; (VERI-1606862—VERI-1606864).
Westlaw; Fulcher, Jim; Shopping made easy; Manufacturing Systems; Oct. 1997; ProQuest Info&Learning (VERI-1605238—VERI-1605239).
Westlaw; Geis Using V-ONE SmartGATE; Report on Electronic Commerce; Feb. 20, 1996; vol. 3; Issue 4; (VERI-1606764).
Westlaw; Guenette, David R.; Enterprising information; EMedia Professional; Nov. 1997; ProQuest Info&Learning (VERI-1605240—VERI-1605251).
Westlaw; Harrison, Ann; Reach out and buy something; Software Magazine; Apr. 1997; ProQuest Info&Learning (VERI-1605305—VERI-1605309).
Westlaw; Hudgins-Bonafield, Christy; Bridging the Business-to-Business Authentication Gap; Network Computing; Jul. 15, 1997; (VERI-1606840—VERI-1606849).
Westlaw; Hudgins-Bonafield, Christy; Mapping The Rocky Road to Authentication; Network Computing; Jul. 15, 1997; (VERI-1606837—VERI-1606839).
Westlaw; Hummingbird Does New Java Deal; Newsbytes PM; Sep. 5, 1997; (VERI-1606835).
Westlaw; Hummingbird Gets Secure Java; ENT; Sep. 24, 1997; (VERI-1606831).
Westlaw; Humphrey, John H. et al.; Comparison tests streamline complex dial-up modem measurements and spring some surprises; Electronic Design; May 1987; vol. 35; (VERI-1606807—VERI-1606811).
Westlaw; Internet Security & Privacy; V-ONE and Software.com Provide Secure Messaging; Internet Content Report; Jun. 1, 1996; vol. 1; Issue 6; (VERI-1606755).
Westlaw; Items of Interest; Report on Smart Cards; May 6, 1996; vol. 10; Issue 9; (VERI-1606758—VERI-1606759).
Westlaw; Java security technology licensed from Xcert Software; Canada StockWatch; Sep. 4, 1997; (VERI-1606836).
Westlaw; Jones, Chris; iCat and Cadis link online database to Web; InfoWorld; Feb. 10, 1997; ProQuest Info&Learning (VERI-1605312—VERI-1605313).

(56) References Cited

OTHER PUBLICATIONS

Westlaw; Jones, Chris; OM-Transact connects to invoice and ordering systems; Infoworld; Dec. 9, 1996; ProQuest Info&Learning (VERI-1605174—VERI-1605175).
Westlaw; Jones, Chris; Selling online; InfoWorld; Mar. 17, 1997; ProQuest Info&Learning (VERI-1605274—VERI-1605275).
Westlaw; Jones, Chris; SGI will soon deliver virtual-store tools; InfoWorld; Dec. 23-30, 1996; ProQuest Info&Learning (VERI-1605167—VERI-1605168).
Westlaw; Jones, Chris; Vendors back SET protocol with product announcements; InfoWorld; Feb. 3, 1997; ProQuest Info&Learning (VERI-1605314—VERI-1605315).
Westlaw; Key Management System: Entrust; Network Computing; May 1, 1997; (VERI-1606865).
Westlaw; Kohlhepp, Robert J.; Securing Intranet Data With SSL Client Certificates; Network Computing; Jul. 1, 1997; (VERI-1606852—VERI-1606855).
Westlaw; Krill, Paul; Novell to adopt Java, ActiveX architectures; InfoWorld; Mar. 25, 1996; ProQuest Info&Learning (VERI-1605208—VERI-1605210).
Westlaw; Kruger, Peter; The net takes its toll; Communications International; May 1996; ProQuest Info&Learning (VERI-1605191—VERI-1605193).
Westlaw; Kutler, Jeffrey; Vendors Ready—and Waiting—for E-commerce; American Banker; Feb. 2, 1996; vol. 161; Issue 22; (VERI-1606767—VERI-1606769).
Westlaw; Kutler; Jeffrey; Card Groups Join Electronic Commerce Initiatives Gemplus a Founding Member of Electronic Business Co-op; American Banker; Jun. 12, 1995; vol. 160; Issue 111; (VERI-1606798—VERI-1606799).
Westlaw; Lawton, George; Surf's up! The Internet is here. (part 1) (includes related article); Telephony; Jul. 17, 1995; vol. 229; Issue 3; (VERI-1606788—VERI-1606793).
Westlaw; Lewis, Peter H.; Internet Commerce: Hold the Anchovies; New York Times; Apr. 7, 1995; (VERI-1606800—VERI-1606801).
Westlaw; Maddox, Kate; New Net options for business; Informationweek; Mar. 4, 1996; ProQuest Info&Learning (VERI-1605213).
Westlaw; Making Net Management Easier; Sinocast; Dec. 22, 1997; (VERI-1606827—VERI-1606828).
Westlaw; Masud, Sam; iCat signs 120 VARs, Ingram Micro; computer Reseller News; Jan. 13, 1997; ProQuest Info&Learning (VERI-1605316—VERI-1605317).
Westlaw; Masud, Sam; OpenMarket hopes to cash in on electronic commerce; Computer Reseller News; Oct. 28, 1996; ProQuest Info (VERI-1605178—VERI-1605179).
Westlaw; Messmer, Ellen et al.; Holiday networking extravaganza on tap; Network World; Dec. 9, 1996; ProQuest Info&Learning (VERI-1605160—VERI-1605163).
Westlaw; Messmer, Ellen; Open Market software separates Web content, transaction management; Network World; Mar. 11, 1996; ProQuest Info&Learning (VERI-1605206—VERI-1605207).
Westlaw; Messmer, Ellen; Start-up's service dodges 'Net sales tax; Network World; Jun. 30, 1997; ProQuest Info&Learning (VERI-1605297—VERI-1605298).
Westlaw; Michel, Roberto; The 'Net benefits; Manufacturing Systems; Feb. 1997; ProQuest Info&Learning (VERI-1605277—VERI-1605282).
Westlaw; Millman, Howard; Profit ploys for increased income; InfoWorld; Nov. 3, 1997; ProQuest Info&Learning (VERI-1605235—VERI-1605237).
Westlaw; Mohan, Suruchi; Effective Internet commerce to hinge on directors; InfoWorld; Sep. 8, 1997; ProQuest Info (VERI-1605266—VERI-1605270).
Westlaw; Murphy, Brian; Telecommunications talk; magazines online, new bulletin boards; and new products; Creative Computing; Jan. 1985; vol. 11; (VERI-1606813—VERI-1606816).
Westlaw; Nash, Kim S.; Open Market aids Web site upkeep; Computerworld; Mar. 11, 1996; ProQuest Info&Learning (VERI-1605211—VERI-1605212).
Westlaw; New Products; Defense Daily; Sep. 15, 1997; vol. 2; (VERI-1606832).
Westlaw; New Security Technology Products; Security Technology News; Aug. 26, 1994; vol. 2; Issue 17; (VERI-1606805).
Westlaw; Newing, Rod; A new computing architecture is coming; Management Accounting-London; Dec. 1996; ProQuest Info&Learning (VERI-1605169—VERI-1605173).
Westlaw; Online; Report on Electronic Commerce; Apr. 30, 1996; vol. 3; Issue 9; (VERI-1606876—VERI-1606877).
Westlaw; Orenstein, Alison F.; Banks help merchants tap Internet 'sales floor'; Bank Systems & Technology; Apr. 1997; ProQuest Info&Learning (VERI-1605303—VERI-1605304).
Westlaw; Ostertag, Krista; Tightening the Web, fixing the holes; VARBUSINESS; Apr. 1, 1996; (VERI-1606761).
Westlaw; Pappalardo, Denise; ISPs dress up Web hosting services; Network World; Jul. 28, 1997; ProQuest Info&Learning (VERI-1605290—VERI-1605291).
Westlaw; Personnel Roundup; Newsbytes PM; Oct. 13, 1995; (VERI-1606783—VERI-1606784).
Westlaw; Poole, Jackie; Commerce-enabled sites from ANS; InfoWorld; Jul. 21, 1997; ProQuest Info&Learning (VERI-1605288—VERI-1605289).
Westlaw; Premenos and Open Market Announce Strategic OEM Alliance; PR Newswire; Mar. 4, 1996; The Gale Group; (VERI-1605774—VERI-1605775).
Westlaw; Prince, Cheryl J.; building an Internet payments franchise; Bank Systems & Technology; Sep. 1996; ProQuest Info&Learning (VERI-1605182—VERI-1605183).
Westlaw; Reuters, Jennifer Genevieve; Section: Business; IPOS Looked Golden in '95; Memphis Commercial Appeal; Memphis, TN; Jan. 2, 1996; (VERI-1606771—VERI-1606772).
Westlaw; Reuters; Section: Business; Tech Talk; St. Louis Post-Dispatch; Dec. 13, 1995; (VERI-1606773).
Westlaw; Rodriguez, Karen; Open market targets business; CommunicationsWeek; Mar. 11, 1996; ProQuest Info&Learning (VERI-1605203).
Westlaw; Schmidt, Karen; Section: Metro Hartford; Putting a High-Tech Spin on Computer-Aided Design in Newington; Hartford Courant; Sep. 21, 1995; (VERI-1606785—VERI-1606786).
Westlaw; Section: Business; ACME Sets Agreement to Market Power Unit; Buffalo News; Feb. 22, 1993; (VERI-1606806).
Westlaw; Section: Business; Financing Deal; Hartford Courant; Aug. 26, 1995; (VERI-1606787).
Westlaw; Section: Financial; BioWhittaker Posts 62% Gain in profits for $4^{th}$ Quarter; Baltimore Sun; Dec. 12, 1995; (VERI-1606774—VERI-1606776).
Westlaw; Section: Financial; MD. Software Product Offers Internet Security; Baltimore Sun; Dec. 9, 1995; (VERI-1606779).
Westlaw; Section: Financial; Phone Users Can Join in Testing a Speedier Data-Send Service; Baltimore Sun; Oct. 31, 1995 (VERI-1606780—VERI-1606782).
Westlaw; Spyglass offers software tailoring Mosaic for use by business on the Internet; Software Industry Report; Dec. 19, 1994; vol. 26; Issue 24; (VERI-1606802—VERI-1606803).
Westlaw; Symoens, Jeff; Integration is key to Commerce; InfoWorld; Oct. 13, 1997; ProQuest Info&Learning (VERI-1605254—VERI-1605255).
Westlaw; Symoens, Jeff; Transact 3.0: Scalable solution; InfoWorld; Sep. 8, 1997; ProQuest Info&Learning (VERI-1605271—VERI-1605273).
Westlaw; Technology: Crackdown on Internet security; Financial Times Mandate; May 30, 1996; (VERI-1606756).
Westlaw; Tenderdly (No Page); Jul. 14, 1995; (VERI-1606794).
Westlaw; UK-London: computerized human resource information system (With participation by GATT countries); Tenders Electronic Daily; Jul. 14, 1995; (VERI-1606795—VERI-1606797).
Westlaw; VeriSign Announces New Partners; Report on Smart Cards; May 6, 1996, vol. 10; Issue 9; (VERI-1606757).
Westlaw; Virtual Open Network Environment Corp.; Going Public; Aug. 19, 1996; vol. 20; Issue 34; Securities Data Publishing; (VERI-1606750—VERI-1606751).

(56) References Cited

OTHER PUBLICATIONS

Westlaw; V-ONE Securing Payments with Enhanced Firewalls; Retail Delivery News; Jun. 7, 1996; vol. 1; Issue 12; (VERI-1606753—VERI-1606754).
Westlaw; Wagner, Mitch; Open Market upgrade will support big business on 'net; Computerworld; Dec. 9, 1996; ProQuest Info&Learning (VERI-1605176—VERI-1605177).
Westlaw; Wagner, Mitch; Start-up will outsource 'net transactions; Computerworld; Jun. 30, 1997; ProQuest Info&Learning (VERI-1605299—VERI-1605300).
Westlaw; Walsh, Jeff; Open Market announces SiteDirector 4.1; InfoWorld; Dec. 15, 1997; ProQuest Info&Learning (VERI-1605227—VERI-1605228).
Westlaw; Wexler, Joanie; AT&T rounds out E-commerce line; Network World; Oct. 14, 1996; ProQuest Info&Learning (VERI-1605180—VERI-1605181).
Westlaw; Who's who in the CA market; Network Computing; Jul. 15, 1997; (VERI-1606850—VERI-1606851).
Westlaw; Wilder, Clinton et al.; Pushing outside the enterprise; Informationweek; Aug. 4, 1997; ProQuest Info&Learning (VERI-1605285—VERI-1605287).
Westlaw; Wilder, Clinton et al.; Trusting the Net; Informationweek; Oct. 14, 1996; ProQuest Info&Learning (VERI-1605156—VERI-1605159).
Westlaw; Wilder, Clinton; Distributors get their own shot at Web sales; Informationweek; Sep. 8, 1997; ProQuest Info&Learning (VERI-1605260—VERI-1605261).
Westlaw; Wilder, Clinton; E-commerce gets real; Informationweek; Dec. 9, 1996; ProQuest Info&Learning (VERI-1605153—VERI-1605155).
Westlaw; Wilder, Clinton; E-commerce hosting services to expand; Informationweek; Jul. 22, 1996; ProQuest Info&Learning (VERI-1605188).
Westlaw; Wilder, Clinton; Focus on e-commerce; Informationweek; Oct. 6, 1997; ProQuest Info&Learning (VERI-1605252—VERI-1605253).
Westlaw; Willett, Shawn; Novell to license Java, build online tools; Computer Reseller News; Mar. 18, 1996; ProQuest Info&Learning (VERI-1605204—VERI-1605205).
Westlaw; Wilson, Donald C.; Highest and best use: Preservation use of environmentally significant real estate; Appraisal Journal; Jan. 1996; ProQuest Info&Learning (VERI-1605214—VERI-1605226).
Westlaw; Wilson, Donald C.; The principle of rank substitution; Appraisal Journal; Jan. 1997; ProQuest Info&Learning (VERI-1605318—VERI-1605331).
White, Steve R., et al., "ABYSS: A Trusted Architecture for Software Protection," Proceedings 1987 IEEE Symposium on Security and Privacy, Apr. 27-29, 1987, 2 cover pages and pp. 38-51.
Willens, S., et al.; "Remote Authentication Dial in User Service (RADIUS) draft-ietf-nasreq-radius-01.txt (c);" May 1994; pp. i, ii, and 1-35.
Willens, S., et al., "Remote Authentication Dial In User Service (RADIUS) draft-ietf-nasreq-radius-01.txt (c)," Network Working Group Internet Draft, May 1994, 74 pages.
Wirbel, L.; Management platforms, virtual lans shine at show- NetWorld: gains aplenty; Apr. 1996.
Woo et al.; Authentication for Distributed Systems; Jan. 1992.
Woo et al.; A Framework for Distributed Authorization; 1st Conf. Computer & Comm. Security '93; Nov. 1993; pp. 112-118.
Wood, B.; A Case for Avoiding Security-Enhanced HTTP Tools to Improve Security for Web-Based Applications; Feb. 1996.
Workshop on Network and Distributed Systems Security; Smart Card Augmentation of Kerberos; 1993.
Workshop on Network and Distributed Systems; An Overview of the Advances SmartCard Access Control System; 1993.
Workshop on Network and Distributed Systems; Issues Surrounding the Use of Cryptographic Algorithms and Smart Card Applications; 1993.
Wu; Remote Access Technology: Evaluating the Options; Jul. 1994.
Xcert Software, Inc.; Excerpt from website- Xcert Software, Inc. "Can You get through this door?"; 1996.
XCERT; Can You get through this door?; Xcert Your Authority; Xcert Software Inc.; 1996; (CA957468-CA957469).
XCERT; Fischer International Systems Corporation and Xcert Software Inc demonstrate the first web-based Certificate Authority to interoperate with hardware tokens; Xcert International Inc.; Nov. 12, 1996; (CA956555-CA956557).
XCERT; Keng Siau et al.; Xcert Software Inc.—The Next Step Forward (B); 1997; (CA142771-CA142777).
XCERT; Keng Siau et al.; Xcert Software, Inc. Abstract; 1999; (VERI-0235357—VERI-0235382).
XCERT; Network Computing Magazine Names Xcert's Sentry CA as a 'Well-Connected' Award Nominee; Xcert International Inc.; Mar. 7, 1997; (CA956551-CA956552).
XCERT; Sales FAQ (Frequently Asked Questions): Corporate and Product Overview; Xcert Software, Inc.; 1996-1997; (CA956507-CA956510).
Xcert; Sentry CA (Certificate Authority); 1996.
XCERT; Sentry CA (Certificate Authority); Internet Security Technologies; Xcert International Inc.; 1997; (CA957605-CA957610).
Xcert; Sentry CA Cross-Checks Certificates, *PC Week Online*; Apr. 1997.
XCERT; Software Sentry News Media Backgrounder; Xcert International Inc.; Apr. 17, 1996; (CA956536-CA956538).
XCERT; Software Sentry Technology Announcement; Xcert International Inc.; Apr. 18, 1996; (CA956539-CA956541).
Xcert; The Xcert Sentry Access Control List Module; 1996.
XCERT; Xcert Announces Co-Marketing Agreement to Reach Largest Internet Server Market; Xcert International Inc.; May 14, 1996; (CA956553-CA956554).
XCERT; Xcert Software Announces Support for Litronic NetSign™, Xcert International Inc.; Jun. 11, 1997; (CA956545-CA956546).
Xcert; Xcert Software Inc., Questions and Answers; 1996.
XCERT; Xcert Software Inc.; ./html-docs; Xcert Software Inc.; 1996; (VERI-1605090).
XCERT; Xcert Software is First to Demonstrate Certification Authority (CA) Interoperability; Xcert International Inc.; Mar. 21, 1997; (CA956550).
XCERT; Xcert Software's Certification Authority and Access Control Technology Provides Privacy on Public Networks; Xcert International, Inc.; Jan. 27, 1997; (CA956542-CA956544).
XCERT; Xcert Your Authority; Can You get through this door?; Xcert Software Inc.; 1996-1997; (CA957463-CA957464).
XCERT; Xcert's New Certification Authority and Access Control Technology Offers Unprecedented Safeguards for Electronic Commerce and Communications; Xcert International Inc.; Jun. 24, 1996; (CA956547-CA956549).
Yamaguchi et al., "Design and Implementation of an Authentication System in WIDE Internet Environment," IEEE Region 10 Conference on Computer and Communication Systems, Sep. 1990, pp. 653-657.
Yeong et al.; RFC 1777—Lightweight Directory Access Protocol; Mar. 1995.
Ylönen, T.; SSH—Secure Login Connections Over the Internet; Jul. 1996.
Young et al., "Technologies to Support Authentication in Higher Education," A Study for the UK Joint Information Systems Committee, Aug. 21, 1996, 87 pages.
Zboray, Michael R.; Securing Legacy TCP/IP Applications; Gartner, Inc.; ID No. SPA-AUZ-024; Dec. 28, 1995; (CA955741-CA955745).
Zhong, Q.; Providing Secure Environments for Untrusted Network Applications; Proceedings of the 6th Workshop on Enabling Technologies Infrastucture for Collaboative Enterprises;1997; pp. 277-283.
Zisman, Alan; Local software products helping to blaze the way to secure business dealings on the Internet; Business in Vancouver; Issue #342; May 14, 1996; (CA133828-CA133829).
Ziya, Ruchan, "Security-Encryption Techniques, Cash Protocols, Cash Systems, A Study on the Internet as a Commerce Medium," Excerpts from MSC Thesis, 1997, 52 pages.

\* cited by examiner

FIG. 16 - LOG-IN, USER AUTHENTICATION AND SESSION INITIATION

FIG. 17 - TRANSACTION SERVICE AND LOGGING

FIG. 19 - SESSION RENEWAL

FIG. 21 -
HARDWARE TOKEN
ACCESS DEVICE

FIG. 22 -
MAGNETIC CARD ACCESS DEVICE

FIG. 23 -
SMART CARD ACCESS DEVICE

FIG. 24 -
BIOMETRIC IDENTIFICATION ACCESS DEVICE

SECURE CENTRAL PROCESSING UNIT (CPU) ACCESS DRIVE

MULTIPLE SECURE TRANSACTION SERVERS WITH A
SINGLE TRANSACTION CLEARINGHOUSE

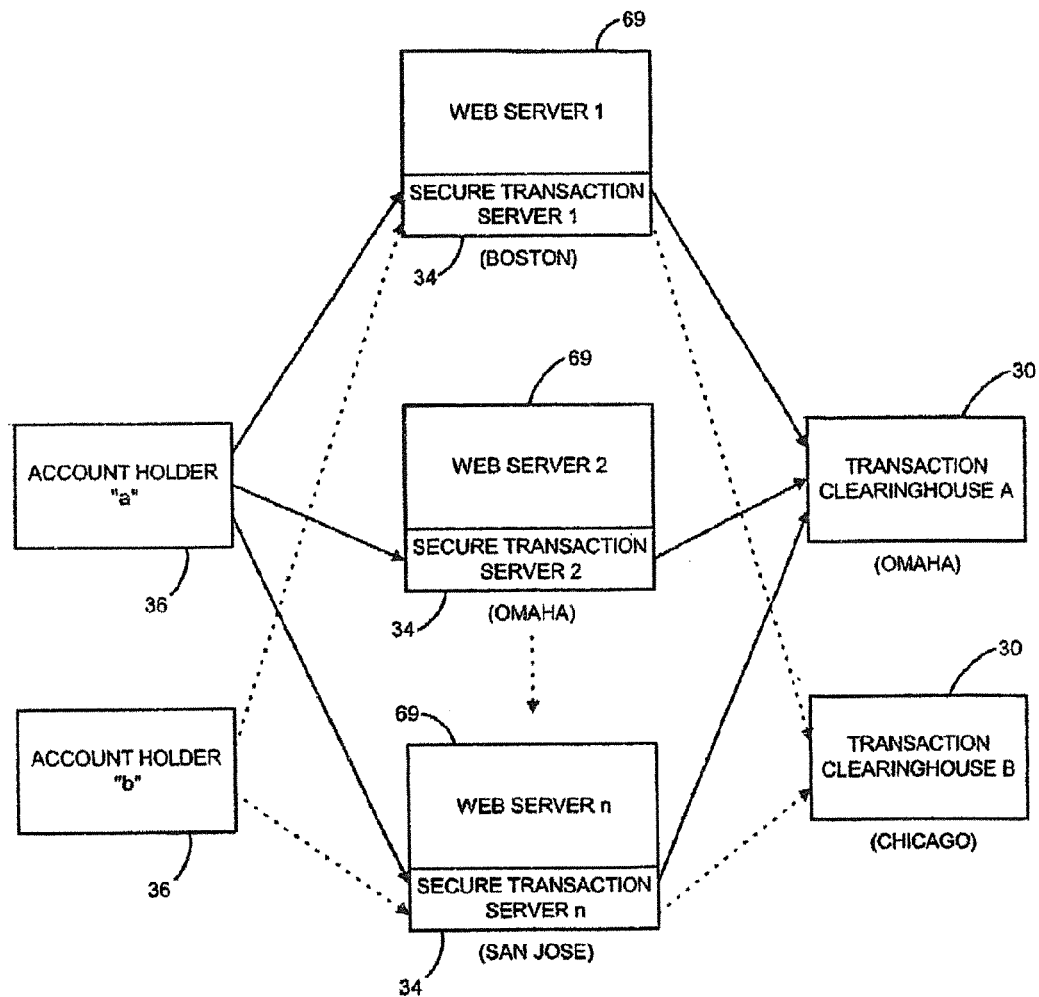
FIG. 27 -
MULTIPLE SECURE TRANSACTION SERVERS WITH
MULTIPLE TRANSACTION CLEARINGHOUSES

METHOD FOR MANAGING ACCESS TO PROTECTED COMPUTER RESOURCES

The present application is a continuation of application Ser. No. 14/549,943, filed Nov. 21, 2014; which is a continuation of application Ser. No. 13/752,036, filed Jan. 28, 2013, now U.S. Pat. No. 8,898,746; which is a continuation of application Ser. No. 12/944,473, filed Nov. 11, 2010, now U.S. Pat. No. 8,387,155; which is a continuation of application Ser. No. 11/978,919, filed Oct. 30, 2007, now U.S. Pat. No. 8,127,345; which is a continuation of application Ser. No. 10/230,638, filed Aug. 29, 2002, now U.S. Pat. No. 7,290,288; which are incorporated herein by reference; and which is a continuation-in-part of application Ser. No. 08/872,710, filed Jun. 11, 1997, now U.S. Pat. No. 6,516,416.

BACKGROUND OF THE INVENTION

1. Field of the Invention

The present invention generally relates to security systems for use with computer networks. More particularly, the present invention relates to a secure transaction system that is particularly adapted for use with untrusted networks, such as the Internet.

2. Description of the Prior Art

There are many businesses that are connected to the Internet or some other untrusted network. Such businesses may provide transaction services without charge for certain transactions that can be accessed by any account holder having access to the network. However, the same business may want to generate revenue from other transaction services and also to protect its business assets. In order to generate revenue, there must be control over account holder access, transaction tracking, account data, and billing. For a business to offer transaction services on an untrusted network, such as the web, it must have access to a web server that connects to the Internet. Any account holder with a web browser can then access the web site.

To implement a secure transaction system for use over the web, businesses need to implement authentication, authorization and transaction tracking. Authentication involves providing restricted access to transaction services that are made available, and this is typically implemented through traditional account holder name-password schemes. Such schemes are vulnerable to password fraud because account holders can share their usernames and password by word of mouth or through Internet news groups, which obviously is conducive to fraudulent access and loss of revenue. Authorization, on the other hand, enables authenticated account holders to access transaction services based on the permission level they are granted. Transaction tracking involves collecting information on how account holders are using a particular web site, which traditionally involved the data mining of web server logs. This information is often inadequate to link web site transaction and a particular account holder who used the web site. There is also no generic transaction model that defines a web transaction, which contributes to the difficulty in implementing an account holder model based upon transactions. Thus, there is a need for an improved secure transaction system and method for securing and tracking usage by a client computer.

SUMMARY OF THE INVENTION

The present invention discloses a system for securing and tracking usage of transaction services or computer resources by a client computer from a first server computer, which includes clearinghouse means for storing identity data of the first server computer and the client computer(s); server software means installed on the first server computer and client software means installed on the client computer(s) adapted to forward its identity data and identity data of the client computer(s) to the clearinghouse means at the beginning of an operating session; and a hardware key connected to the client computer, the key being adapted to generate a digital identification as part of the identity data; the server software means being adapted to selectively request the client computer to forward the identification to the first server computer for confirmation of the hardware key being connected; the clearinghouse means being adapted to authenticate the identity of the client computer responsive to a request for selected services or resources of the first server computer; the clearinghouse means being adapted to authenticate the identity of the first server computer responsive to the client computer making the request; and the clearinghouse means being adapted to permit access to the selected request responsive to successful initial authentication of the first server computer and the client computer making the request; wherein the hardware key is implemented using a hardware token access system, a magnetic card access system, a smart card access system, a biometric identification access system or a central processing unit with a unique embedded digital identification.

These and other objects of the present invention will be apparent from review of the following specification and the accompanying drawings.

BRIEF DESCRIPTION OF THE DRAWINGS

FIG. 27 is a functional block diagram illustrating a system having multiple system servers and multiple system transaction clearinghouses.

DETAILED DESCRIPTION OF THE PREFERRED EMBODIMENT

Broadly stated, the present invention is directed to a secure transaction system that is particularly adapted for use with an untrusted network, such as the Internet worldwide web. As used herein, an untrusted network is defined as a public network with no controlling organization, with the path to access the network being undefined and the user being anonymous. A client-server application running over such a network has no control over the transmitted information during all the phases of transmission. The present invention provides a platform for securing transactions between consumers and suppliers on an untrusted network. Because of its superior design and operation, it is capable of operating servers and transaction clearinghouses in a geographically distributed fashion. The present invention implements its platform by restricting transaction services to only authenticated and authorized account holders and by tracking their transaction in a generic transaction model that can be easily integrated to any billing model.

Figure 1:
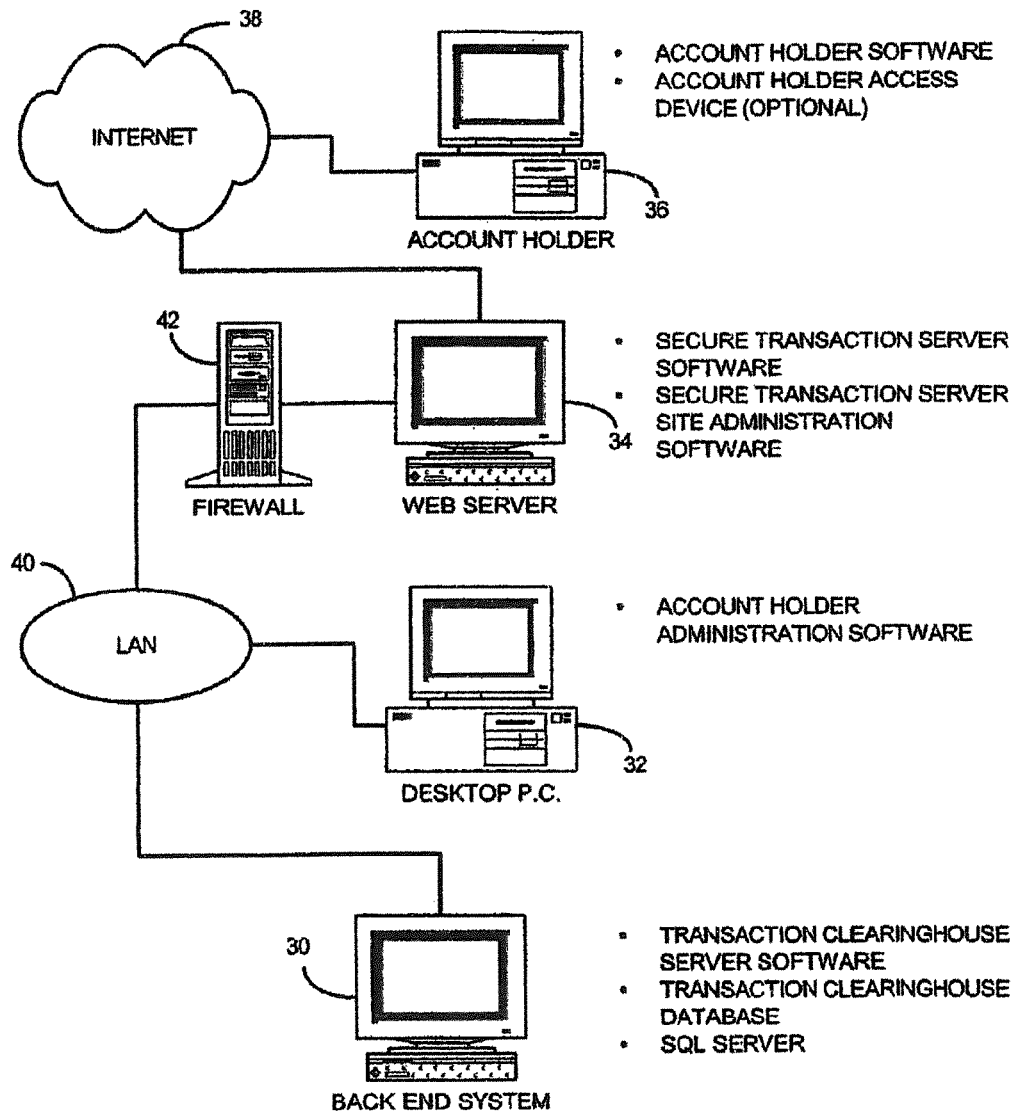
FIG. 1 is a block diagram of the secure transaction system embodying the present invention, wherein a secure transaction server is part of a local area network, with the server being connected to the Internet and to the local area network via a firewall.

The system has four major components as shown in FIG. 1, which are a transaction clearinghouse, indicated generally at 30; account holder administration software, shown generally at 32; a secure transaction server, indicated generally at 34; and a number of account holder software, one of which is shown generally at 36. The account holders are connected to the Internet 38 via a modem connection or a similar means, and the Internet 38 has a connection to the server. The server 34 is connected to a local area network (LAN) 40 through a firewall computer 42. A firewall is used to separate a local area network from the outside world. In general, a local area network is connected to the outside world by a "gateway" computer. This gateway machine can be converted into a firewall by installing special software that does not let unauthorized TCP/IP packets passed from inside to outside and vice versa. The LAN 40 also provides a connection to the account holder administration software 32 and to the transaction clearinghouse 30. While the configuration shown in FIG. 1 has a single secure transaction server 34 and a single transaction clearinghouse server 30, the secure transaction system of the present invention is adapted to be used in other configurations, which may include multiple secure transaction servers being controlled by a single transaction clearinghouse 30 or multiple secure transaction servers that interact with multiple transaction clearinghouses 30. Such flexibility in configurations is an extremely desirable aspect of the present invention.

With respect to the major components of the system as shown in FIG. 1, the transaction clearinghouse 30 preferably resides on a back office platform in a corporate network. It has a secure interface to communicate with the secure transaction servers 34, which reside on the same machine that hosts the web server. The account holder software, on the other hand, resides on the account holder's desktop machine. The transaction clearinghouse server is preferably a Sun UNIX server which runs the transaction clearinghouse server processes and the database server. However, the database server could reside on a separate machine. The transaction clearinghouse is the entity that hosts all of the account and transaction data. The transaction clearinghouse provides a secure interface to the secure transaction servers 34, which enables the secure transaction servers 34 to authenticate the account holders and to send account holders' transaction data to the transaction clearinghouse. The transaction clearinghouse consists of a structured query language (SQL) database, which hosts the transaction clearinghouse database as well as an account holder authentication server for authenticating account holders on behalf of the secure transaction servers and processes online applications. The transaction clearinghouse also includes a transaction server that collects transaction data from the secure transaction servers 34 and updates the transaction clearinghouse database. The transaction clearinghouse also includes administration software 32 that provides a thin client graphical user interface to administer the transaction clearinghouse database.

With respect to the transaction clearinghouse administration software 32, it preferably resides on a desktop PC with a browser and is connected to the LAN 40 so that it can communicate with the transaction clearinghouse database server 30. This software will typically be on the LAN 40 of the organization so that database access through the administration software 32 is restricted within the organization. Using this administration software, an administrator can define the configuration for the account holder services, administer accounts, demographic data and transaction data. In the present invention, it is contemplated that the demographic data can be personal profile information, which may include at least two of the following items of information including: e-mail address, username, password, personal identification number, billing name, billing address, billing city, billing state, billing zip code, billing country, shipping name, shipping address, shipping city, shipping state, shipping zip code, shipping country, shipping method, home phone number, work phone number, cellular phone number, facsimile phone number, credit card number, credit card expiration date, credit card type, debit card number, debit card expiration date, debit card type, card-holders name, date of birth, and social security number.

With respect to the secure transaction server 34, the software for it is preferably located on the same machine that hosts the web server. It is preferably a Sun Solaris machine or comparable computer. The secure transaction server 34 operates in conjunction with the transaction clearinghouse to authenticate and authorize account holders and to collect their transaction data. The secure transaction server 34 also interacts with the account holder software at the account holder computer 36 to provide transaction capture. The secure transaction server 34 consists of a shared object that is incorporated as a part of the web server software. It also has a collection of common gateway interface programs (CGI's) that implement authentication tasks, such as login and access device polling. A session manager is provided for building sessions for every valid account holder so that a transaction list that contains all of the tasks performed during a account holder's session can be kept. The server also includes a thin client site administration software program that provides a web based visual interface to administer the session manager and maintain account holder profiles. The server sends transaction data to the transaction clearinghouse at the end of every account holder's session and includes added functionality for processing and activating online account applications.

The account holder computer 36 includes software that enables an account holder's web browser to access the untrusted network. The account holder desktop PC contains a browser to access the untrusted network and also includes account holder software for enabling the account holder to access secure transaction services. The account holder software, in addition to enabling the access to a web site providing secure transaction services, also allows for enforcement of the login process, re-authentication process and transaction tracking. All of these features are controlled by the secure transaction server 34, which sends specific commands to the account holder software 36 to perform the tasks as needed. The account holder software is a plug-in or control that adds secure transaction functionality to standard browser software. The account holder also includes a hardware key for providing two or three factor authentication. FIGS. 21-25 illustrate the hardware key, which include a hardware token, magnetic card reader, smart card reader, or biometric identification reader connected to each account holder's client computer or alternatively a secure central processing unit as part of the account holder's client computer capable of reading access media that generates a unique digital ID.

The account holder access components preferably use the transmission control protocol/internet protocol (TCP/IP) and transaction datagram protocol/internet protocol (UDP/IP) to communication with each other. Any communication that needs to go through the web server or the web browser will follow the hyper text transfer protocol (HTTP) which is based on TCP/IP. These protocols are well known to those skilled in the art. The account holder's PC accesses web sites using HTTP. The web server and secure transaction server 34 communicate with each other using UDP/IP. The secure transaction server 34 and the transaction clearinghouse 30 preferably communicate with each other using TCP/IP and the transaction clearinghouse servers communicate with a database using open database connectivity (ODBC) drivers most commonly over a TCP/IP network. The transaction clearinghouse administration software 32 communicates with the database using an ODBC driver, most commonly over a TCP/IP or IPX network.

The four main components of the preferred embodiment of the system as described with respect to FIG. 1 interact with one another using a distributed architecture which establishes a many-to-many relationship between the secure transaction servers 34 and the transaction clearinghouse 30. One transaction clearinghouse 30 can be monitoring multiple secure transaction servers 34 while each secure transaction server is interacting with multiple account holders 36. Similarly, a secure transaction server 34 can be configured to interact with multiple transaction clearinghouses 30.

Figure 2:
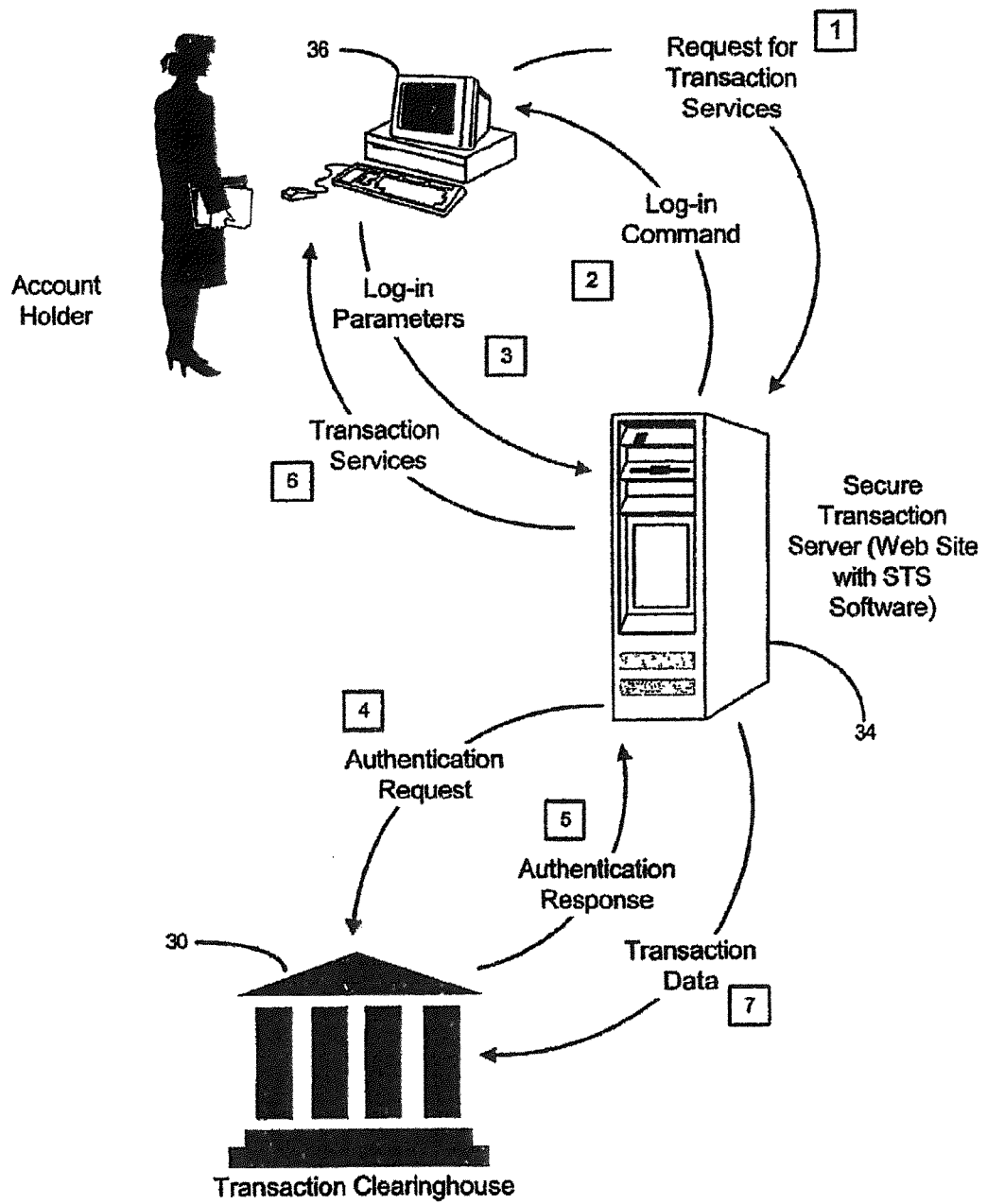
FIG. 2 is a functional block diagram of the secure transaction system embodying the present invention and illustrating the functional interaction of components of the system and a account holder.

The manner in which the preferred embodiment of the system operates in the web environment can be broadly seen by the functional block diagram of FIG. 2, which shows the transaction clearinghouse server 30, secure transaction server 34, and account holder 36 with steps that are taken during a session. The first step is for the account holder software 36 to request transaction services and that request is communicated to the secure transaction server 34 that then commands the account holder to login. The account holder software 36 inputs the login parameters that the secure transaction server 34 then forwards to the transaction clearinghouse. If the parameters are valid, the transaction clearinghouse 30 provides a response to the secure transaction server 34 that then enables the account holder software 36 to access the transaction services. The session transaction data is eventually forwarded for storage by the transaction clearinghouse 30.

Figure 3:
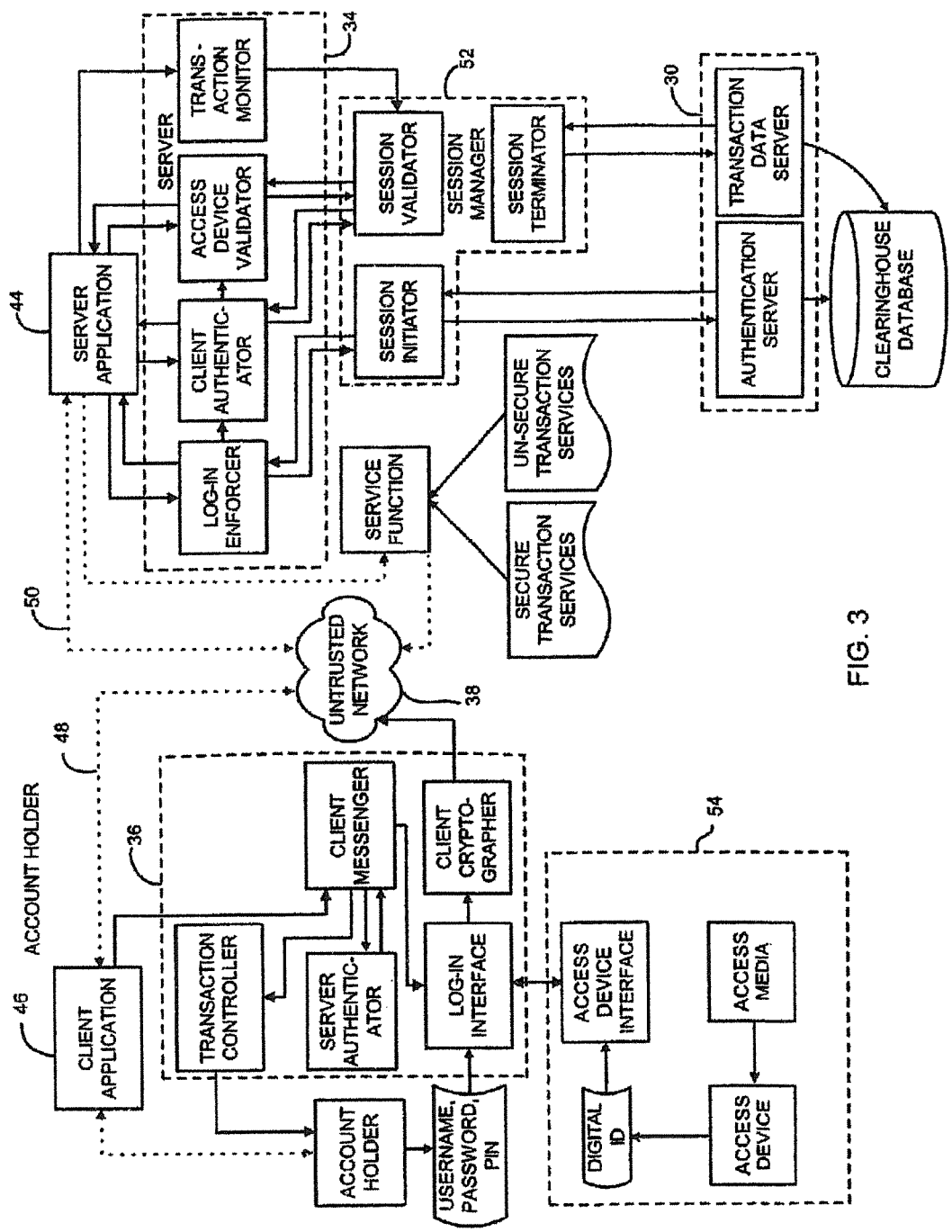
FIG. 3 is a more detailed block diagram of the schema of the present invention.

While the steps that have been described with respect to FIG. 2 are a very broad overview of the preferred embodiment, the functional block diagram of FIG. 3 provides a more detailed general schema of the present invention. The system includes a server application 44, an account holder or client application 46, both of which are connected to an untrusted network via a traditional communication path indicated by the dotted lines 48 and 50. The system includes a session manager 52 for interacting with the transaction clearinghouse 30 and the secure transaction server 34 and a hardware key 54 which is connected to the account holder software 36. The solid lines connecting the blocks of the numbered components of FIG. 3 represent secure communications whereas the dotted lines are conventional communication paths that may not be secure.

Rather than describe the functions of the blocks of FIG. 3, the manner in which these components function will be described in connection with FIGS. 17-23, which provide more detailed flowcharts that relate to specific operations of the system.

Figure 4:
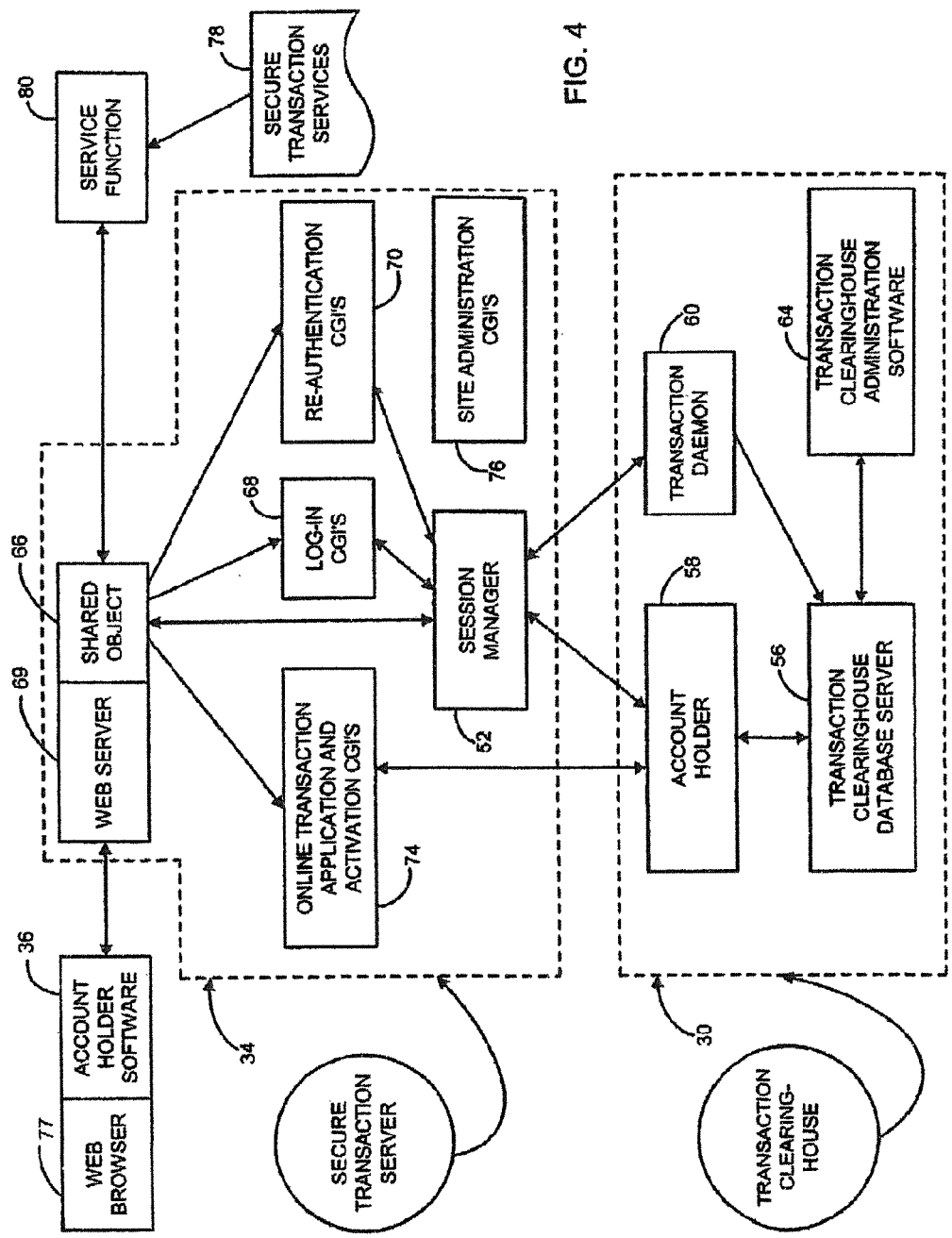
FIG. 4 is a software block diagram illustrating the system architecture of the preferred embodiment in the web environment, also known as the secure transaction system.

The manner in which the system translates into the preferred embodiment in the web environment will be described in connection with the functional block diagram illustrated in FIG. 4. The transaction clearinghouse 30 contains the account and transaction database storage capability. The transaction clearinghouse 30 controls the authentication and authorization of account holders for individually enabled secure transaction web servers. The transaction clearinghouse 30 includes a number of subcomponents, including a transaction clearinghouse database server 56 that provides an open database connectivity (ODBC) interface to a structured query language (SQL) database that contains the account holder database and transaction data warehouse.

The transaction clearinghouse 30 also has an account holder authentication daemon 58 that processes the requests for account holder authentication by the secure transaction servers 34. A daemon 58 is a program that is not invoked explicitly, but lays dormant waiting for one or more necessary conditions to occur such as an incoming request from one of its client programs. For every account holder authentication request, the account holder authentication daemon 58 first insures it is communicating with an authentic secure transaction server 34, and then it queries the transaction clearinghouse database server 56 to find the account holder's information. Based on this information, it sends an authentication response back to the secure transaction server 34. The account holder authentication daemon 58 also processes the secure transaction server's request for an online account holder application and an online account holder activation.

The transaction clearinghouse 30 also includes a transaction daemon 60 that is an independent server process that processes transaction data update requests made by secure transaction servers 34. Similar to the account holder authentication daemon 58, the transaction daemon 60 authenticates secure transaction servers before processing their requests. Upon successful authentication, it will accept all of the transaction data sent by a server and update the transaction clearinghouse database 56 with it. The transaction daemon 60 also authenticates secure transaction servers 34 before processing their request. The transaction clearinghouse 30 has administration software 64 that provides a visual interface on a computer with a web browser to administer the transaction clearinghouse database 56.

With respect to the secure transaction server 34, it runs in conjunction with a web server and is able to provide secure transaction services using the system of the present invention. The secure transaction server 34 authorizes each web transaction that involves account holder access of transaction services and does so by communicating with the account holder software 36 to make the account holders login. If the login is successful, the secure transaction server 34 initiates a session and collects all transaction data so that at the end of a session it can send the transaction data to the transaction clearinghouse. The secure transaction server also provides the functionality of session re-authentication. The secure transaction server includes a number of subcomponents including the session manager 52 which is a server process that processes messages sent by an account holder access shared object 66, an account holder access common gateway interface programs (CGI's) 68 and the transaction clearinghouse 30.

When an account holder 36 tries to log into a secure transaction system enabled web site, the session manager 52 communicates with the transaction clearinghouse 30 to authenticate the account holder. If successful, the session manager will start a new session for the account holder and from that point on, the account holder can access transaction services. Each web transaction during the session is reported to the session manager by the shared object 66 so that the session manager 52 can build a list of transactions for the account holder. At the end of the session, the session manager will send all of the session data and transaction data to the transaction clearinghouse 30 to update the database. If the system is utilizing two or three factor authentication (e.g., the username, password, PIN plus the digital ID generated by the access media read by the hardware key attached to the account holder's computer), the session manager 52 periodically communicates with the shared object 66 to perform re-authentication which involves polling of the account holder software 36 to insure that the hardware key 54 continues to be attached to the account holder computer.

The server shared object 66 is a binary module which provides function pointers to a web server 69 to perform secure transaction server 34 specific operations. To enable this, the server configuration files need to be changed so that the web server 69 knows which transaction services are provided by the secure transaction system. In this way, whenever an account holder attempts to access a transaction service, the server will call upon the account holder access functions that are defined in the shared object 66 and the web server 69 will not process the request for transaction services until it receives permission to do so from these functions. The functions in the shared object 66 insure that the account holder is operating as a valid session. If it is not a valid session, the functions redirect the account holder to the login process so that a new session can be created for the account holder. Once there is an active session, the shared object 66 will grant permission to the web server 69 to process requests for transaction services and once the request has been processed, the shared object sends a message to the session manager 52 about a particular transaction so that the session manager can update its lists of transactions for the active session.

There are a number of account holder access common gateway interface programs (CGI'S) that are a part of the secure transaction server 34, including a login CGI 68. Any time an account holder is redirected by the system shared object 66 to login and start a new session, the login CGI gets executed. These CGI's communicate with the account holder software to authenticate the secure transaction server and send a command to force the account holder to login. When the CGI's get the login parameters sent by the account holder software 36, they send a request to the session manager 52 to authenticate the account holder and start a new session. There is also a re-authentication CGI 70 that is provided. Once a session has been initiated, periodically the shared object 66 will redirect the account holder to get re-authenticated. The re-authentication CGI 70 communicates with the account holder software 36 to poll the account holder's machine for the hardware key 54, and based upon the response, the re-authentication CGI's communicates with the session manager 52 to validate re-authentication and renew the account holder session.

The secure transaction server 34 also includes an online account holder application and activation CGI's 74 which allow a person to apply online for transaction services. The CGI's collect the application data and send it to the transaction clearinghouse 30 that updates the account holder access database. Also, for an existing account holder who is trying to apply for another account, the CGI's will communicate with the transaction clearinghouse to get the account data on the account holder in order to fill out as much of the application automatically as it can. The activation feature is for users who have been approved and are trying to access secure transaction services for the first time. The CGI's for activation insure that the account holder has properly installed the account holder software and then these CGI's will send a message to the transaction clearinghouse to activate the account holder so that these approved users can access the new service. A site administration CGI 76 is another component included for providing an HTML visual interface to define the account holder profile and administer the session manager 52 for that particular account holder profile.

The account holder software 36 is installed on the account holder's personal computer. This software enables a web browser 77 to access the transaction services 78 provided by the secure transaction server. The account holder software is a plug-in or control that adds secure transaction functionality 79 to standard browser software. The account holder software accepts messages from the web server 69 and takes actions as commanded by the secure transaction server such as making the account holder login, polling for the optional hardware key, encrypting the login parameters and sending it to the secure transaction server. The account holder software also authenticates the server 34 before accepting any commands from it so that only authenticate servers can command the account holder software.

Figure 5:
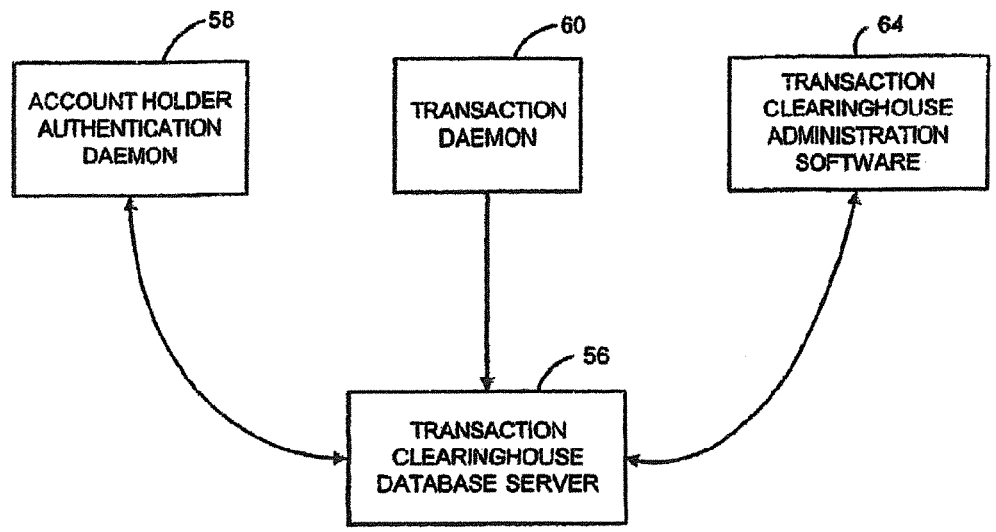
FIG. 5 is a functional block diagram illustrating the structure and operation of the transaction clearinghouse database server process of the preferred embodiment.

Referring to FIG. 5, the main function of the transaction clearinghouse database server 56 is to provide the database interface to the rest of the account holder access components. The transaction clearinghouse database server 56 contains the enterprise-wide account holder and transaction data warehouse. This database server is a SQL server that has an ODBC interface so that the clients can interact with it using ODBC. The processes and application that interact directly with the transaction clearinghouse database server 56 are the account holder authentication daemon 58, the transaction daemon 60, and the thin client transaction clearinghouse administration software 64.

Figure 6:
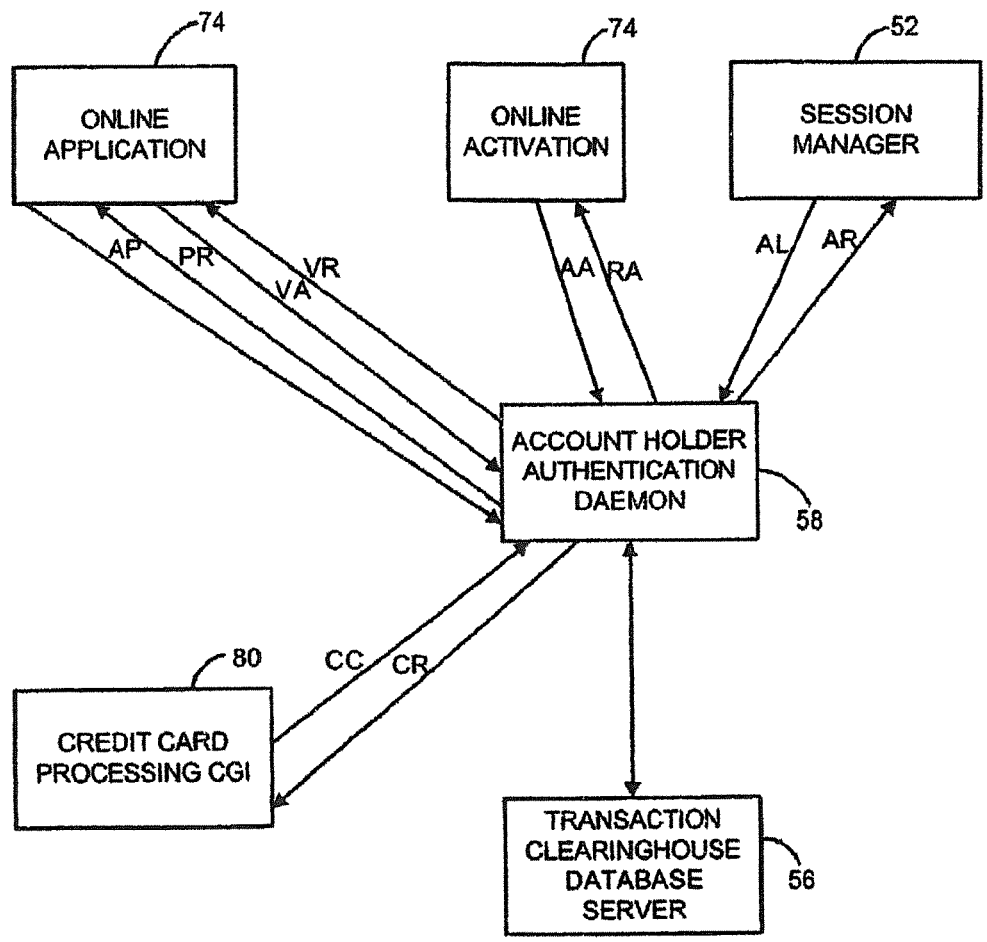
FIG. 6 is a functional block illustrating the structure and operation of the transaction clearinghouse account holder authentication daemon of the preferred embodiment.

Referring to FIG. 6, the account holder authentication daemon 58 interacts with the transaction clearinghouse database server 56, the session manager 52, the account holder application and activation CGI's 74, and any CGI's that use the API's provided by the secure transaction system, such as the credit card processing CGI's 80. In order to start a new session for a account holder, the session manager 52 sends an authenticate login (AL) message to the account holder authentication daemon 58, which queries the transaction clearinghouse database server 56 to find the appropriate account holder records in order to do the login validation. The result of this validation is sent back to the session manager 52 as an authentication response (AR) message.

The online application CGI's 74 interact with the account holder authentication daemon 58 to process an online account holder application. Normally, users fill out an online application form and submit it to one of the online application CGI's which will send all the application data in the form of an application (AP) message to the account holder authentication daemon. The daemon will verify and update the database with the application information and send back an application response (PR) message to the application CGI's indicating the status of the database update.

In cases where an existing account holder is applying for another account, the application CGI's 74 communicate with the account holder authentication daemon 58 to get the account holder information on the current account holder so that the application form can be filled automatically. In order to do this, one of the application CGI's 74 sends a verify application (VA) message to the account holder authentication daemon 58. The daemon will query the transaction clearinghouse database server 64 to verify the applicant and get the account holder information. Based on the query results, it will send a verification response (VR) back to the application CGI 74 which will contain the account holder information. The application CGI 74 will fill out the account holder part of the application form with this information. The account holder fills out the rest and submits the form that gets processed through the AP/PR message mentioned previously.

Once a user has been approved, the user needs to activate the account in order to access transaction services. This can be done online through the online activation CGI's 74. Typically, an approved user (i.e., an account holder) will have to login in order to access the online activation CGI 74, which in turn sends an AA (Activate Applicant) message to the account holder authentication daemon 58 with the approved user's login parameters. The daemon 58 will query the transaction clearinghouse database server 64 to validate this information, and based on the validation results, it will send back an activation response (AR) message to the online activation CGI.

For web applications that need credit card information on account holders, the account holder authentication daemon 58 provides an API to do so. This also assumes that the account holder has logged in successfully and has an active session, which means these web applications need to be secured. In order to obtain the credit card information, these web applications can send a CC (credit card) message to the account holder authentication daemon 58. The daemon will first validate the account holder and if the validation is successful, it will send back a credit response (CR) to the credit card processing web application 78 that includes the account holder's credit card information.

Figure 7:
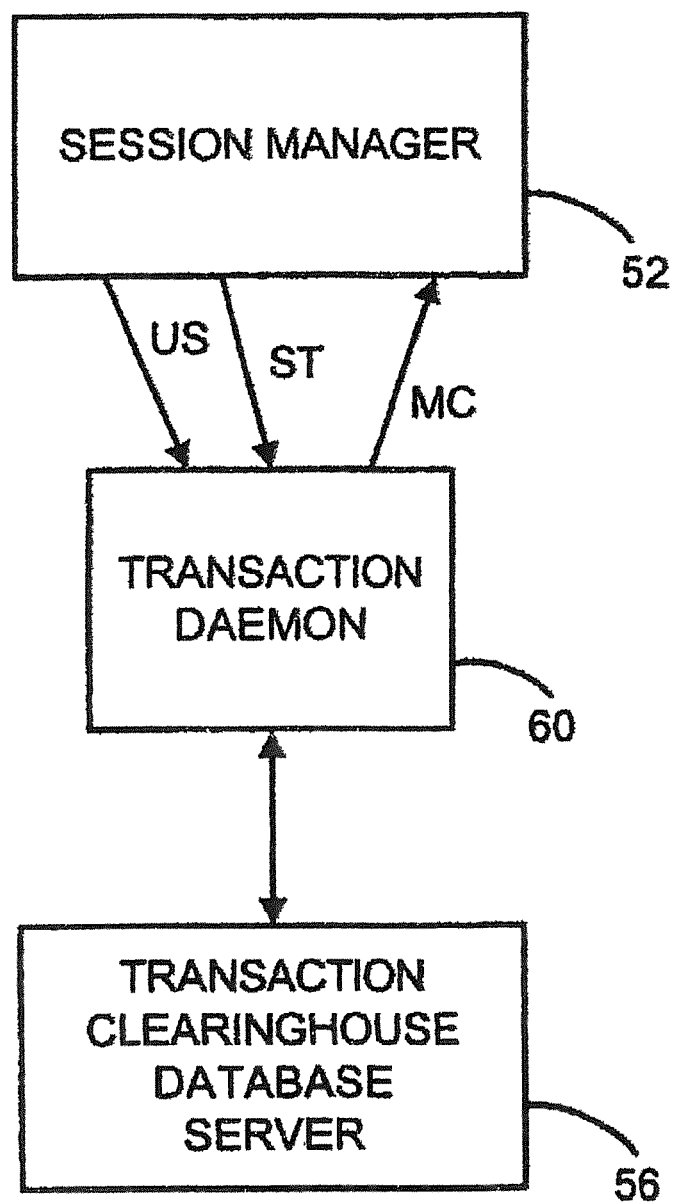
FIG. 7 is a block diagram illustrating the structure and operation of the transaction daemon of the preferred embodiment.

Referring to FIG. 7, the main task of the transaction daemon 60 is to update the transaction clearinghouse database server 56 with transaction data sent by the secure transaction server session manager 52. The transaction daemon 60 is an independent process listening for TCP requests on a specific, well-known TCP port. When a account holder session terminates, the session manager 52 will send a transaction session (US) message to the transaction daemon 60 that provides some generic information about the account holder's session and also the number of transactions in the session. This message is followed by a series of session transaction (ST) messages, where each transaction in that session is represented by a ST message. The transaction daemon 60 reads the US message and the following ST message(s), formulates SQL queries that will update all that data into the transaction clearinghouse database 56. The transaction daemon 60 will then send back a message confirmation (MC) back to the session manager 52 that indicates the status of the database update.

Figure 8:
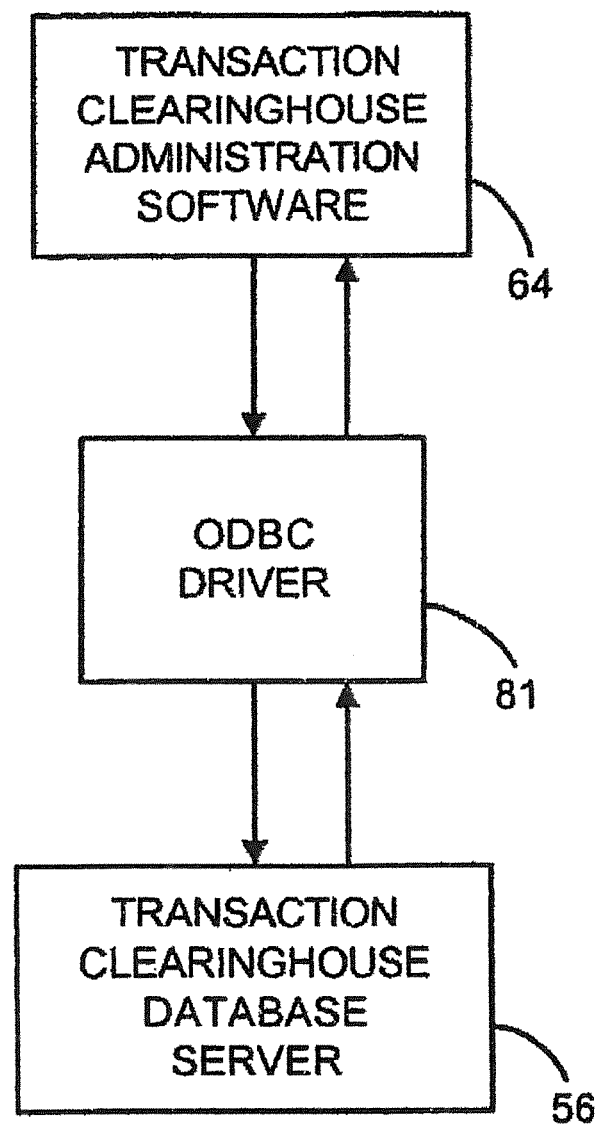
FIG. 8 is a functional block diagram illustrating the structure and operation of the transaction clearinghouse administration software of the preferred embodiment.
Figure 9:
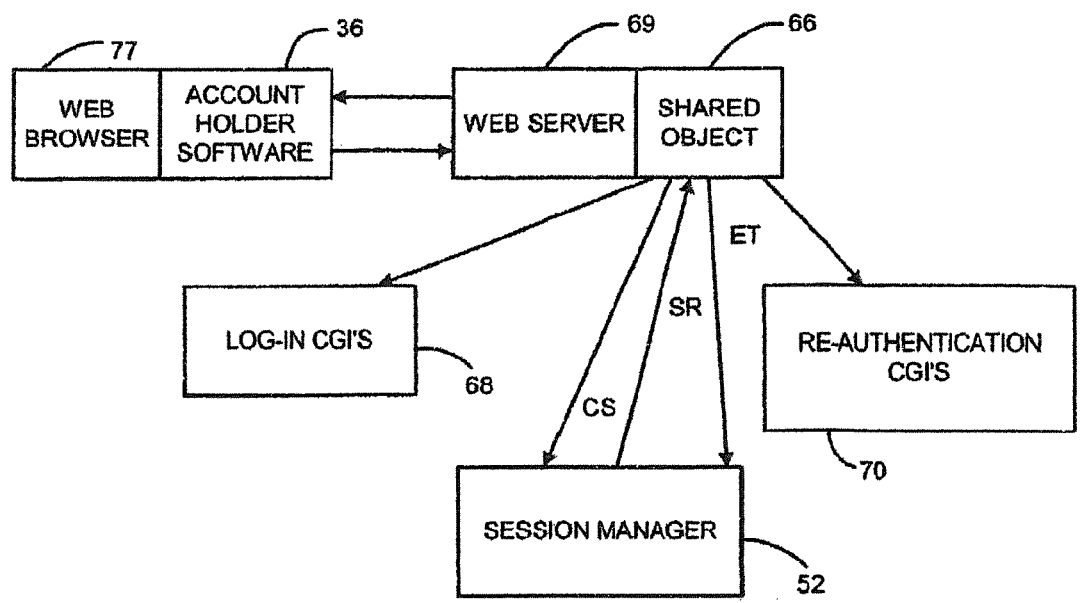
FIG. 9 is a functional block diagram illustrating the structure and operation of the server shared object of the preferred embodiment.

As shown in FIG. 8, the transaction clearinghouse administration software 64 is a thin client GUI web-based application for transaction clearinghouse database administration. This software runs on a computer with a web browser and communicates with the transaction clearinghouse database server 56. This application will typically be on the private network of an organization so that database access through the administration software 64 is restricted within the organization. The administration software 64 allows an administrator to define the particular transaction services that can be accessed by an account holder. It allows entering users as an account holder, approving and activating the account holder, and maintaining account holder profiles. It also provides inquiry screens to peruse transaction data. Also provided are table maintenance screens for the code tables in the database. The transaction clearinghouse servers preferably communicate with a database using open database connectivity (ODBC) drivers 81 most commonly over a TCP/IP network, and the transaction clearinghouse administration software 32 communicates with the database using an ODBC driver 81, most commonly over a TCP/IP or IPX network. As shown in FIG. 9, the account holder access shared object 66 is a binary module that combines with the web server 69 to provide system-specific function pointers to the web server. Thus, when the web server 69 is configured to protect transaction services using the system, it will call upon these system specific functions. These functions provide a variety of features ranging from redirecting an account holder to the login CGI's 68 to communicating with the session manager 52 to authenticate every request for transaction services. Whenever there is an incoming request from a web browser 77 including the account holder software 36 that attempts to access a transaction service, the web server 69 invokes the shared object 66. The shared object 66 calls a secure transaction system function that first looks for an active session ID in the HTTP headers. If it does not find the session ID, it will redirect the account holder to the login CGI's 68 in order to initiate the login process. If it finds a session ID, it sends a check session (CS) message to the session manager 52 to validate the session ID. The session manager 52 will send the results of its validation in a session response (SR) message.

If the SR message has a SUCCESS status, the shared object 66 grants permission to the web server 69 to process the request for the account holder to access transaction services. At the end of processing this request, the shared object 66 calls another secure transaction system function that sends an end transaction (ET) message to the session manager so that the session manager 52 can log the end time for the specific web transaction. Periodically, the SR message will ask the shared object 66 to perform session re-authentication. At such times, the shared object 66 redirects the account holder to re-authentication CGI's 70.

With the system architecture, transactions are protected on a directory level. A web master or a system administrator needs to determine which transactions are to be protected and make sure that all these transactions are organized in separate directories from unprotected transaction services. In this way, the web server configuration can be changed to protect these particular directories using the secure transaction system. Among other things, the configuration parameters also need to state where the session manager 52 is running and the port where it is listening for UDP requests. If there are multiple account holders being hosted from the same web servers 69, it is very important to have their transaction services contained in separate directories, and also very important is to have separate copies of session managers 52 running for each account holder. This ensures that account holder authentication, authorization, and transaction tracking is done separately for separate account holders.

Figure 10:
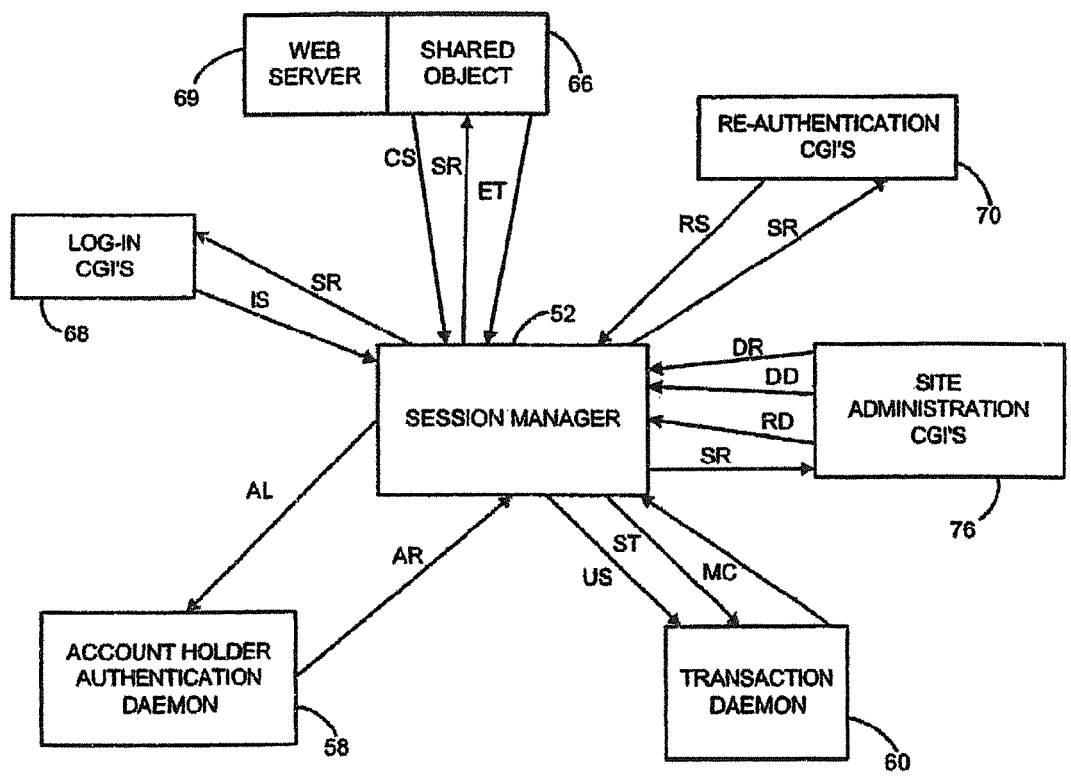
FIG. 10 is a functional block diagram illustrating the structure and operation of the server session manager of the preferred embodiment.

The secure transaction server session manager shown in FIG. 10 is an independent server process. It starts by reading configuration parameters from its configuration file, session-d.conf. It listens for requests on two different ports—one UDP, and one TCP. The UDP port communicates with the account holder access shared object 66 and the account holder access CGI's that reside on the same machine where the session manager 52 is running. The TCP port is for communication with the account holder access transaction clearinghouse daemons.

The session manager 52 maintains a binary tree list of all the active account holder sessions. For every session, it maintains a linked list of all the transactions for that session. As stated in the description of the shared object 66, every time a web request comes in for a transaction service, the web server 69 will invoke the shared object 66. The shared object 66 looks at the web server configuration files to determine which session manager 52 (hostname and UDP port number) to send its check session (CS) message. In processing a CS message, the session manager 52 will traverse its list of active sessions looking for the particular session ID, and sends the result of this search back in a session response (SR) message.

During login, the login CGI's 68 send an initiate session (IS) message to the session manager 52, which will read the login parameters, and send an authenticate login (AL) message to the transaction clearinghouse account holder authentication daemon 58. The session manager 52 will read the account holder authentication daemon's 58 authentication response (AR) and determine whether or not to create a new session entry, and sends a session response (SR) back to the login CGI's 68 indicating the result of the session initiation process.

While processing a CS message sent by the shared object 66, periodically the session manager 52 will find that a particular session needs to be re-authenticated. In such instances, the session manger 52 will respond back to the shared object 66 with a session response (SR) message that tells the shared object 66 to initiate the re-authentication process. The shared object 66 in turn invokes the re-authentication CGI's 70. The re-authentication CGI's 70 perform the re-authentication task with the account holder software 36, and sends the results in a renew session (RS) message to the session manager 52. The RS message contains the newly encrypted digital ID optionally stored on the access media which is read by the hardware key 54 attached to the account holder's machine. The session manger 52 authenticates the digital ID by comparing it to the information it has in the session entry for the particular account holder. The results of this authentication are sent back to the re-authentication CGI 70 in a session response (SR) message.

During specific time intervals as set in the session manger 52 configuration, the session manager goes through its list of sessions and times out any idle sessions, flagging them as inactive. These are sessions that have not had an activity in the last n seconds, where n is a session manager configuration (REFRESH_TIME) value. For each one of these inactive sessions, the session manager 52 initiates a process that will send all the transaction data collected for that session to the transaction clearinghouse's transaction daemon 60. The process first reads the session-entry and sends a transaction session (US) message that will tell the transaction daemon 60 how many transaction entries will be sent for that session. The US message is followed by a series of session transaction (ST) messages where each ST message represents a transaction for that session. The process terminates after sending all the US and ST messages. The transaction daemon 60 will update the transaction clearinghouse database with all the transaction data, and sends a message confirmation (MC) message back to the session manager 52. The session manager 52 determines which specific session the MC message is for, and deletes that session and its transactions from its list. If the MC message status is not successful, the session manager 52 tries to resend the transaction data. The number of retries is set in the session manager 52 configuration. If it is still unsuccessful, then the session manger 52 sends an e-mail to the system administrator indicating the error in transaction data update.

Another entity that the session manager 52 performs processing for is the site administration CGI's 76. The specific operations provided are data recovery, data dump, and data restore features. During data recovery, the site administration CGI's 76 send a DR (data recovery) message to the session manager 52. The session manager 52 will retry sending the transaction data for the session(s) specified in the DR message to the transaction clearinghouse's transaction daemon 60.

During a data dump, the site administration CGI 76 sends a data dump (DD) message to the session manager 52 who makes a copy of all the active session data into a flat text file under the filename specified in the DD message. During a restore dump, the site administration CGI 76 sends a restore dump (RD) message to the session manager 52 who reads the dump file as named in the RD message and builds its list of sessions and transactions from the dump file data. To all these messages (DR, DD, RD), the session manager 52 sends a SR message back to the site administration CGI's 76 indicating the results of the particular operations whether they were successful or not.

Figure 11:
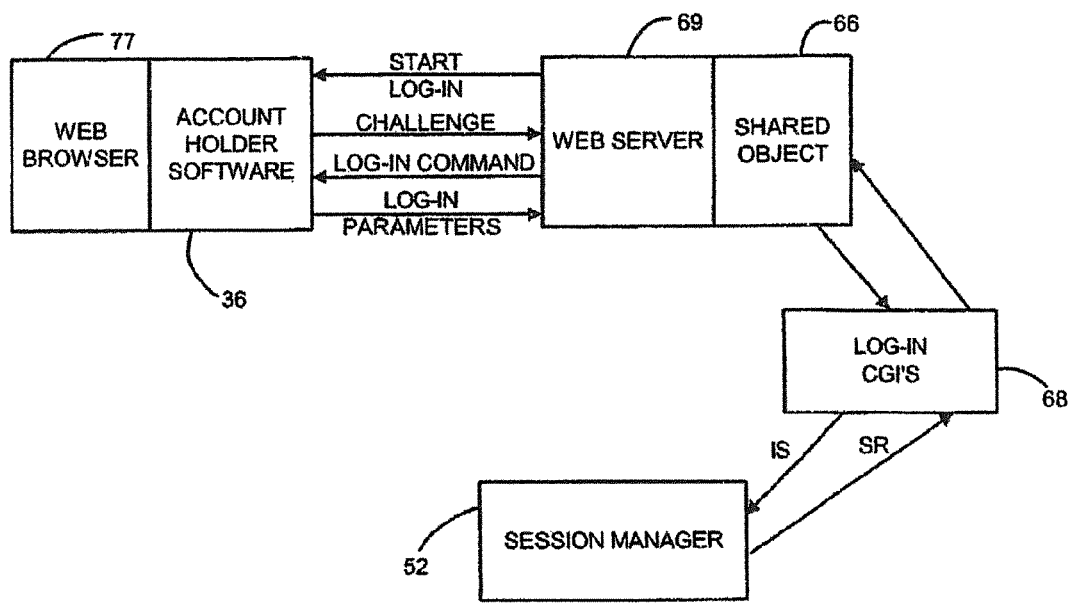
FIG. 11 is a functional block diagram illustrating the structure and operation of the server login common gateway interface (CGI) program of the preferred embodiment.

Referring to FIG. 11, the login CGI's 68 is initiated when the shared object 66 redirects a account holder to login. It first sends a start login message to the account holder software 36 combined with the web browser 77 through the web server 69. The account holder software 36 then creates a random challenge and sends it to the login CGI's 68 for secure transaction server authentication purposes. The login CGI's 68 encrypts the secure transaction server's password using the challenge sent by the account holder software 36 and sends it back to the account holder software along with a login command and a new random challenge created by the login CGI 68. The account holder software 36 then authenticates the secure transaction server's password, and if it authenticates successfully, it will force the account holder to login. The login parameters obtained from the account holder and the hardware key 54 are encrypted using the challenge sent by the login CGI 68, and sent back to the login CGI.

The login CGI's 68 take the encrypted login parameters sent by the account holder software 36 and send an initiate session (IS) message to the session manager 52. The session manager 52 conducts the account holder verification with the aid of the transaction clearinghouse 30 and sends back a session response (SR) indicating if a new session entry was created. If SR status is successful, the login CGI 68 will put the session ID in the HTTP headers for re-authentication purposes.

Figure 12:
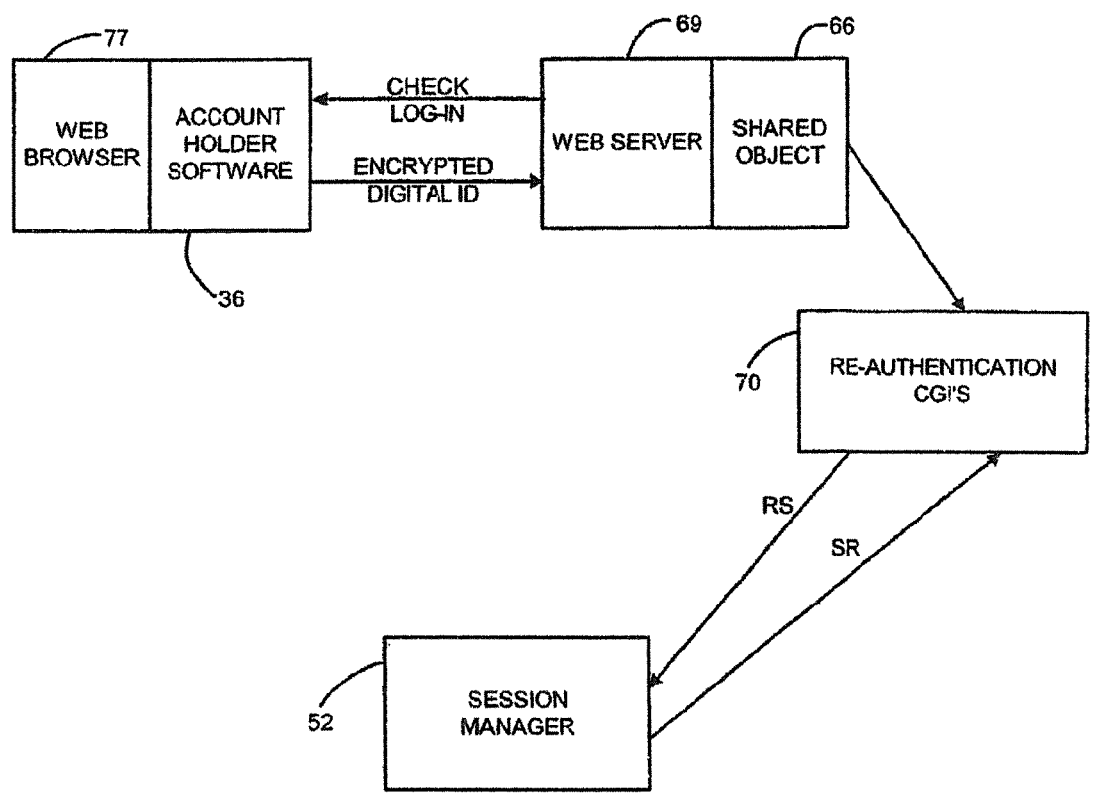
FIG. 12 is a functional block diagram illustrating the structure and operation of the server re-authentication common gateway interface (CGI) program of the preferred embodiment.

As shown in FIG. 12, the re-authentication CGI's 70 are invoked by the account holder access shared object 66. The web server 69 sends a check login message to the account holder software 36 combined with the web browser 77 with a newly created challenge. In response to this message, the account holder software 36 polls the hardware key 54, reads the digital ID from the access media, and encrypts it using the challenge sent by the re-authentication CGI's 70, which is sent back to the re-authentication CGI 70 who will validate the information by sending a renew session (RS) message to the session manager 52. The session manager 52 validates the encrypted digital ID and sends back a session response (SR) message indicating the status of the re-authentication. If SR status is successful, the re-authentication CGI 70 redirects the account holder to the protected transaction services, otherwise they are directed to the login process.

Figure 13:
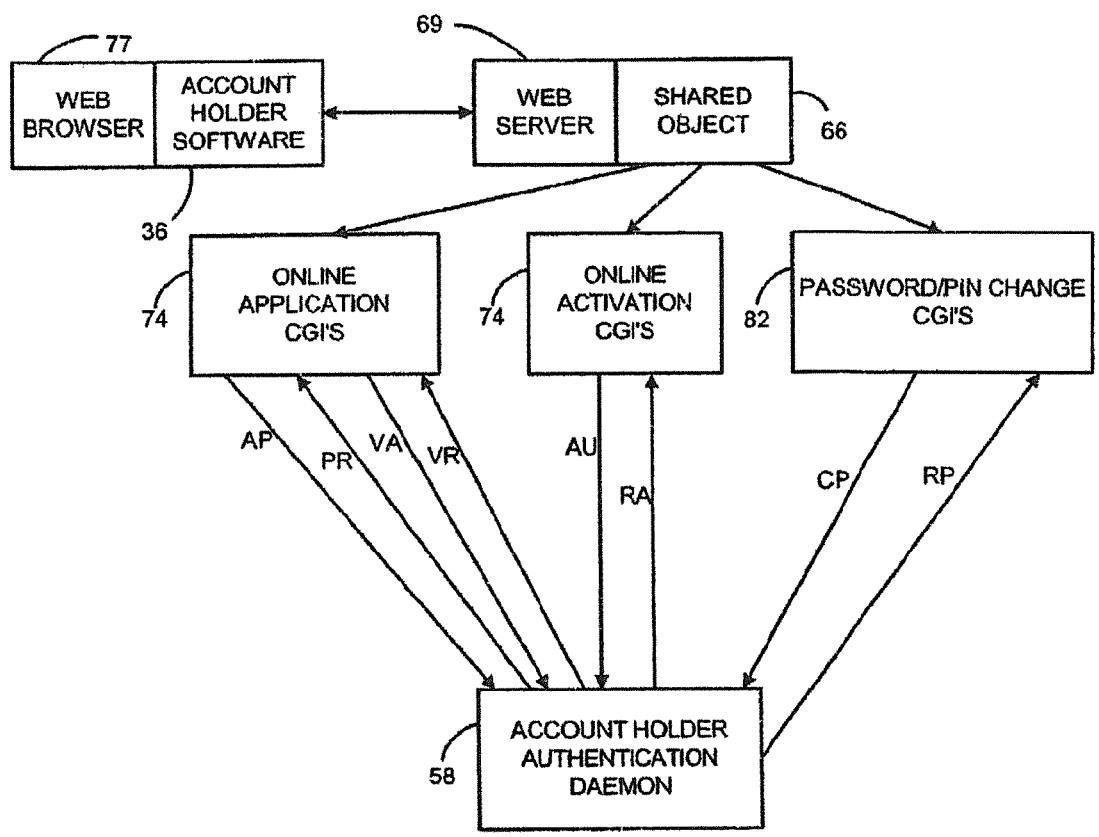
FIG. 13 is a functional block diagram illustrating the structure and operation of the server online application and activation common gateway interface (CGI) program of the preferred embodiment.

Referring to FIG. 13, the online application process is initiated by a new user filling out an HTML application form and submitting it to the application CGI 74. If the user is an existing account holder, a separate link can be activated by the user that will automatically fill out the demographic part of the application form. When an existing account holder goes through this link, the account holder must login. The particular application CGI 74 will then send a verify application (VA) message to the account holder authentication daemon 58. The daemon 58 will first authenticate the account holder, and if the authentication is successful, it will send back the demographic information on the account holder in its verification response (VR) message. The application CGI 74 will fill out the HTML application form with the information in the VR message. For a user who is not an existing account holder, the user is required to go to the application form directly to manually fill out all the fields, and submit the form back to the web server 69.

When the application form is submitted to the web server 69, the application data is sent to another application CGI 74 who will send an application (AP) message to the account holder authentication daemon 58. The daemon 58 will verify all the application data and update the transaction clearinghouse database. The result of the database update is sent back to the application CGI 74 in an application response (PR) message. The application CGI 74 will then display the result of this process to the user on the web browser 77.

The application approval process can be conducted in a variety of ways. For account holders offering one-factor authentication only, where a hardware key 54 is not used, a user can be instantly approved during the time of application, in which case the PR message contains the username, password, PIN assigned to the user. This information is immediately displayed back to the user so that the user can quickly proceed with the account holder activation process. Alternatively, another method is not approving the application immediately. Instead, a system administrator will perform additional processing of the application data to ensure that the user meets all the prerequisites of being an account holder. This could involve things like collecting payment, credit checks, etc. Once the requirements are met, the system administrator can approve the user using the transaction clearinghouse administration application software.

The result of the application approval process is that the user will now be assigned a unique account username and a password. If the account holder uses two-factor authentication, the approval process also involves assigning a unique digital ID to the user, and microcoding that digital ID into the access media read by the hardware key 54. All this information (username, password, PIN, digital ID), the user's hardware key and access media 54, and the account holder software 36 need to be made available to the approved user so that the user can successfully install the hardware key and account holder software 36 on the desktop, and proceed with the activation process.

The activation process is complete when the user becomes an account holder for a particular set of transaction services. Similar to the application process, this can be done through either online or through the account holder administration software 32. Online activation requires an approved user to install the account holder software on their desktop and visit the activation URL using the web browser 77. When the user clicks on the activation URL, the user must login. At this point, the approved user will use the username, password, PIN and the hardware key when using a two-factor authentication login. The activation CGI 74 takes all this information and sends an approve user (AU) message to the transaction clearinghouse's account holder authentication daemon 58. This daemon 58 will accept the AU message, and verify all the information with the approved user's information in the transaction clearinghouse database. If the verification is successful, the account holder authentication daemon 58 will create a new account holder record for the user if there is not already one, and also create a new account holder record for the particular account holder(s) for which the user was approved for. The result of this process is sent back to the activation CGI in an activation response (RA) message. If RA message status is successful, the activation CGI 74 will display a successful activation message to the account holder, and give the account holder an option to change their password if desired. Otherwise, the activation CGI 74 will display the error message explaining why application activation could not be conducted successfully.

A feature of the online application and activation process is the password change feature that can be made available as a separate link in a secured web site. This link must be protected by the system so that only valid account holders can use this feature. When this link is accessed, a password/PIN change form is displayed to the account holder where they type in the old and new passwords/PINs. Once this form is submitted, a password/PIN change CGI 82 will send a change password/PIN (CP) message to the account holder authentication daemon 58 in the transaction clearinghouse that will verify the account holder and the old password/PIN. If the verification is successful, the account holder authentication daemon 58 will make the password/PIN change in the transaction clearinghouse database. The status of this process is sent back to the password change CGI 82 in a password/PIN response (RP) response. Based on the RP message status, the password/PIN change CGI will display a message to the account holder indicating whether the password/PIN change was carried out successfully.

Figure 14:
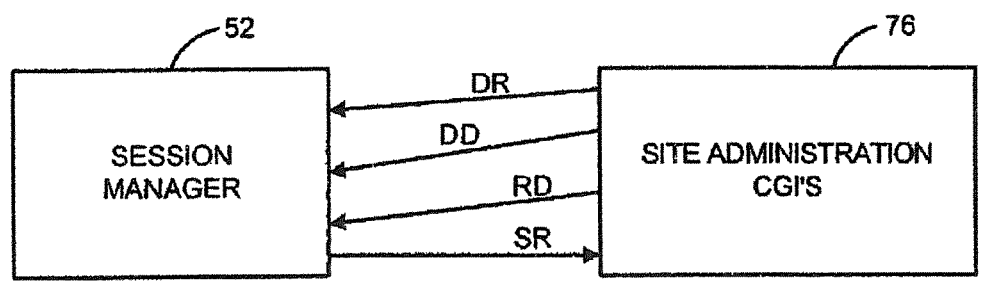
FIG. 14 is a functional block diagram illustrating the structure and operation of the server site administration common gateway interface program of the preferred embodiment.

As shown in FIG. 14, the site administration CGI's 76 allows for the session manager configuration entries to be defined and maintained through an HTML interface. It also allows for the starting, stopping, and restarting of the session manager(s) 52. The specific operations provided by the site administration CGI's 76 that involve message interaction with the session manager 52 are the data recovery, data dump, and the data restore features. During a data recovery, the site administration CGI's 76 send a DR (data recovery) message to the session manager 52. The session manager will retry sending the transaction data for the session(s) specified in the DR message to the transaction clearinghouse's transaction daemon 60.

During data dump, the site administration CGI 76 sends a data dump (DD) message to the session manager 52 that makes a copy of all the active session data into a flat text file under a specified filename in the DD message. During restore dump, the site administration CGI 76 sends a restore dump (RD) message to the session manager 52, which reads the named dump files(s) from the RD message and builds a list of sessions and transactions from the dump file data. For any of these messages (DR, DD, RD), the session manager 52 sends a SR message back to the site administration CGI's 76 for indicating the results of success or failure for these particular operations.

FIGS. 4-14 described the software components of the preferred embodiment. The specific operations of the system will now be described in connection with the flow charts of FIGS. 15-20. In order to distinguish the present invention from the preferred embodiment in the web environment, the flowcharts use different terminology for the system components. The following table provides a cross reference between the flowchart components and the preferred embodiment.

| FLOWCHART COMPONENTS | REFERRED EMBODIMENT ONTO WEB ENVIRONMENT |
| --- | --- |
| Client Application | Web browser |
| Client Messenger | a module of account holder software |
| Server Authenticator | a module of account holder software |
| Log-in interface | a module of account holder software |
| Access device interface | a module of account holder software |
| Client Cryptographer | a module of account holder software |
| Content Controller | a module of account holder software |
| Network transaction tracker | a module of account holder software |
| Server Application | Web Server |
| Communication Headers | HTTP headers |
| Client Authenticator | a module of Shared Object for Web Server |
| Transaction Monitor | a module of Shared object for Web Server |
| Log-in Enforcer | Log-in CGI's |
| Access device Validator | Re-authentication CGI's |
| Session Validator | a module of Session Manager |
| Session Initiator | a module of Session Manager |

-continued

| FLOWCHART COMPONENTS | REFERRED EMBODIMENT ONTO WEB ENVIRONMENT |
| --- | --- |
| Session Terminator | a module of Session Manager |
| Authentication Server | Transaction clearinghouse Account holder authentication daemon |
| Transaction Data Server | Transaction clearinghouse Transaction daemon |

Figure 15:
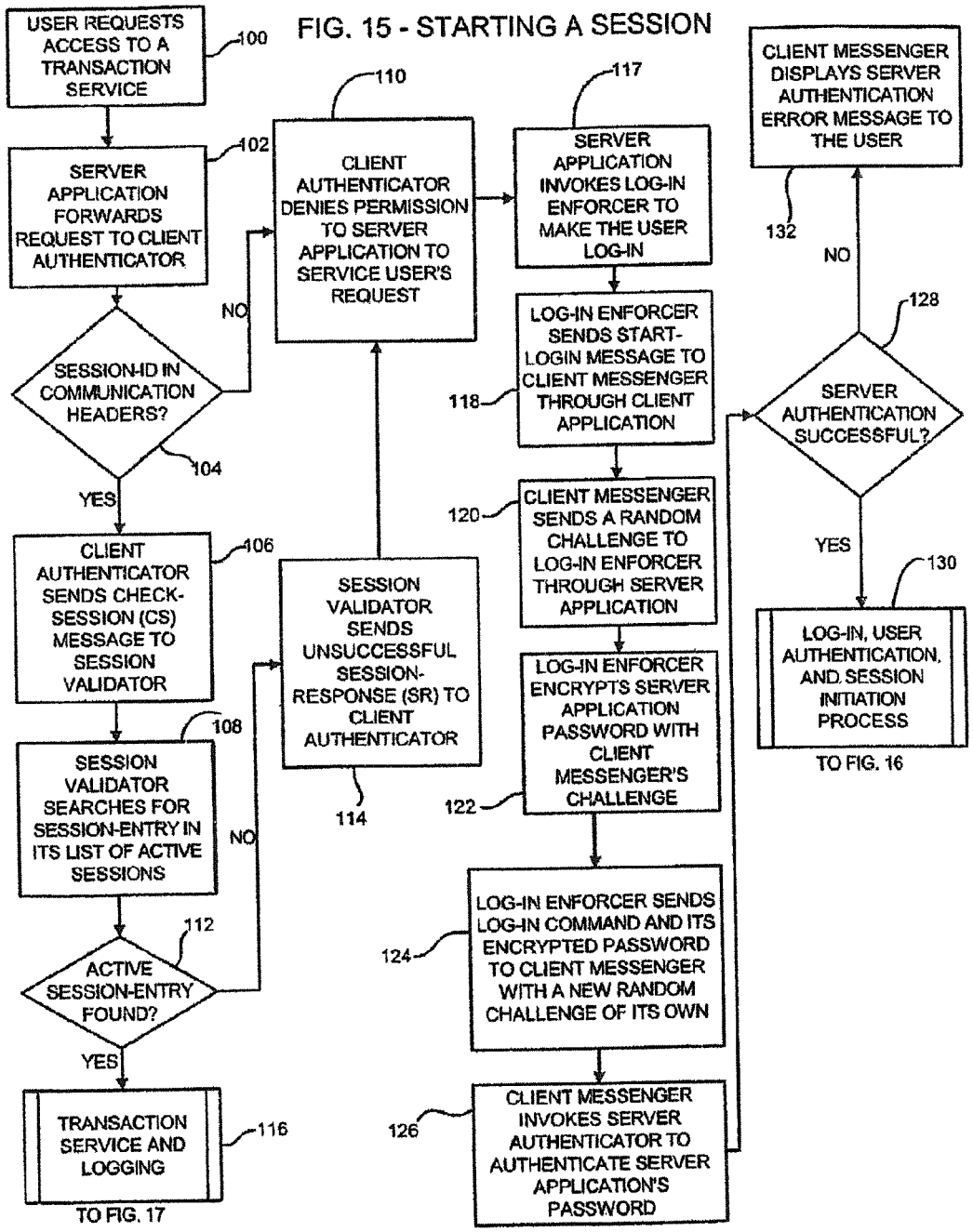
FIG. 15 is a flow chart of the operation of the system at the start of a session where a account holder requests access to a secure transaction.

Referring to FIG. 15, the flow chart illustrating the sequence of steps that occur during the start of a session is illustrated and begins with the account holder requesting access to a transaction service (block 100). The server application forwards the request to the client authenticator (block 102). If the session ID is in the communication headers (block 104), the client authenticator sends a check session message to the session validator (block 106), and the session validator searches for a session entry in its list of active sessions (block 108). If the session ID in not in the communication headers (block 104), the client authenticator denies permission to the server application for servicing the account holder's request (block 110). Also, if the active session entry is not found (block 112), the session validator sends an unsuccessful session response to the client authenticator (block 114). However, if there was an active session entry found, a subroutine of transaction service and logging is initiated (block 116), which will be described later in conjunction with FIG. 17. If the client authenticator, on the other hand, denies permission to the server application (block 110) when the session ID is in the communication header (block 104) or after the session validator sends an unsuccessful session response (block 114), the server application invokes the login enforcer to make the account holder login (block 117). This results in a start login message being sent to the client messenger through the client application (block 118). The client messenger then sends a random challenge to the login enforcer through the server application (block 120), and the login enforcer encrypts the server application password with a client messenger challenger (block 122). The login enforcer then sends a login command in its encrypted password to the client messenger with a new random challenge of its own (block 124), and the client messenger then invokes server authenticator to authenticate server applications password (block 126). If the server authentication is successful (block 128), another subroutine of a login, account holder authentication and session initiation process is initiated (block 130), which will be described in conjunction with FIG. 16. If not, the client messenger displays a server authentication error message to the account holder (block 132), and the process is completed.

Figure 16:
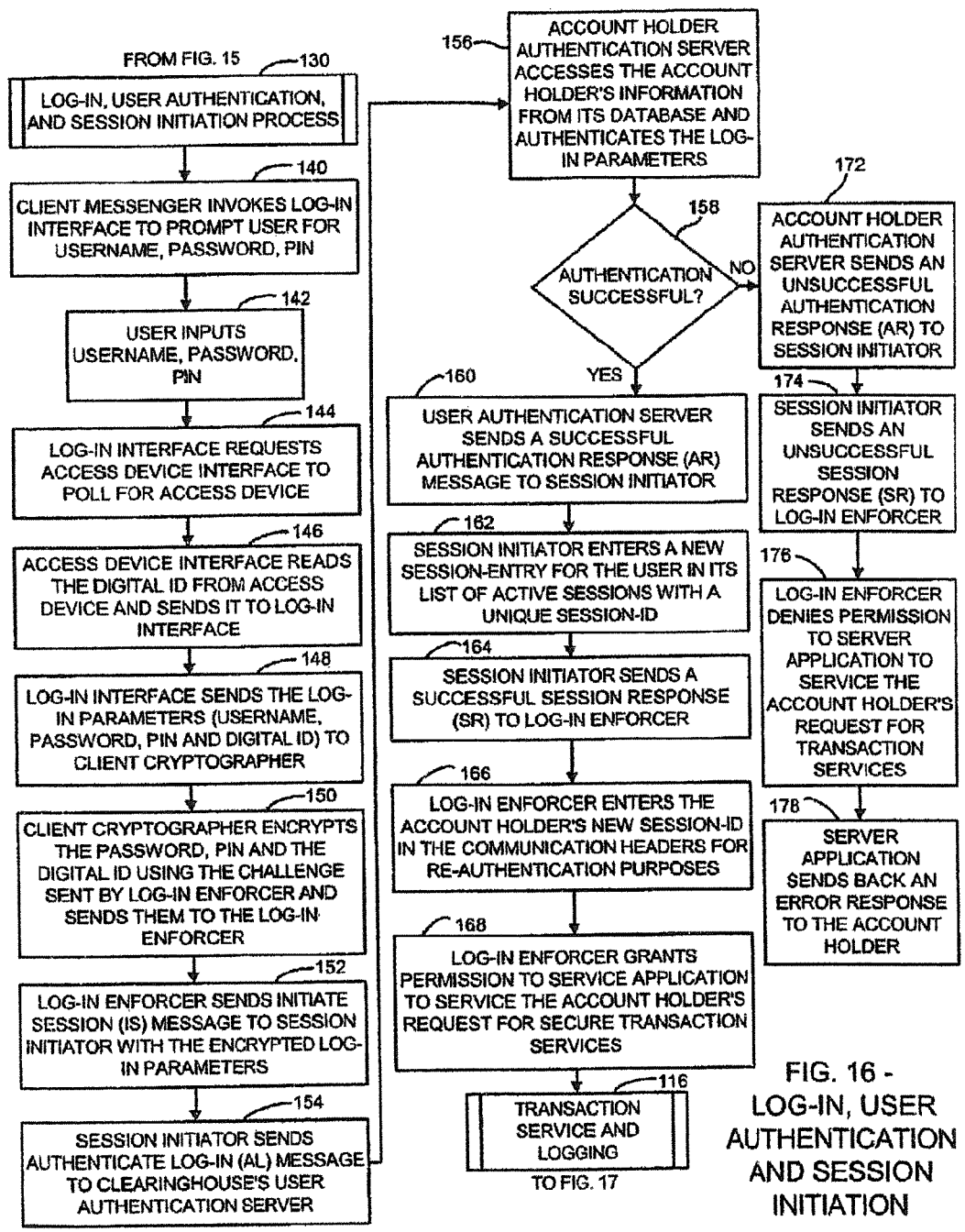
FIG. 16 is a flow chart of the system illustrating the steps that are taken during the login, account holder authentication and session initiation.

A flow chart of the login, account holder authentication, and session initiation subroutine is shown in FIG. 16, and indicated generally at 103. The client messenger first invokes a login interface to prompt account holder for a username, a password, and/or a PIN (block 140). The account holder then enters the username, the password, and/or the PIN (block 142), followed by the login interface requesting the hardware key interface to poll for the hardware key (block 144). If using two or three factor authentication, the hardware key interface reads the digital ID from the access media and sends it to the login interface (block 146). In the case of one factor authentication, the login interface assigns a blank digital ID for the login parameters. The login interface then sends the login parameters, including the username, password and digital ID to the client cryptographer (block 148). The client cryptographer encrypts the password and the digital ID using the challenge sent by the login enforcer and sends them to the login enforcer (block 150). The login enforcer then sends an initiate session message to the session initiator with the encrypted login parameters (block 152). The session initiator accordingly sends an authenticate login message to the transaction clearinghouse account holder authentication server (block 154), and the account holder authentication server accesses the account holder's information from its database and authenticates the login parameters (block 156). If using two or three factor authentication, this authentication involves the comparison of the digital ID, otherwise only username, password, and PIN are considered as login parameters. If the authentication was successful (block 158), the account holder authentication server sends a successful authentication response message to the session initiator (block 160). The session initiator enters a new session entry for the account holder in its list of active session with a unique session ID (block 162). The session initiator also sends a successful session response to the login enforcer (block 164), followed by the login enforcer entering the account holder's new session ID in the communication headers for re-authentication purposes (block 166). The login enforcer also grants permission to service the account holder's request for secure transaction services (block 168), and proceeds to initiate the subroutine of transaction service and logging (block 116) shown in FIG. 17. However, if authentication is unsuccessful (block 158), the account holder authentication server sends an unsuccessful authentication response to the session initiator (block 172). The session initiator then sends an unsuccessful session response to the login enforcer (block 174). The login enforcer accordingly denies permission to the server application to service the account holder's request for transaction services (block 176), and the server application sends back an error response to the account holder (block 178).

Figure 17:
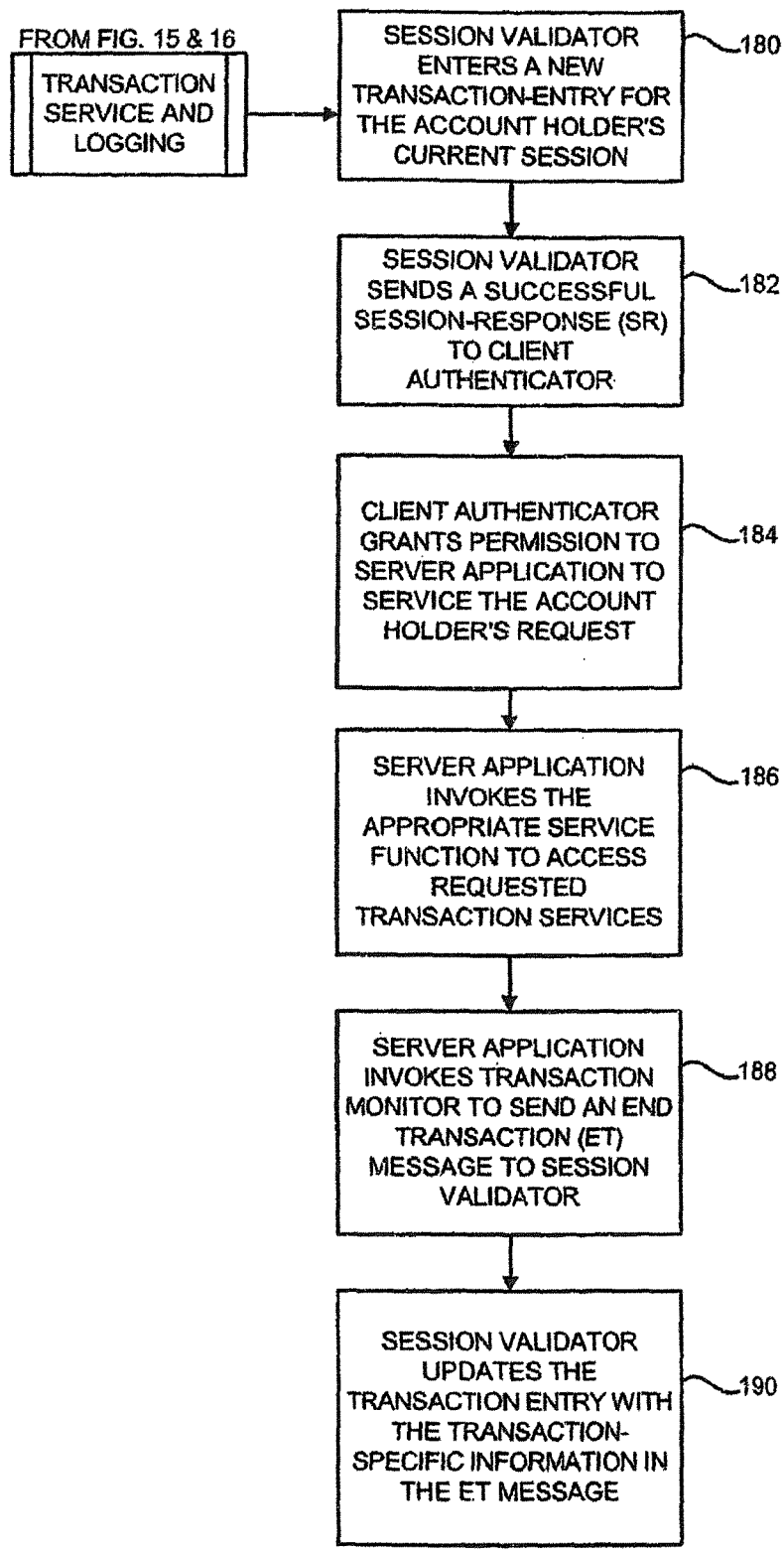
FIG. 17 is a flow chart of the sequence of steps that occur during transaction service and login.
Figure 18:
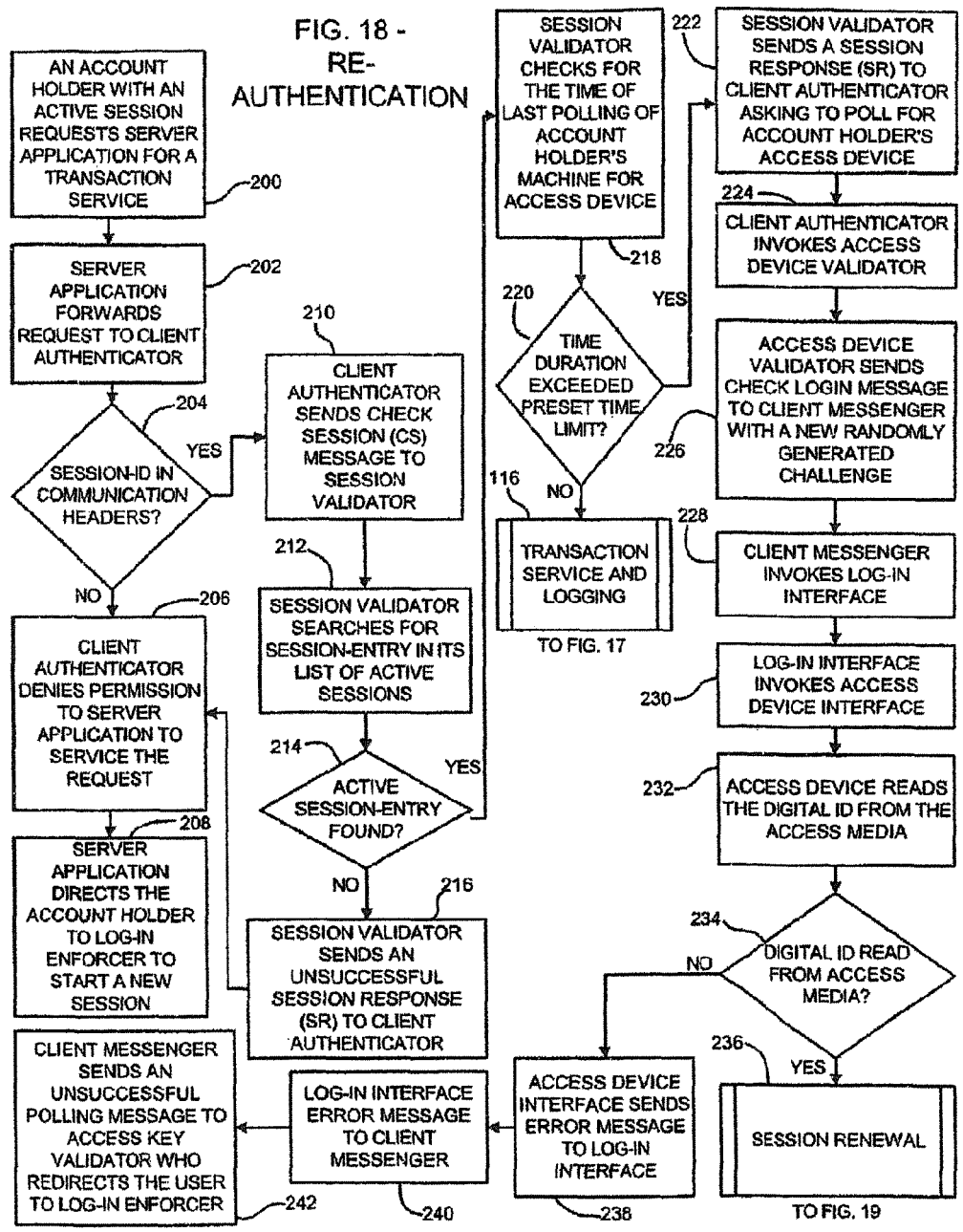
FIG. 18 is a flow chart of the sequence of steps taken during a re-authentication operation.

The subroutine of the transaction service and logging process (block 16) is shown in FIG. 17. The session validator first enters a new transaction entry for the account holder's current session (block 180). The session validator then sends a successful session response to the client authenticator (block 182), and the client authenticator grants permission to the server application to service the account holder's request (block 184). The server application invokes the appropriate service function to enable the account holder to access the requested transaction services (block 186) and the transaction monitor sends an end transaction message to the session validator (block 188). The session validator updates the transaction entry with the transaction-specific information in the end transaction message (block 190).

In accordance with an important aspect of the present invention, the system is preferably adapted to periodically re-authenticate an active session to prevent unauthorized use by someone who no longer has the hardware key 54 connected to his computer. With respect to the re-authentication process, and referring to FIG. 18, the process begins with an account holder in an active session requesting a transaction service (block 200). The server application forwards the request to the client authenticator (block 202), and communication headers are screened to see if they have a session ID (block 204). If there is no session ID (block 204), the client authenticator denies permission to the server application to service the request (block 206) and the server application directs the account holder to the login enforcer to start a new session (block 208). If, however, the session ID is in the communication header (block 204), the client authenticator sends a check session CS message to the session validator (block 210).

Figure 19:
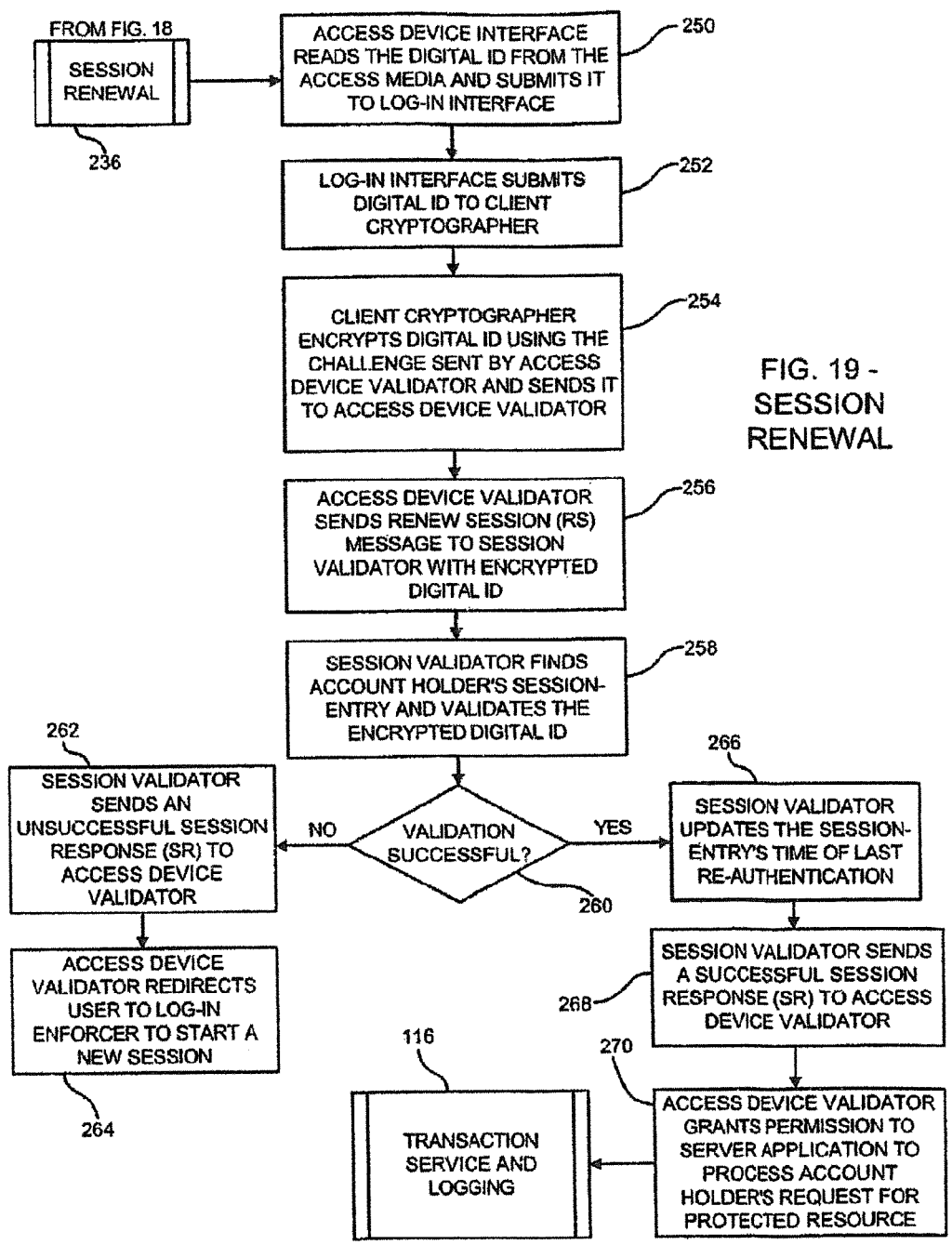
FIG. 19 is a flow chart of the sequence of steps that occur during a session renewal.

From the CS message, the session validator searches for a session entry in its list of active sessions (block 212) and determines whether an activate session entry was found (block 214). If not, the session validator sends an unsuccessful session response to the client authenticator (block 216) and the client authenticator denies permission to service the request (block 206). The server application would again direct the account holder to the login enforced to start a new session (block 208). If an active session is found (block 214), then the session validator checks for the time of the last polling of the account holder's machine to determine whether the hardware key 54 is present (block 218). The time duration is checked to determine if the preset time limit has been exceeded (block 220), and if it has not, then the system goes to the subroutine of the transaction service and logging step (block 170) (see FIG. 17). If the time duration has exceeded the preset time limit, the session validator sends a session response to the client authenticator asking to poll for the account holder's hardware key attached to the account holder's computer (block 222). The client authenticator invokes the access device validator (block 224), and the access device validator then sends the check login message to client messenger with a new randomly generated challenge (block 226). The client messenger invokes the login interface (block 228), which in turn invokes the access device key interface (block 230). The access device interface polls the account holder's machine for the hardware key 54 (block 232) and reads the digital ID from the access media. If the digital ID is successfully read (block 234), the program implements a session renewal (block 236), which is shown in FIG. 19. If the digital ID is not successfully read (block 234), the access device interface sends an error message to the login interface (block 238) and the login interface generates an error message to the client messenger (block 240). The client messenger then sends an unsuccessful polling message to the access device validator, which redirects the account holder to the login enforcer (block 242).

With respect to the session renewal and referring to FIG. 19, the access device interface reads the digital ID of the access media and submits it to the login interface (block 250), which in turn submits the digital ID to the client cryptographer (block 252). The client cryptographer encrypts the digital ID using the challenge sent by the access device validator and sends the encrypted digital 10 to the access device validator (block 254), which then sends a renew session message to the session validator with the encrypted digital ID (block 256). The session validator finds account holder session entry and validates the encrypted digital ID (block 258) and determines whether the validation was successful (block 260). If not (block 260), the session validator sends an unsuccessful session response to the access device validator (block 262), and the access device validator redirects the account holder to the login enforcer to start a new session (block 264). If validation was successful (block 260), the session validator updates the session entry's time of last re-authentication (block 266) and sends a successful session response to the access device validator (block 268). The access device validator grants permission to the server application to process the account holder's request for transaction services (block 270), and then proceeds to the transaction service and logging step (block 116) (see FIG. 17).

Figure 20:
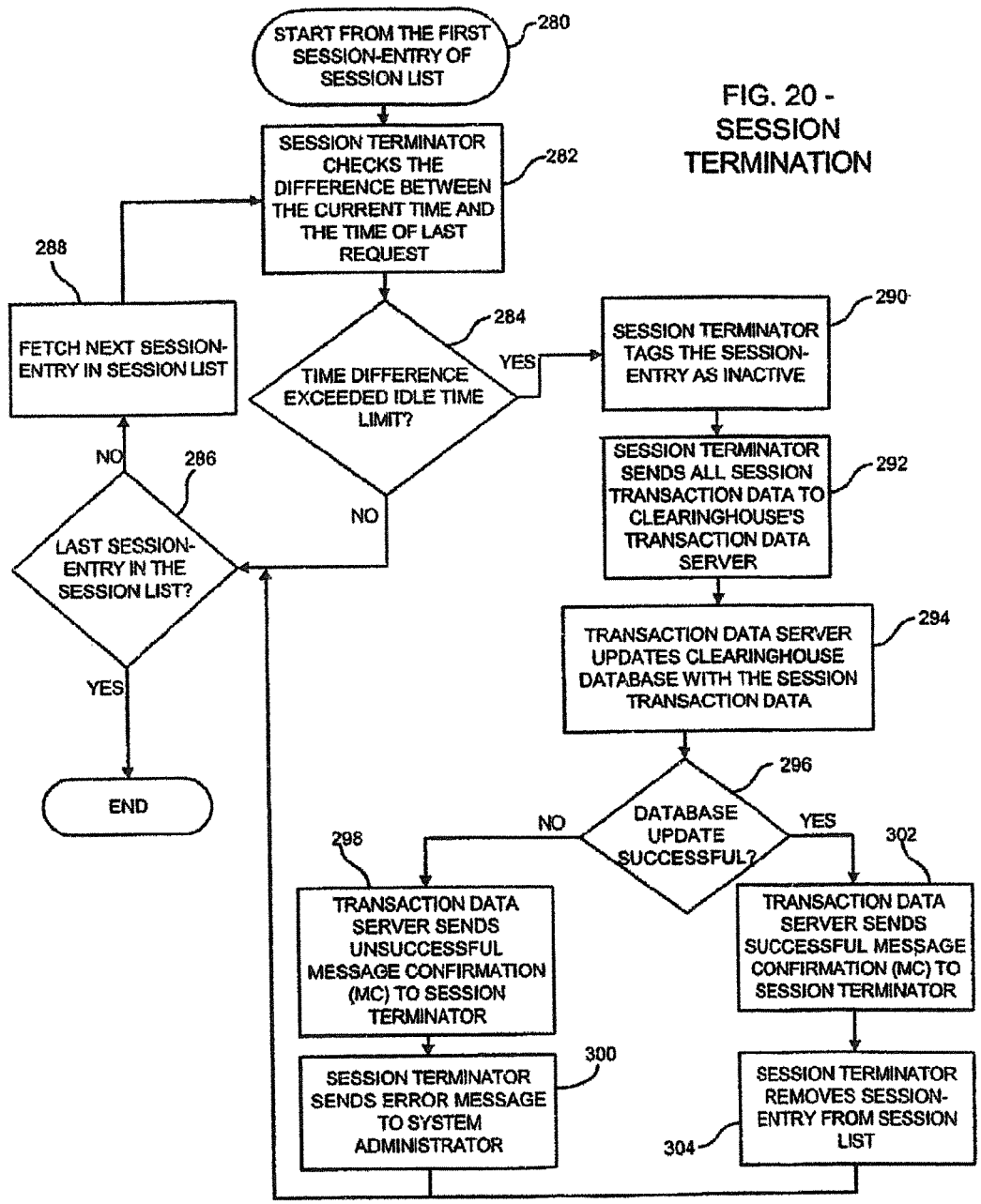
FIG. 20 is a flow chart of the sequence of steps that occur during a session termination.

With respect to session termination and referring to FIG. 20, the first step is to begin with the first session entry of a session list (block 280) and the session terminator checks the difference between the current time and the time of the last request (block 282). If the time difference did not exceed the idle time limit (block 284), the program determines whether the first session entry is the last session entry in the session list (block 286). If so, the session is terminated (block 288). If it is not the last session entry in the list (block 286), the program fetches a next session entry in the list (block 288) and return to block 282. If the time difference did exceed the idle time limit (block 284), the session terminator tags the session entry as inactive (block 290) and sends all session transaction data to the transaction clearinghouse's transaction data server (block 292). The transaction data server updates the transaction clearinghouse database with the session transaction data (block 294), and the program determines whether the update was successful (block 296). If not, the transaction data server sends an unsuccessful message confirmation to the session terminator (block 298), which prompts the session terminator to send an error message to the system administrator (block 300). If the update was successful (block 296), the transaction data server sends a successful message confirmation to the session terminator (block 302) and the session terminator then removes the session entry from the session list (block 304).

Figure 21:
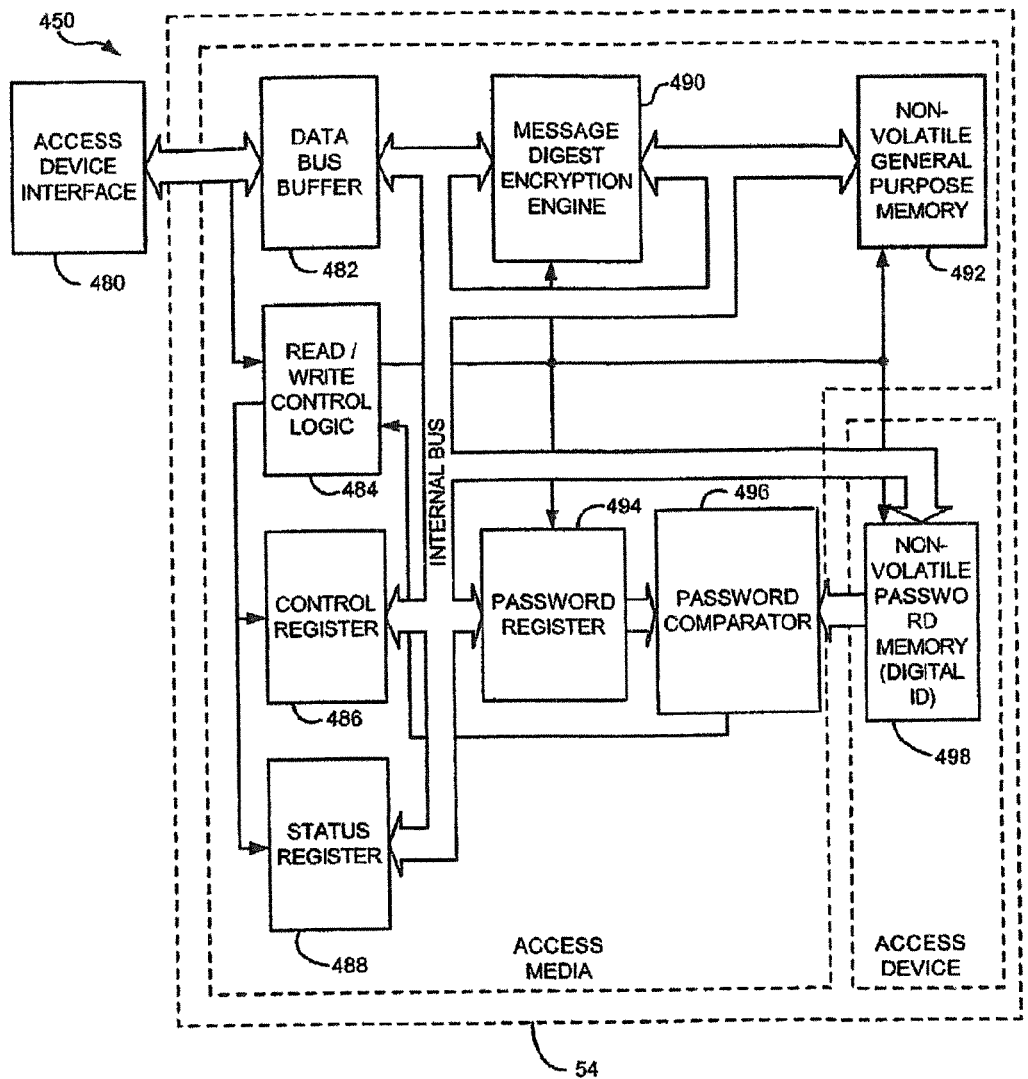
FIG. 21 is a block diagram of the hardware token access device that is part of the preferred embodiment of the present invention.

In accordance with another important aspect of the present invention, and referring to FIG. 21, a hardware token access device 450 for use as the hardware key 54 is shown in the illustrated functional block diagram. The access device 450 is an external hardware device, such as the iKey 1000 USB Smart Token device manufactured by Rainbow Technologies of Irvine, Calif. The hardware token access device 450 preferably connects to the USB port of the account holder's personal computer. The major function of the hardware token access device 450 is to uniquely identify a account holder that desires to access the transaction services and computer resources of an untrusted network, such as the Internet. It is used in conjunction with the username, password, and/or PIN to provide two factor authentication. Generally, two factor authentication provides that something is known (e.g., the username and password) and something is held (e.g., the physical hardware token that is attached to the computer or built into the computer). While the Rainbow iKey 1000 USB Smart Token is the preferred embodiment for the hardware token access device 450, it should be understood that the two factor authentication could be provided by some other physical device, such as a credit card, a key, an ATM card, or the like which is known to have been assigned and given to a specific person.

In FIG. 21, the hardware token access device 450 includes a port interface 480, which provides an interface to support the personal computer of the account holder 36. Such may include, for example, USB, parallel, serial and/or keyboard ports. The access device 450 is transparent to the personal computer interface being utilized and does not prohibit the personal computer interface from being used in a normal fashion. In the Rainbow iKey 1000 Smart Token, it is preferred that the hardware token be connected to the USB port. The hardware token also includes a data bus buffer 482, which provides a minimum internal data bus of eight bits regardless of the port interface configuration. A read/write control logic block 484 manages all the internal and external transfer of data controlled status, while a control register 486 initializes the functional configuration of the access device 450. A status register 488 contains the result of the last operation performed using the control register 486 on the read/write control logic 484. A message digest encryption 490 is used to encrypt both a nonvolatile general purpose memory 492 during memory read and password read operations. The message digest encryption engine 490 accepts a seed value from the port interface 480 that can be used to uniquely encrypt the data being read. The memory 492 contains a minimum of 1024 bytes of data that can be used for storage of information for personally identifying the account holder. This information can include, but is not limited to a digital certificate. A password register 494 accepts a minimum of a 64 bit password from the port interface 480, and a password comparator 496 performs a logical XOR on the contents of the password register in the contents of the nonvolatile password memory 492. When the contents of the password register 494 are equal to the contents of the nonvolatile password memory 498, several operations can be performed, such as reading the nonvolatile general purpose memory, read the encrypted nonvolatile password memory, writing the nonvolatile general purpose memory, writing the nonvolatile password memory and writing a seed value to the message digest encryption engine. The nonvolatile password memory contains a minimum of a 64 bit password. The password is set to a known default value at the time of manufacture but can be reprogrammed at any time.

Figure 22:
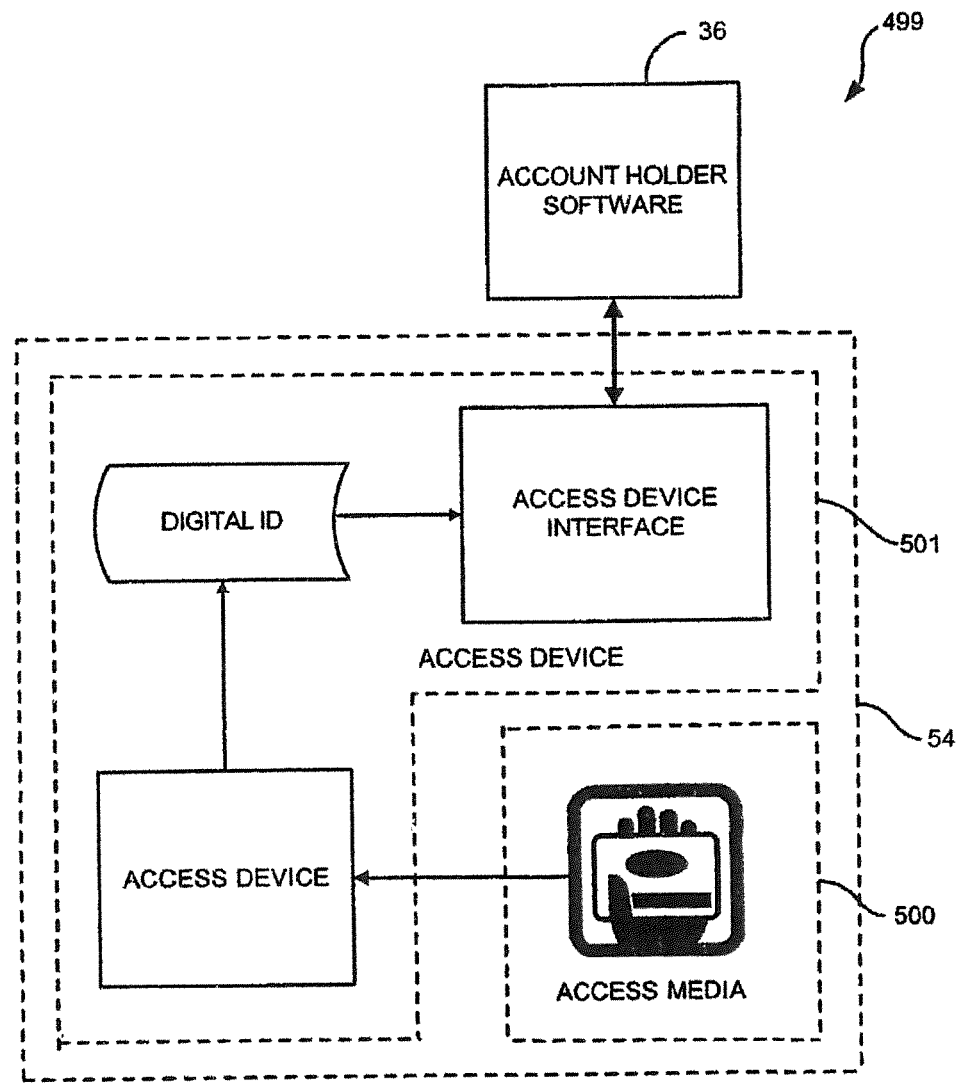
FIG. 22 is a block diagram of the magnetic card reader access device and access media that is part of the preferred embodiment of the present invention.

In accordance with another important aspect of the present invention, and referring to FIG. 22, a magnetic card reader access device in use with an access media 54 is implemented as the hardware key 54 is shown in the illustrated functional block diagram, and indicated generally at 499. A magnetic card is a plastic card with a strip of magnetic recording tape adhered to the back of the card. The magnetic recording strip has three tracks that can be used for storing and retrieving data. In the context of the preferred embodiment, the magnetic card 500 is the preferred access media containing a digital ID. Magnetic stripe cards, which typically only store about 1 kilobyte of data (compared with 8, 16, or 32 KB in smart cards), do not have a CPU and rely on the card reader, the PC to which it's attached, or a remote computer accessed via modem to perform transaction processing. Magnetic card technology is widely utilized in Point of Sale (POS) terminals, Automated Teller Machines (ATM), ticketing, card issuing, transportation, and access control.

Two types of devices, a reader and a terminal can read magnetic cards. A reader is interfaced to a personal computer for the majority of its processing requirements, while a terminal is a self-contained processing device. Magnetic card readers are available that interface to RS232 serial ports, USB ports, PCMCIA slots, parallel ports, infrared IRDA ports and keyboards. Terminals have their own operating systems and in addition to reading a magnetic card typically support other functions such as network connectivity, transaction printing, and keypad entry. Both terminals and readers are considered access devices 501 in the context of the preferred embodiment.

For example, a magnetic card reader can be attached to a personal computer (PC) and serves the role of an access device. The magnetic card reader connects in-line between a PC and its keyboard. The magnetic card reader is intended to remain virtually invisible to both the PC and the keyboard until a magnetic card is read. When a magnetic card is read, the magnetic card reader takes over the interface to the PC and sends card data using the same scan codes used by the keyboard. These scan codes are routed to the account holder software 36. Magnetic card readers also support the operation of a keypad that can be used to enter one or any combination of username, password or PIN codes in addition to the digital ID read from the access media by the access device.

Figure 23:
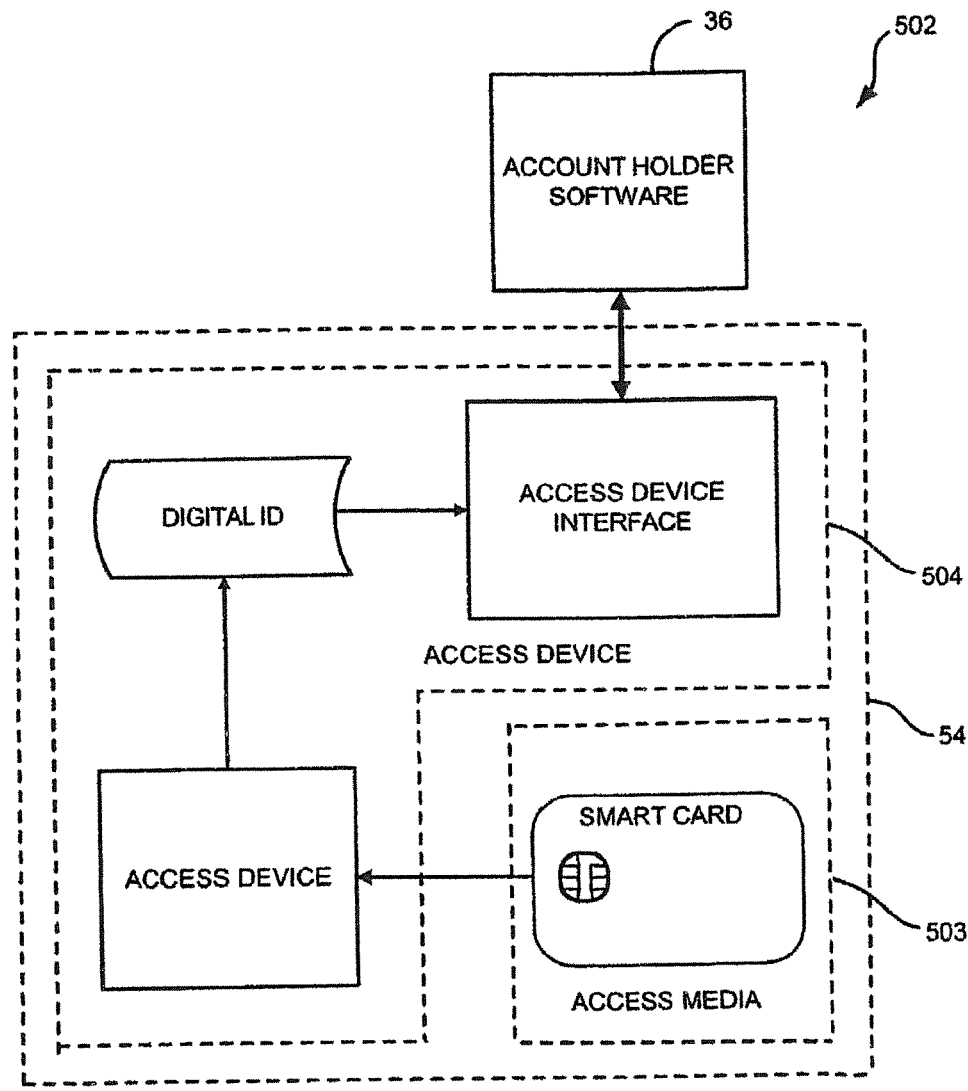
FIG. 23 is a block diagram of the smart card reader access device and access media that is part of the preferred embodiment of the present invention.

In accordance with another important aspect of the present invention, and referring to FIG. 23, a smart card reader access device in use with an access media is implemented as the hardware key 54 is shown in the illustrated functional block diagram, and indicated generally at 502. A smart card is a type of plastic card embedded with a computer chip that stores and transacts data between users. This data can contain several digital IDs that are stored and processed within the card's chip, either a memory or a microprocessor. The card data is transacted via a reader that is part of a computing system. Smart cards greatly improve the convenience and security of any transaction. They provide tamper-proof storage of user and account identity. Smart cards protect against a full range of security threats, from careless storage of user passwords to sophisticated system hacks. Within the context of the preferred embodiment, a smart card 503 is considered access media.

Two types of devices, a reader and a terminal can read smart cards. A reader is interfaced to a personal computer for the majority of its processing requirements, while a terminal is a self-contained processing device. Both are considered access devices in the context of the preferred embodiment. Both the terminals and the readers read and write to smart cards. Readers come in many forms and in a wide variety of capabilities. Smart card readers that interface to RS232 serial ports, USB ports, PCMCIA slots, floppy disk slots, parallel ports, infrared IRDA ports and keyboards are presently available. Smart card terminals have their own operating systems and typically support other functions such as reading a magnetic card, network connectivity, transaction printing, and keypad entry. Both the terminals and the readers are considered access devices 504 in the context of the preferred embodiment.

Smart cards have the tremendous advantage, over their magnetic stripe ancestors, of being able to execute cryptographic algorithms locally in their internal circuitry. This means that the user's secrets (be these PIN codes or keys) never have to leave the boundaries of the tamper-resistant silicon chip, thus bringing maximum security to the overall system where the cards are used. Smart-cards contain special-purpose microcontrollers with built-in self-programmable memory and tamper-resistant features intended to make the cost of a malevolent attack more than any benefits gained from the attack. Smart Card readers can also support the operation of a keypad that can be used to enter one or any combination of username, password or PIN codes in addition to the digital ID read from the access media by the access device.

Figure 24:
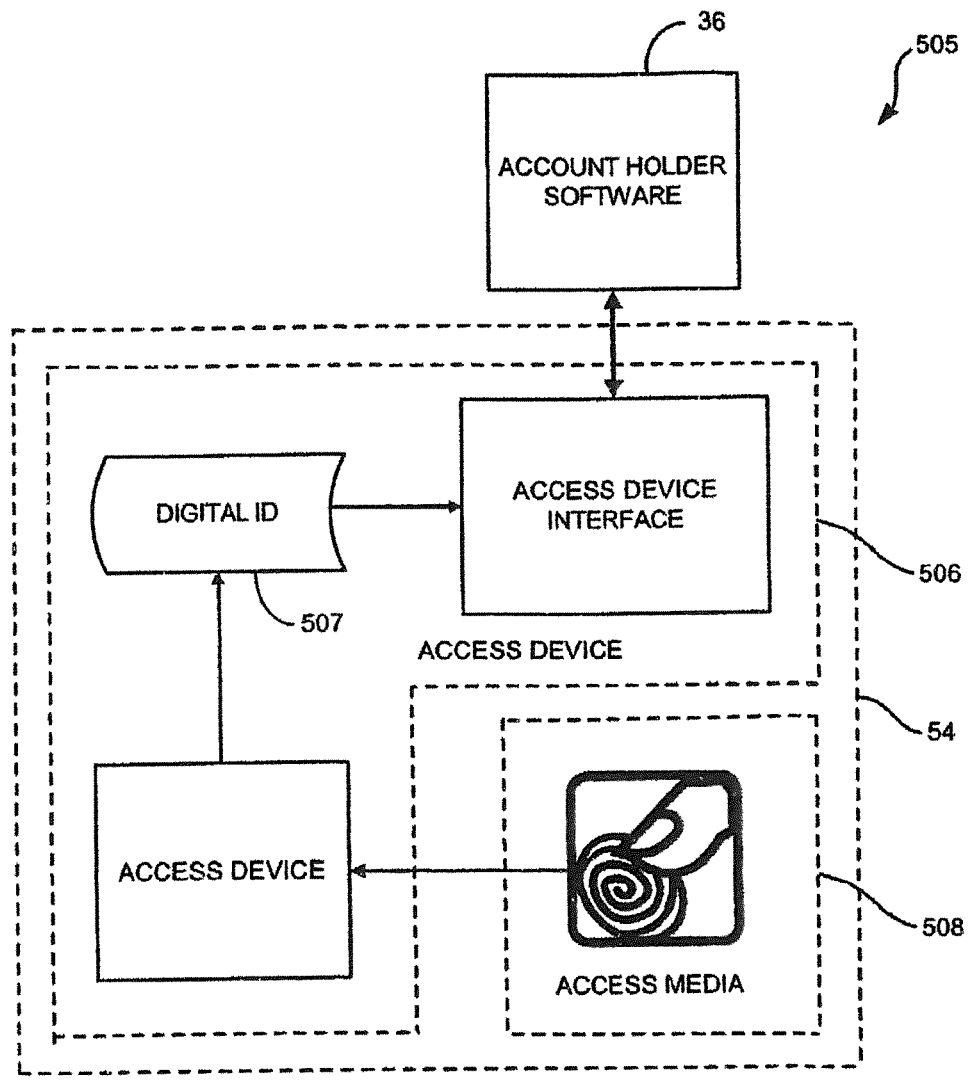
FIG. 24 is a block diagram of the biometric identification reader access device and access media that is part of the preferred embodiment of the present invention.

In accordance with another important aspect of the present invention, and referring to FIG. 24, a biometric identification reader access device in use with an access media is implemented as the hardware key 54 is shown in the illustrated functional block diagram, and generally indicated 505. As organizations search for more secure authentication methods for user access, e-commerce, and other security applications, biometrics is increasingly gaining attention in the marketplace. A biometric is one of the most secure and convenient authentication tool. It cannot be borrowed, stolen, or forgotten and is practically impossible to forge. Biometrics measure an individuals' unique physical or behavioral characteristics as a way to recognize or authenticate their identity. Common physical biometrics include fingerprints; hand or palm geometry; and retina, iris, or facial characteristics. Behavioral characters include signature, voice (which also has a physical component), keystroke pattern, and gait.

A biometric system works by capturing the chosen biometric with a biometric reader. The reader converts the biometric into a digital identification that is stored in a local repository for comparison during authentication. In the case of the preferred embodiment, the biometric reader 506 is equivalent to the access device; the biometric identification data 507 is equivalent to the digital ID created when the access device reads the fingerprint 508 access media; and the local repository that stores the biometric identification data can be the transaction clearinghouse. When logging into the secure transaction system, the account holder would have the chosen biometric (e.g., access media—fingerprint, palm, etc.) scanned by the biometric reader 506, forwarded to the clearinghouse using the previously described log-in process (FIGS. 15-20). The digital ID created by the biometric data would be compared to the digital ID already stored in the transaction clearinghouse for authenticity. It is also possible in the preferred embodiment to combine the digital ID created by the biometric scan to be supplemented with one or any combination of username, password, or PIN in addition to the digital ID read from the access media by the access device. Biometric identification can be also combined with smart cards or magnetic cards in the preferred embodiment.

Figure 25:
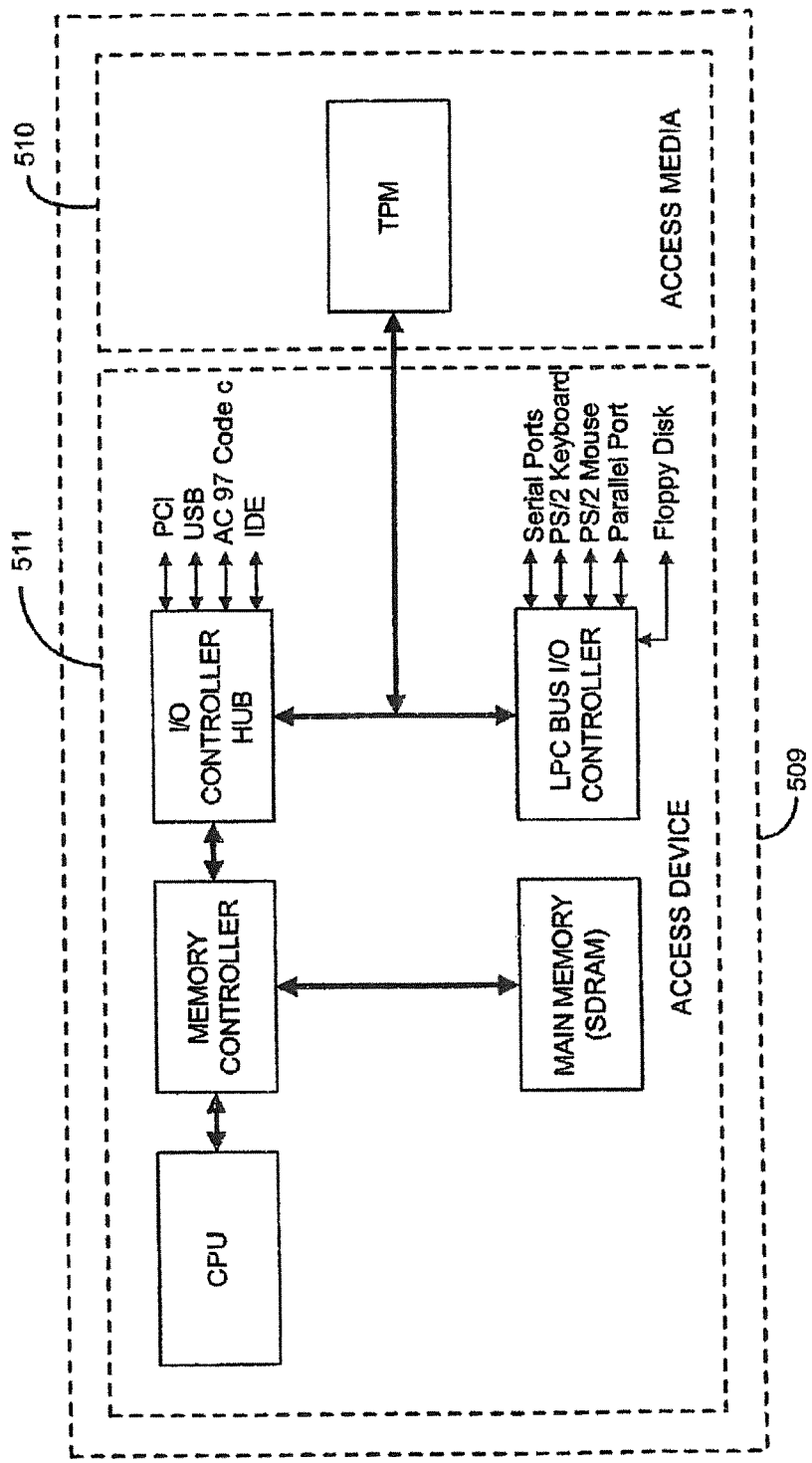
FIG. 25 is a block diagram of the secure central processing unit (CPU) access device and access media that is part of the preferred embodiment of the present invention.

In accordance with another important aspect of the present invention, and referring to FIG. 25, a secure central processing unit (CPU) in use with an access media is implemented as the hardware key 54 is shown in the illustrated functional block diagram, and indicated generally at 509. In order to secure the CPU, a trusted subsystem must be inserted into the standard personal computer platform. The trusted subsystem is then able to extend its trust to other parts of the whole platform by building a 'chain of trust' where each link extends its trust to the next one. In this way, the secure CPU subsystem provides the foundation for a fully trusted platform and a basis for extending trusted computing across system and network boundaries.

The root of trust is a small hardware device called a Trusted Platform Module (TPM) 510. The TPM 510 is basically a secure controller that provides features like secure memory, cryptographic sign/verify, and an immutable key pair used to generate anonymous identities. In the preferred embodiment, the CPU and its associated platform 511 is the access device and the secure memory of the TPM 510 preferably acts as the access media and holds several types of unique digital IDs. Together they provide secure CPU functionality and provide all the functions of the account holder's PC. Another important feature of the TPM 510 is the possibility of producing random numbers. The TPM 510 can create digital signatures using the random number generator as the source of randomness required by the digital ID generation process. In order to generate a unique digital ID, each single TPM 510 has a unique key that identifies the TPM.

With these capabilities, the TPM 510 is able to produce a statistically unique digital fingerprint of the PC's basic input/output system (BIOS) firmware at boot time. This fingerprint is also called an integrity metric or cryptographic digest. Once this metric is available, it is saved in the TPM's secure memory location. During the PC boot process, other integrity metrics are collected from the PC platform, for instance, fingerprints of the boot loader and the operating system itself. Device drivers may be hashed; even hardware like PCI cards can be detected and identified. Every metric of the TPM 510 is concatenated to the already available metrics. This generates a final metric, which provides a unique digital ID for the PC.

The digital ID can also be used to encrypt other unique digital identification including account numbers, digital certificates, etc., and store the results in the protected storage of the TPM. The protected storage of the TPM is essentially nonvolatile storage that has a means of access control. This access control determines which entities (e.g., user, programs, etc.) have permission to read, write, modify, and update the secure memory of the TPM. It is assumed that protected storage has some form of access control protocol that is used to protect against certain kinds of attack.

Figure 26:
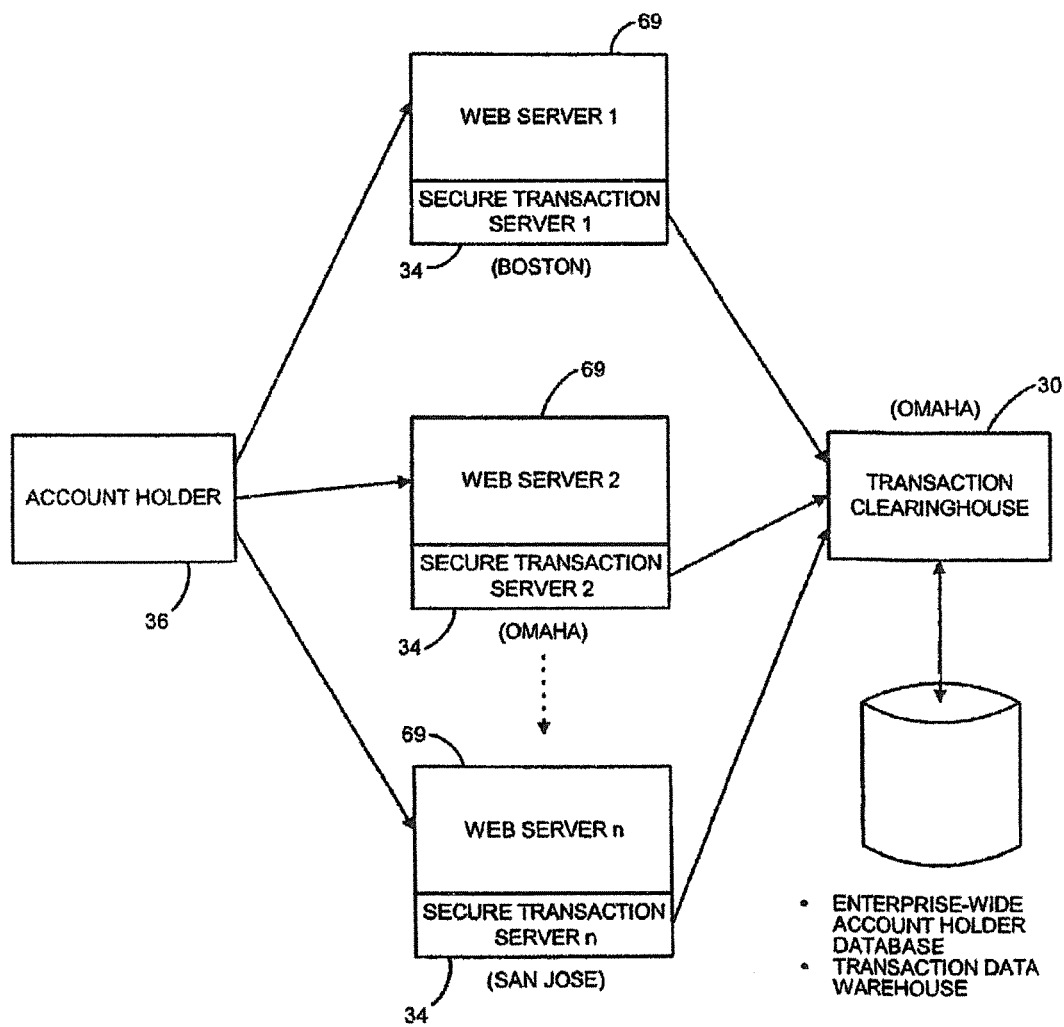
FIG. 26 is a functional block diagram which illustrates multiple system servers with a single system transaction clearinghouse.

A distributed architecture of the system software enabling multiple web servers 69, each of which may host their own copy of a server 34 to communicate and interact with one or more transaction clearinghouses 30 is shown in FIG. 26. As shown in FIG. 26, there are multiple servers 69 residing in a geographically distributed manner on the Internet, each one of them with their own copy of a secure transaction server. The transaction clearinghouse 30 contains the enterprise wide account holder database, the transaction and demographics data warehouse, and controls the authentication and authorization of account holders on all the web servers 69.

When an account holder attempts to access a transaction service from any secure transaction enabled web sites, the respective server 69 for that web site will need to authenticate the account holder. In order to perform account holder authentication, the secure transaction server will need to interact with the system transaction clearinghouse 30 by establishing and maintaining a communication line between itself and the transaction clearinghouse. The information transmitted on this communication line is encrypted using a public/private key mechanism so that only authentic servers and an authentic transaction clearinghouse can communicate with each other. The server 69 also implements the same mechanism in sending transaction data to the transaction clearinghouse's data warehouse.

The other secure transaction servers interact with the transaction clearinghouse 30 in the same manner. Thus a transaction service can host several geographically distributed secure transaction enabled web sites. Once an account holder is authenticated at one of the system enabled web sites, that account holder can access other likewise enabled web sites transparently using the same username, password, PIN combination, and the optional digital ID read from the access media by the hardware key 54, without having to again provide their username, password, PIN, and optional digital ID thus creating a single sign-on scenario where transaction services and computer resources can be accessed from a multitude of sources. All the transaction data generated by the account holder on all these different enabled web sites will be reported back to the transaction clearinghouse, regardless of how the account holder accesses the different enabled web servers 69. In the configuration of FIG. 26, the same transaction clearinghouse 30 was controlling all the secure transaction servers. However, the distributed architecture can be further extended to allow multiple secure transaction servers to interact with multiple transaction clearinghouses 30, which is shown in FIG. 27.

FIG. 27 shows multiple transaction clearinghouse two transaction clearinghouses shown), specifically a transaction clearinghouse A in Omaha and a transaction clearinghouse B in Chicago. Each transaction clearinghouse contains the business rules for account holder services, enforced by the individual transaction clearinghouse's enterprise wide account holder database. Assume that account holder "a" is registered with transaction clearinghouse A, and account holder "b" is registered with transaction clearinghouse B. Each secure transaction server 69 can provide secure transaction services for account holders from more than one transaction clearinghouse. For example, server 1 in Boston can provide secure transactions services to account holder A and account holder B even though they are registered at different transaction clearinghouses. In this case, the secure transaction server 1 in Boston is doing all the authentication, authorization and transaction data updates for account holder A through transaction clearinghouse A, and account holder B through transaction clearinghouse B. This scenario fits perfectly for a secure transaction service provider who wants to provide hosting services for several customers. The provider can run a web site with a copy of the secure transaction server, and host different transaction services through the secure transaction server, where different transaction clearinghouses are controlling different transaction services.

This also presents the possibility of transaction clearinghouses forming alliances with one another. For instance, in our example above, let's suppose transaction clearinghouse A and transaction clearinghouse B form a joint agreement that they will let each other's account holders access each other's account holder services, and each transaction clearinghouse will pay a share of the dividend to the other based on transaction volumes. In order to do this, system servers will need to be configured to perform authentication from both transaction clearinghouses. As a result, an account holder who is registered with transaction clearinghouse A can access account holder services that fall under transaction clearinghouse B.

With regard to the case of server 1 hosting account holders A and B, since now an account holder registered with transaction clearinghouse A can also access account holder services that fall under transaction clearinghouse B, account holder "a" should be able to access account holder B through server 1. In order to do this, the server 1 will need to change its configuration so that it is able to separate transaction clearinghouse A account holders from transaction clearinghouse B account holders. When account holder "a" tries to access transaction services, secure transaction server 1 will interact with transaction clearinghouse A to do authentication, and if it is account holder "b", secure transaction server 1 will interact with transaction clearinghouse B.

However, the transaction data for a particular account holder will be sent to the transaction clearinghouse that owns the account holder. So even if account holders from transaction clearinghouse A can now access account holder B, all their transaction data will still be sent to transaction clearinghouse B. Thus, all of account holder "a" is transaction data regarding account holder B and go to transaction clearinghouse B. In this way, transaction clearinghouse B knows how many account holders from other transaction clearinghouses have accessed account holders that belong to transaction clearinghouse B, and based on that data, transaction clearinghouse B will be able to charge other transaction clearinghouses.

In accordance with another aspect of the present invention, the manner in which messages are sent among the various components will now be described in connection with the preferred embodiments of the programs that are utilized by the system. In this regard, the following is a listing of the software products that are part of the preferred embodiment of the present invention. The documents identified are specifically incorporated by reference.

Account Holder Database
Product: Sybase SQL Server XI
    Installing Sybase SQL Server for Microsoft Windows NT
    Sybase SQL Server Release 11.0.x
    Document ID: 34714-1101-02
    Last Revised: Mar. 6, 1996
Introducing Sybase SQL Server for Microsoft Windows NT
    Sybase SQL Server Release 11.0.x
    Document ID: 31965-1101-02
    Last Revised: Feb. 10, 1996
Configuring and Administering Sybase SQL Server for Microsoft Windows NT
    Sybase SQL Server Release 11.0.x
    Document ID: 36446-1101-02
    Last Revised: Feb. 22, 1996

Installing Sybase Products on Sun Solaris 2.x (SPARC)
   Open Client/Server Release 11.1.x
   Document ID: 35075-1100-03
   Last Revised: Sep. 10, 1996
Open Client/Server Configuration Guide for UNIX
   Open Client/Server Release 11.1.x
   Document ID: 35831-1100.quadrature.02
   Last Revised: Aug. 21, 1996
Open Client/Server Programmer's Supplement for UNIX
   Open Client/Server Release 11.1.x
   Document ID: 35456-1100-04
   Last Revised: Aug. 23, 1996
Sybase SQL Server Utility Programs for UNIX
   Sybase SQL Server Release 10.0
   Document ID: 30475-01-1000-04
   Change Level: 1
   Last Revised: Feb. 1, 1994
Sybase SQL Server System Administration Guide
   Sybase SQL Server Release 10.0
   Document ID: 32500-01-1000-03
   Change Level: 3
   Last Revised: Jun. 17, 1994
Sybase SQL Server Reference Manual: Volume 1 Commands, Functions, and Topics
   Sybase SQL Server Release 10.0
   Document ID: 32401-01-1000-03
   Change Level: 2
   Last Revised: Jun. 17, 1994
Sybase SQL Server Reference Manual: Volume 1 System Procedures and Catalog Stored Procedures
   Sybase SQL Server Release 10.0
   Document ID: 32402-01-1000-03
   Change Level: 2
   Last Revised: Jun. 17, 1994
Sybase SQL Server 11 Unleashed
   by Ray Rankins, Jeffrey R Garbus, David Solomon, and Bennett W McEwan
   ISBN #0-672-30909-2
   Library of Congress Catalog Card #95-72919
   Sams Publishing, 201 West 103rd Street, Indianapolis, Ind. 46290
   Copyright© 1996
Sybase Developer's Guide
   by Daniel J Worden
   ISBN #0-672-30467-8
   Library of Congress Catalog Card #93-87172
   Sams Publishing, 201 West 103rd Street, Indianapolis, Ind. 46290
   Copyright© 1994
ODBC Driver
Intersolv DataDirect ODBC Drivers
   October 1995
   9420 Key West Avenue
   Rockville, Md. 20850
   MA-ODBC-211-DREF
Intersolv DataDirect ODBC Drivers Installation Guide
   Microsoft Windows, Microsoft Windows 95, Microsoft Windows NT, and OS/2
   October 1995
   9420 Key West Avenue
   Rockville, Md. 20850
   MA-ODBC-211-INST
Intersolv ServiceDirect Handbook
   Fourth Edition 11/95
   Copyright© 1995
   Intersolv, Inc.
   9420 Key West Avenue
   Rockville, Md. 20850
   QCS95-S-0231
Inside ODBC by Kyle Geiger
   ISBN #1-55615-815-7
   Library of Congress Catalog Card #95-18867
   Microsoft Press
   Copyright© 1995
Server Application (Web Server)
Product: Netscape Enterprise Server
Netscape Enterprise Server Version 2.0 Administrator's Guide
   Copyright© 1996
   Netscape Communications Corporation
   501 East Middlefield Road
   Mountain View, Calif. 94043
   802-7610-10
Netscape Enterprise Server Version 2.0 Programmer's Guide
   Copyright© 1996
   Netscape Communications Corporation
   501 East Middlefield Road
   Mountain View, Calif. 94043
   802-7611-10
Client Application (Web browser)
   Product: Netscape Navigator
   Netscape Navigator Gold Authoring Guide
   Copyright© 1996
   Netscape Communications Corporation
   501 East Middlefield Road
   Mountain View, Calif. 94043
   802-7612-10
Using Netscape
   ISBN #0-7897-0211-8
   Library of Congress Catalog #95-67809
   Copyright© 1995
   Que Corporation
   201 W. 103rd Street
   Indianapolis, Ind. 46290
Hardware Key
   Product: iKey 1000 Smart Token (Hardware Token)
   Rainbow Technologies, Inc.
   50 Technology Drive
   Irvine, Calif. 92618
   Product: Mag-Wedge Reader (Magnetic Card Reader)
   Magtek
   20725 South Annalee Avenue
   Carson, Calif. 90746
   Product: GemPC430 (Smart-Card Reader)
   Gemplus Corporation
   3 Lagoon Drive
   Redwood City, Calif. 94065-1566
   Product: FIU/SS2K (Fingerprint Biometric Reader)
   Sony Electronics, Inc.
   1 Sony Drive
   Park Ridge, N.J. 07656-8002
   Product: TPM (Trusted Platform Module—Secure CPU)
   Infineon Technologies North America Corporation
   1730 North First Street
   San Jose, Calif. 95112

The secure transaction system (STS) is the preferred embodiment of the present invention in the web environment. The following table lists the STS software components as they relate to the present invention:

| Preferred Embodiment Component | STS software component |
|---|---|
| Transaction clearinghouse user authentication daemon | userauthd |
| Transaction clearinghouse transaction daemon | transactiond |
| Transaction clearinghouse administration software | ch_admin.exe |
| STS Server Session Manager | sessiond |
| STS shard object for Web server | sts.so |
| STS log-in CGI's | start_login.cgi login.cgi vrfypswd.cgi |
| STS re-authentication CGI's | check_key.cgi verify_key.cgi |
| STS online application CGI's and HTML | application.html application.cgi account holder.cgi verify_applicant.cgi |
| STS online activation CGI's | activate.cgi check_activate.cgi |
| STS password change CGI's | pswd_chg_form.cgi chg_pswd.cgi |
| STS Site Administration CGI's | add_profile.cgi del_subs.cgi srvconf.cgi admin_subs.cgi profile.cgi stadmin.cgi chng_srvconf.cgi data_dumprestore.cgi smgr_restart.cgi upd_profile.cgi data_recovery.cgi smgr_start.cgi upd_subs.cgi del_profile.cgi smgr_stop.cgi |
| STS Account holder software | STS Client Plug-in STS ActiveX component |

Following is a description how these STS components can be configured, initialized, and how their day-to-day operation can be monitored. It should be understood that the component names used in these descriptions are specific to STS, and the procedures described to perform the day-to-day operation are specific to STS components, more so as an example of the preferred embodiment of the present invention in the web environment.

With respect to the configuration files that are necessary for operating the various software components of the system, each component has its own configuration file as shown below:

| Daemon/Server | Configuration Filename |
|---|---|
| User Authentication | userauthd.conf |
| Transaction | transactiond.conf |
| Session Manager | sessiond.conf |
| Web Server | magnus.conf obj.conf mime.types |

Each daemon accepts the name of its configuration file as a command line argument when starting the daemon. The format of the command line is:
<daemon name><configuration file>.

The transaction clearinghouse daemons can be started by using standard shell scripts.

For the account holder authentication daemon user-authd.conf), the following configuration files apply:

| PARAMETER | DESCRIPTION |
|---|---|
| logdir | Absolute pathname specification of the directory which this daemon is to create its log files in. Two instances of the same daemon type (e.g., userauthd) cannot log to the same directory. The daemon will not start up if it is un-able to write to the directory. |
| service | Specifies the TCP port number which the daemon is to use to listen for requests. This can be a numeric or alpha-numeric entry. If the entry is alphanumeric, there should be a corresponding entry in the/etc/services/file. |
| dbserver | The name of the database server to connect to. This entry should correspond to an entry in the database server interface file. |
| dname | The name of the database to use. A database server can control many databases. |
| dbuser | The name of the database user to use when connecting to the database. Database users can be used to control what processes (or daemons) can connect to the database and also what permissions they have when they connect. Typically all transaction clearinghouse components will use the same database server name, database name, database username and hence database user password entries in their configuration files. |
| dbpswd | The password to use for the above database user. The file permissions for this configuration should be set according knowing that it contains a database username and password. |

For the transaction daemon (transactiond.conf), the following configuration files apply:

| PARAMETER | DESCRIPTION |
|---|---|
| logdir | Absolute pathname specification of the directory which this daemon is to create its log files in. Two instances of the same daemon type (e.g., transactiond) cannot log to the same directory. The daemon will not start up if it is unable to write to the directory. |
| service | Specifies the TCP port number which the daemon is to use to listen for requests. This can be a numeric or alpha-numeric entry. If the entry is alphanumeric, there should be a corresponding entry in the/etc/services/file. |
| dbserver | The name of the database server to connect to. This entry should correspond to an entry in the database server interface file. |
| dname | The name of the database to use. A database server can control many databases. |
| dbuser | The name of the database user to use when connecting to the database. Database users can be used to control what processes (or daemons) can connect to the database and also what permissions they have when they connect. Typically all transaction clearinghouse components will use the same database server name, database name, database username and hence database account holder password entries in their configuration files. |
| dbpswd | The password to use for the above database user. The file permissions for this configuration should be set according knowing that it contains a database username and password. |

For the session manager (sessiond.conf), the following configuration files apply:

| Parameter | Description |
|---|---|
| SESSIOND_UDP_PORT | Specifies the UDP port which the session manager will use to list for requests from CGI programs. |

-continued

| Parameter | Description |
|---|---|
| SESSIOND_TCP_PORT | Specifies the TCP port which the session manager will use to listen for replies from the transaction clearinghouse. |
| TRANSACTION_CLEARINGHOUSE_HOST | The UNIX host name that the transaction clearinghouse server is running on. When the session manager communicates with the transaction clearinghouse, this entry forms part of the address. |
| TRANSACTION_CLEARINGHOUSE_PORT | This entry specifies the TCP port which the session manager should use when communicating with the transaction clearinghouse transaction daemon. The session manager uses this entry and the TRANSACTION CLEARINGHOUSE_HOST entry to build the complete address for the transaction daemon. This port number should match the port number defined in the service entry of the transaction daemons configuration file. |
| TRANSACTION_CLEARINGHOUSE_URL_PORT | This entry specifies the TCP port which the session manager should use when communicating with the transaction clearinghouse URL tracking daemon. The session manager uses this entry and the TRANSACTION CLEARINGHOUSE_HOST entry to build the complete address for the URL tracking daemon. This port number should match the port number defined in the service entry of the URL tracking daemons configuration file. |
| TRANSACTION_CLEARINGHOUSE_AUTH_PORT | This entry specifies the TCP port that the session manager should use when communicating with the transaction clearinghouse account holder authentication daemon. The session manager uses this entry and the TRANSACTION CLEARINGHOUSE_HOST entry to build the complete address for the account holder authentication daemon. This port number should match the port number defined in the service entry of the account holder authentication daemons configuration file. |
| COMPANY_NO | Unique ID assigned to each company defined with the secure transaction server system. |
| ACCOUNT HOLDER_ID | Unique ID assigned to each account holder defined for a company in the secure transaction server system. |
| KEYCHECK_INTERVAL | The number of seconds that will elapse before the secure transaction server asks the browser to check for the existence of the access device. |
| REFRESH_TIME | The amount of time (in seconds) that must expire without any session activity before a session is considered inactive and terminated. |
| SESSION_REFRESH_INTERVAL | The amount of time (in seconds) that must elapse with no new connection requests to the secure transaction server, which will cause the secure transaction server to stop listening for incoming connections and go examine the its internal session table to see if any sessions have become idle (refresh time has expired for the session). It will clean up idle sessions and resume listening for incoming connection requests. |
| LOCAL_TRANSACTION_TRACK | Indicates if the transaction tracking data is stored locally as well as being sent to the transaction clearinghouse for storage. Valid entries are YES or NO. |
| MAX_RESEND_NO | If the secure transaction server does not get a confirmation message back from the transaction clearinghouse for information it sent to the secure access transaction clearinghouse, the secure transaction server will resend the data until we get a confirmation message or until the maximum times to resend transaction data has been exceeded. |
| ADMIN_EMAIL_ADDR | When an event occurs that requires intervention from an administrator, notification is sent to this email address. |
| MAIL_BIN | Absolute filename specification of the program to use to send email notification to the person defined in ADMIN_EMAIL_ADDR. |

| Parameter | Description |
| --- | --- |
| TRANSACTION | This defines the granularity of the transaction data that the session manager records about a session. There are two valid entries: SESSION or TRAN. TRAN indicates that the session manager should record information about every transaction that occurred in a session. SESSION indicates that only information regarding the session should be stored, i.e., session start and end times, account holder ID, number of transactions that occurred in session manager. |
| LOCAL_AUTHENTICATION | Indicates if account holder authentication should be performed against a local database as opposed to the transaction clearinghouse database. Valid entries are YES or NO. YES indicates that authentication should be performed locally, while NO indicates the opposite. |
| RUNTIME_DIR | This is the default directory for the secure transaction server. Here is where the secure transaction server will create log files and other dynamic run time files required for successful operation. |

For the web server (magnus.conf), in order that the system shared object 66 component works correctly with the web server, the following changes need to be made to the magnus.conf file:

\#
\# load the account holderaccount holder access specific NSAPI functions
\#
Init fn=load-modules shlib=/usr/ns-home/bin/load_modules/sts.so
funcs=init-sts,restrict-by-sts,log-end,restrict-by-rpa
\#
\# call init-sts to initialize sts server specific NSAPI
\# variables
\#
Init fn=init-sts
Sm_host=localhost
login_url=http://10.199.199.7/cgi-bin/gatekpr/login.cgi
keycheck_url=http://10.199.199.7/cgi-bin/gatekpr/check_key.cgi
smerr_url=http://10.199.199.7/gatekpr/session_err.html It should be noted that all the <variable>=<value> pairs listed above should appear on the line beginning Init if and should be separated with spaces. Each variable/pair value was listed on a separate line to aid clarity.

The following describes the meaning of each of NSAPI variables:

Sm_host: hostname or the IP address of the machine hosting session manager daemon(s)
login_url: URL for the account holderaccount holder access login CGI
keycheck_url: URL for account holderaccount holder access re-authentication CGI
smerr_url: URL for error HTML for session manager errors (configurable)

For the web server (obj.conf), for each directory protected by the secure transaction system, the following entries need to be inserted in obj.conf:

<Object ppath="/usr/ns-home/htdocs_unsecure/demosite/*">
PathCheck fn="restrict-by-sts"
log_head="prism_login.txt"
session_port="50420"
trailer="prism_tail.txt"
err_head="prism_err.txt"
digest="5"
AddLog fn="log-end"
</Object>

Once again, each entry was placed on a separate line for clarity but when adding them to the configuration file all the entries should be on the same line, separated by spaces.

The variable meaning is as follows:

log_head: text file containing the HTML header tags for the login page
session_port: session manager's port number
trailer: text file containing the HTML trailer tags for login page and error pages
err_head: text file containing the HTML header tags for error pages
digest: message digest type to use for one-time-password encryption (4-MD4; 5-MD5)

For the web server configuration file (mime.types), one line needs to be added to the mime.types configuration file. The line is:

type=application/x-protect exts=pro

The positioning of the new line within the configuration file is not important. Adding this line enables any file with the extension pro to automatically invoke the client side software to process the file.

With respect to routine operating procedures, there are general guidelines for the orderly start up and shutdown of the system of the present invention. To start up the system, there are a sequence of activities that are involved. First, each server should be configured through its configuration files. Each of the transaction clearinghouse servers is started by a series of shell strips, which in a typical installation, will be in the directory named/usr/local/sts/transaction clearinghouse. The/usr/local part of the previous pathname was the directory specified at installation time. The scripts are named start_userauthd.sh, start_transactiond.sh and start_urltrackd.sh. After the scripts are executed, the PS-EF command is used to check if the following processes exist: userauthd, transactiond and urltrackd. The next step is to start up the database server which requires login as the account holder sybase. This login will have an environment variable called SYBASE which defines what directory SYBASE was installed to. It is necessary to move to the directory $SYBASE/bin. For each database server to be started, there is a filed called RUN_<SERVER_NAME>. If two database servers called STS and STS_backup were created during the installation, the start up files would be called RUN_STS and RUN_STS_BACKUP. This start up file should be used in conjunction with the startserver program. The exact syntax is: startserver {-f<startup files>}. To continue the example from above, the command would be: startserver -f RUN_STS -f RUN_STS_BACKUP.

With respect to the session manager, it can be started by a shell script and there will be one instance of the session manager per account holder per company. If the installation directory was specified to be/usr/local then the session manager start up scripts will be found at/usr/local/STS/sessionmgr. The naming convention for the start up scripts is: start_<account holder name>.sh. Each account holder will have its own directory off of/usr/local/STS/sessionmgr.

With respect to the web server, once its configuration files have been modified as indicated above, the account holder access component will automatically be used once the web server is started. As web servers from different vendors require different start up procedures, it is assumed that this information is already known.

With respect to shutdown, of the system and particularly the web server, it is best to start with the secure transaction server as this is the first point of contact for the account holder's browser. Like the start up procedure for the web server, the shutdown procedure will differ for each different web server.

With respect to the session manager, it is recommended that shutdown of it be done from within the server side administration program. The browser should be pointed at the URL where the server site administration program is located and the administer button for the session manager that is wanted to be stopped should be clicked. A data dump on the session manager should be performed before stopping it to avoid loss of data contained within the manager to be stopped. This is executed by entering the complete passname of the data dump file and clicking the data dump button. With respect to the transaction clearinghouse, the transaction clearinghouse daemons are shutdown using the kill command. The process identification numbers for each of the servers should be found by getting a list of all processes and searching for the process names of the start up procedures. Once the process identification numbers have been established, the command kill -9<pid>{<pid>} should be used.

With respect to the database server, it can be shutdown using the following steps:
   login into isql as the system administrator
   type "shutdown <backup database server name>"
   type "go"
   type "shutdown"
   type "go"
   hadji:>isql -Usa -P -SSTS
   1> shutdown SYB_BACKUP
   2> go
   Backup Server: 3.48.1.1: The Backup Server will go down immediately.
   Terminating sessions.
   1> shutdown
   2> go
   Server SHUTDOWN by request.
   The SQL Server is terminating this process.
   00:97/05/14 14:52:40.23 server SQL Server shutdown by request.
   00:97/05/14 14:52:40.24 kernel usshutdown: exiting DB-LIBRARY error:
   Unexpected EOF from SQL Server.
   hadji:>

It should be understood from the foregoing that a secure transaction system has been shown and described which enables a business to have total control over account holder access, transaction tracking and billing over an untrusted network such as the Internet world wide web. The system has many desirable attributes and features that enable it to provide such functionality. Moreover, it is extremely flexible in that it can operate to function with multiple servers and multiple transaction clearinghouses if desired. Moreover, two-factor authentication enables the system to frequently determine if a account holder is authentic and the system also functions to authenticate servers as well. A secure platform for businesses to securely provide transaction services to the world wide web in a way that assures revenue generation if that is a goal is a prominent feature of the system of the present invention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A system for controlling access to selected computer resources, the system comprising:
   at least one authentication server having at least one associated database to register at least one digital identification of a hardware key associated with at least one client computer device;
   said at least one authentication server adapted to store in said at least one associated database (i) said at least one digital identification of said hardware key associated with said at least one client computer device, and (ii) authorization data associated with said selected computer resources;
   at least one access server adapted to receive from said at least one client computer device (i) said at least one digital identification of said hardware key associated with said at least one client computer device, and (ii) a request for said selected computer resources by said at least one client computer device;
   said at least one access server adapted to forward to said at least one authentication server said at least one digital identification of said hardware key associated with said at least one client computer device and said request for said selected computer resources by said at least one client computer device;
   said at least one authentication server adapted to authenticate said at least one digital identification of said hardware key associated with said at least one client computer device responsive to said request for said selected computer resources by said at least one client computer device;
   said at least one authentication server adapted to authorize said at least one client computer device to receive at least a portion of said selected computer resources based on said stored authorization data associated with said selected computer resources;
   said at least one authentication server adapted to permit access to said at least a portion of said selected computer resources (i) upon successfully authenticating said at least one digital identification of said hardware key associated with said at least one client computer device, and (ii) upon successfully authorizing said at least one client computer device; and said at least one authentication server adapted to acquire, for billing purposes, usage data associated with said at least a portion of said selected computer resources provided to said at least one client computer device.

2. The system of claim 1, wherein said at least a portion of said selected computer resources is provided to said at least one client computer device via the Internet.

3. The system of claim 1, wherein said at least one access server is adapted to receive said at least one digital identification of said hardware key associated with said at least one client computer device via the Internet.

4. The system of claim 1, wherein said at least a portion of said selected computer resources is provided to said at least one client computer device via an Internet protocol network.

5. The system of claim 1, wherein said at least one access server is adapted to receive said at least one digital identification of said hardware key associated with said at least one client computer device via an Internet protocol network.

6. The system of claim 1, wherein said hardware key is one of an external device and an internal hardware component associated with said at least one client computer device.

7. The system of claim 1, wherein said at least one access server is adapted to receive from said at least one client computer device, at least one of a user name and password.

8. The system of claim 7, wherein said at least one access server is adapted to forward said at least one of a user name and password to said at least one authentication server, and said at least one authentication server is adapted to authenticate said at least one of a user name and password.

9. The system of claim 1, wherein said at least one access server is adapted to forward to said at least one client computer device an acknowledgement of said request for selected computer resources of said at least one client computer device.

10. The system of claim 1, wherein said at least a portion of said selected computer resources is stored in at least one of a plurality of server computers associated with said at least one authentication server.

11. The system of claim 10, wherein said at least one of a plurality of server computers associated with said at least one authentication server provides said at least a portion of said selected computer resources to said at least one client computer device upon said at least one authentication server permitting access to said at least a portion of said selected computer resources.

12. The system of claim 1, wherein said at least a portion of said selected computer resources is stored in at least one of a plurality of server computers associated with said at least one access server.

13. The system of claim 12, wherein said at least one of a plurality of server computers associated with said at least one access server provides said at least a portion of said selected computer resources to said at least one client computer device upon said at least one authentication server permitting access to said at least a portion of said selected computer resources.

14. The system of claim 1, wherein said at least one authentication server is located on the same computer as said at least one access server.

15. The system of claim 1, wherein said at least one authentication server is located on a different computer from where said at least one access server is located.

16. The system of claim 1, wherein at least one of the functions of said at least one authentication server is performed by another server associated with said at least one authentication server.

17. The system of claim 1, wherein said authorization data associated with said selected computer resources is stored in a database of a server associated with said at least one authentication server.

18. The system of claim 1, wherein said at least a portion of said selected computer resources is encrypted.

19. The system of claim 1, wherein said at least one authentication server is adapted to (i) assign one of a plurality of authorization levels to said at least a portion of said selected computer resources, (ii) assign a particular authorization level to said at least one digital identification of said hardware key associated with said at least one client computer device, and (iii) permit only access to particular selected computer resources of said selected computer resources by said at least one client computer device permitted by the particular authorization level.

20. The system of claim 1, wherein said at least one access server is adapted to (i) change said at least one digital identification of said hardware key associated with said at least one client computer device received thereby, and (ii) forward said at least one digital identification of said hardware key associated with said at least one client computer device changed thereby to said at least one authentication server.

21. The system of claim 1, wherein said at least one authentication server is adapted to authenticate said at least one access server prior to providing said at least a portion of said selected computer resources to said at least one client computer device.

22. The system of claim 1, wherein said at least one authentication server is adapted to intermittently re-authenticate said at least one digital identification of said hardware key associated with said at least one client computer device.

23. The system of claim 1, wherein, said at least one client computer device is adapted to authenticate said at least one access server.

24. A system for controlling access to selected computer resources, the system comprising:
at least one authentication server having at least one associated database to register at least one digital identification of a hardware key associated with at least one client computer device;
said at least one authentication server adapted to store in said at least one associated database (i) said at least one digital identification of said hardware key associated with said at least one client computer device, (ii) identity data of at least one access server, and (iii) authorization data associated with said selected computer resources;
at least one access server adapted to receive from said at least one client computer device (i) said at least one digital identification of said hardware key associated with said at least one client computer device, and (ii) a request for said selected computer resources by said at least one client computer device;
said at least one access server adapted to forward to said at least one authentication server said at least one digital identification of said hardware key associated with said at least one client computer device, said request for said selected computer resources by said at least one client computer device, and said identity data of said at least one access server;
said at least one authentication server adapted to authenticate said identity data of at least one access server and said at least one digital identification of said hardware key associated with said at least one client computer device responsive to said request for said selected computer resources by said at least one client computer device;

said at least one authentication server adapted to authorize said at least one client computer device to receive at least a portion of said selected computer resources based on said stored authorization data associated with said selected computer resources;

said at least one authentication server adapted to permit access to said at least a portion of said selected computer resources (i) upon successfully authenticating said at least one digital identification of said hardware key associated with said at least one client computer device and said identity data of at least one access server, and (ii) upon successfully authorizing said at least one client computer device; and said at least one authentication server adapted to acquire, for billing purposes, usage data associated with said at least a portion of said selected computer resources provided to said at least one client computer device.

25. The system of claim 24, wherein said at least a portion of said selected computer resources is provided to said at least one client computer device via the Internet.

26. The system of claim 24, wherein said at least one access server is adapted to receive said at least one digital identification of said hardware key associated with said at least one client computer device via the Internet.

27. The system of claim 24, wherein said at least a portion of said selected computer resources is provided to said at least one client computer device via an Internet protocol network.

28. The system of claim 24, wherein said at least one access server is adapted to receive said at least one digital identification of said hardware key associated with said at least one client computer device via an Internet protocol network.

29. The system of claim 24, wherein said hardware key is one of an external device and an internal hardware component associated with said at least one client computer device.

30. The system of claim 24, wherein said at least one access server is adapted to receive from said at least one client computer device, at least one of a user name and password.

31. The system of claim 30, wherein said at least one access server is adapted to forward said at least one of a user name and password to said at least one authentication server, and said at least one authentication server is adapted to authenticate said at least one of a user name and password.

32. The system of claim 24, wherein said at least one access server is adapted to forward to said at least one client computer device an acknowledgement of said request for selected computer resources of said at least one client computer device.

33. The system of claim 24, wherein said at least a portion of said selected computer resources is stored in at least one of a plurality of server computers associated with said at least one authentication server.

34. The system of claim 33, wherein said at least one of a plurality of server computers associated with said at least one authentication server provides said at least a portion of said selected computer resources to said at least one client computer device upon said at least one authentication server permitting access to said at least a portion of said selected computer resources.

35. The system of claim 24, wherein said at least a portion of said selected computer resources is stored in at least one of a plurality of server computers associated with said at least one access server.

36. The system of claim 35, wherein said at least one of a plurality of server computers associated with said at least one access server provides said at least a portion of said selected computer resources to said at least one client computer device upon said at least one authentication server permitting access to said at least a portion of said selected computer resources.

37. The system of claim 24, wherein said at least one authentication server is located on the same computer as said at least one access server.

38. The system of claim 24, wherein said at least one authentication server is located on a different computer from where said at least one access server is located.

39. The system of claim 24, wherein at least one of the functions of said at least one authentication server is performed by another server associated with said at least one authentication server.

40. The system of claim 24, wherein said authorization data associated with said selected computer resources is stored in a database of a server associated with said at least one authentication server.

41. The system of claim 24, wherein said at least a portion of said selected computer resources is encrypted.

42. The system of claim 24, wherein said at least one authentication server is adapted to (i) assign one of a plurality of authorization levels to said at least a portion of said selected computer resources, (ii) assign a particular authorization level to said at least one digital identification of said hardware key associated with said at least one client computer device, and (iii) permit only access to particular selected computer resources of said selected computer resources by said at least one client computer device permitted by the particular authorization level.

43. The system of claim 24, wherein said at least one authentication server is adapted to authenticate said at least one access server prior to providing said at least a portion of said selected computer resources to said at least one client computer device.

44. The system of claim 24, wherein said at least one authentication server is adapted to intermittently re-authenticate said at least one digital identification of said hardware key associated with said at least one client computer device.

45. The system of claim 24, wherein, said at least one client computer device is adapted to authenticate said at least one access server.

* * * * *